(12) United States Patent
Kusashima et al.

(10) Patent No.: US 10,939,437 B2
(45) Date of Patent: Mar. 2, 2021

(54) TERMINAL, BASE STATION, AND COMMUNICATION METHOD

(71) Applicant: Sharp Kabushiki Kaisha, Sakai (JP)

(72) Inventors: Naoki Kusashima, Sakai (JP); Kazuyuki Shimezawa, Sakai (JP); Wataru Ouchi, Sakai (JP); Alvaro Ruiz Delgado, Sakai (JP); Kimihiko Imamura, Sakai (JP); Takashi Hayashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/521,609

(22) Filed: Jul. 25, 2019

(65) Prior Publication Data

US 2019/0349937 A1  Nov. 14, 2019

Related U.S. Application Data

(63) Continuation of application No. 15/504,079, filed as application No. PCT/JP2015/074411 on Aug. 28, 2015, now Pat. No. 10,397,921.

(30) Foreign Application Priority Data

Sep. 10, 2014  (JP) .............................. JP2014-183881

(51) Int. Cl.
    *H04W 72/04*        (2009.01)
    *H04J 3/00*         (2006.01)
    (Continued)

(52) U.S. Cl.
    CPC .......... *H04W 72/0453* (2013.01); *H04J 3/00* (2013.01); *H04L 1/18* (2013.01); *H04L 1/1812* (2013.01);
    (Continued)

(58) Field of Classification Search
    CPC ... H04L 2012/5608; H04L 1/18; H04L 5/001; H04L 5/1469; H04L 1/1812;
    (Continued)

(56) References Cited

U.S. PATENT DOCUMENTS 10,397,921 B2 *  8/2019  Kusashima ........... H04L 5/0055
2013/0155915 A1 *  6/2013  Park ..................... H04L 1/1861
                                                        370/280

FOREIGN PATENT DOCUMENTS

EP    3 076 732 A1   10/2016
EP    3 190 840 A1    7/2017
EP    3 209 082 A1    8/2017

OTHER PUBLICATIONS

Kusashima et al., "Terminal, Base Station, and Communication Method", U.S. Appl. No. 15/504,079, filed Feb. 15, 2017.
(Continued)

*Primary Examiner* — Brenda H Pham

(74) *Attorney, Agent, or Firm* — Keating & Bennett, LLP

(57) ABSTRACT

A terminal communicating with a base station by using an FDD cell and a TDD cell includes a reception unit that performs reception over a PDCCH transmitted using a DCI format. In a case where the TDD cell is configured as a primary cell for the terminal, a first uplink reference UL-DL configuration used for determining an interval between reception of the PDCCH indicating transmission of a PUSCH and the transmission of the PUSCH is configured for the TDD cell, and a second uplink reference UL-DL configuration used for determining whether or not to use DAI included in the DCI format of the PDCCH indicating the transmission of the PUSCH is configured for the FDD cell.

2 Claims, 16 Drawing Sheets

(51) Int. Cl.
  *H04L 1/18*  (2006.01)
  *H04L 5/00*  (2006.01)
  *H04L 5/14*  (2006.01)
  *H04W 28/04* (2009.01)
  *H04J 4/00*  (2006.01)

(52) U.S. Cl.
  CPC ............ *H04L 5/001* (2013.01); *H04L 5/0055* (2013.01); *H04L 5/1469* (2013.01); *H04W 28/04* (2013.01); *H04W 72/04* (2013.01); *H04W 72/0406* (2013.01); *H04J 4/00* (2013.01)

(58) Field of Classification Search
  CPC .... H04L 5/0055; H04W 84/12; H04W 88/08; H04W 84/18; H04W 80/04; H04W 88/06; H04W 74/08; H04W 72/0453; H04W 28/04; H04W 72/04; H04W 72/0406; H04B 7/21; H04J 3/00; H04J 4/00
  USPC ..... 370/349, 310.2, 328, 338, 322, 329, 341
  See application file for complete search history.

(56) References Cited

OTHER PUBLICATIONS

Sharp, "Issue on FDD-TDD HARQ-ACK reporting procedure for TDD PCell", 3GPP TSG RAN WG1 Meeting #78bis, R1-144117, Oct. 6-10, 2014, 19 pages.

\* cited by examiner

FIG. 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

S Special subframe    U Uplink subframe    D Downlink subframe

FIG. 6

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | | | |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 7

| | |
|---|---|
| PDCCH | $n^{(1)}_{PUCCH,i} = (M - i - 1) \cdot N_c + i \cdot N_{c+1} + n_{CCE,i} + N^{(1)}_{PUCCH}$ ... EXPRESSION (a) |
| EPDCCH | IN CASE OF DISTRIBUTED TRANSMISSION<br>$n^{(1)}_{PUCCH,i} = n_{ECCE,q} + \sum_{il=0}^{i-1} N_{ECCE,q,n-k_{il}} + \Delta_{ARO} + N^{(e1)}_{PUCCH,q}$ ... EXPRESSION (b-1)<br><br>IN CASE OF LOCALIZED TRANSMISSION<br>$n^{(1)}_{PUCCH,i} = \left\lfloor \dfrac{n_{ECCE,q}}{N^{ECCE,q}_{RB}} \right\rfloor \cdot N^{ECCE,q}_{RB} + \sum_{il=0}^{i-1} N_{ECCE,q,n-k_{il}} + n' + \Delta_{ARO} + N^{(e1)}_{PUCCH,q}$ ... EXPRESSION (b-2) |

WHERE, c IS SELECTED FROM {0, 1, 2, 3} SO AS TO SATISFY $N_c \leq n_{CCE,i} < N_{c+1}$, $N_c = \max\left\{0, \left\lfloor N^{DL}_{RB} \cdot (N^{RB}_{sc} \cdot c - 4)/36 \right\rfloor\right\}$

FIG. 9

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6, 5 | 5, 4 | 4 | | | 6, 5 | 5, 4 | 4 |
| 1 | | | 7, 6 | 6, 5, 4 | | | | 7, 6 | 6, 5, 4 | |
| 2 | | | 8, 7, 6, 5, 4 | | | | | 8, 7, 6, 5, 4 | | |
| 3 | | | 11, 10, 9, 8, 7, 6 | 6, 5 | 5, 4 | | | | | |
| 4 | | | 12, 11, 10, 9, 8, 7 | 7, 6, 5, 4 | | | | | | |
| 5 | | | 13, 12, 11, 10, 9, 8, 7, 6, 5, 4 | | | | | | | |
| 6 | | | 8, 7 | 7, 6 | 6, 5 | | | 7 | 7, 6, 5 | |

FIG. 10

| SET | (PRIMARY CELL UL/DL CONFIGURATION, SECONDARY CELL UL/DL CONFIGURATION) | DOWNLINK REFERENCE UL/DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(0,2),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 11

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6, 5, 4 | | | | | 6, 5, 4 | | 4, 5 |
| 1 | | | 7, 6, 5, 4 | 4 | 4, 5 | | | 7, 6, 5, 4 | 4 | |
| 2 | | | 8, 7, 4, 6, 5 | | | | | 8, 7, 4, 6, 5 | | |
| 3 | | | 7, 6, 11, 10, 9, 8 | 6, 5 | 5, 4 | | | | | |
| 4 | | | 12, 11, 8, 7, 10, 9 | 7, 6, 5, 4 | | | | | | |
| 5 | | | 13, 12, 9, 8, 7, 5, 4, 11, 6 | | | | | | | |
| 6 | | | 10, 9, 8, 7 | 7 | 5 | | | 10, 9, 7 | 7 | |

FIG. 12

| DAI MSB, LSB | $V_{DAI}^{UL}$ or $V_{DAI}^{DL}$ | Number of subframes with PDSCH transmission and with PDCCH/EPDCCH indicating DL SPS release |
|---|---|---|
| 0, 0 | 1 | 1 or 5 or 9 |
| 0, 1 | 2 | 2 or 6 or 10 |
| 1, 0 | 3 | 3 or 7 |
| 1, 1 | 4 | 0 or 4 or 8 |

FIG. 13

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

FIG. 14

| | | |
|---|---|---|
| $B_c^{DL} = M$ | ... EXPRESSION (a-1) | $B_c^{DL} = M_c$ ... EXPRESSION (b-1) |
| $B_c^{DL} = W_{DAI}^{UL}$ | ... EXPRESSION (a-2) | $B_c^{DL} = \min(W_{DAI}^{UL}, M_c)$ ... EXPRESSION (b-2) |
| $B_c^{DL} = W_{DAI}^{UL} + 4\lceil (U - W_{DAI}^{UL})/4 \rceil$ | ... EXPRESSION (a-3) | $B_c^{DL} = \min(W_{DAI}^{UL} + 4\lceil (U - W_{DAI}^{UL})/4 \rceil, M_c)$ ... EXPRESSION (b-3) |
| | | $B_c^{DL} = 1$ ... EXPRESSION (b-4) |

FIG. 15

| UL/DL CONFIGURATION | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 6, 5 | 5, 4 | 4 | | | 6, 5 | 5, 4 | 4 |
| 1 | | | 7, 6, 5 | 4, 5 | | | | 7, 6, 5 | 4, 5 | |
| 2 | | | 8, 7, 4, 6, 5 | | | | | 8, 7, 4, 6, 5 | | |
| 3 | | | 7, 6, 11, 10 | 6, 5, 10 | 5, 4, 10 | | | | | |
| 4 | | | 12, 11, 8, 7, 10 | 7, 6, 5, 4, 10 | | | | | | |
| 5 | | | 13, 12, 9, 8, 7, 5, 4, 11, 6, 10 | | | | | | | |
| 6 | | | 7, 8 | 7, 6 | 5, 6 | | | 7, 5 | 7, 5 | |

FIG. 16

$$n_{HARQ} = \sum_{c=0}^{N_{cells}^{DL}-1} \sum_{k \in K} N_{k,c}^{received} \quad \cdots \text{EXPRESSION (1)}$$

$$n_{HARQ} = \sum_{c=0}^{N_{cells}^{DL}-1} \left( \left( \left( V_{DAI,c}^{DL} - U_{DAI,c} \right) \mod 4 \right) n_c^{ACK} + \sum_{k \in K} N_{k,c}^{received} \right) \quad \cdots \text{EXPRESSION (2)}$$

TERMINAL, BASE STATION, AND COMMUNICATION METHOD

TECHNICAL FIELD

The present invention relates to a terminal, a base station, and a communication method.

This application is based upon and claims the benefit of priority of the prior Japanese Patent Application No. 2014-183881, filed on Sep. 10, 2014, the entire contents of which are incorporated herein by reference.

BACKGROUND ART

A base station apparatus (a base station, a cell, a first communication apparatus (communication apparatus different from a terminal device), and eNodeB) and a terminal device (a terminal, a mobile terminal, a mobile station apparatus, a second communication apparatus (communication apparatus different from the base station apparatus), user equipment (UE), and a user device), which are included in a communication system such as Wideband Code Division Multiple Access (WCDMA) (registered trademark), Long Term Evolution (LTE), and LTE-Advanced (LTE-A) by Third Generation Partnership Project (3GPP) (registered trademark), and a Wireless Local Area Network (WLAN), and Worldwide Interoperability for Microwave Access (WiMAX) (registered trademark) by The Institute of Electrical and Electronics engineers (IEEE) (registered trademark), realize high-speed data communication by including a plurality of transmit and receive antennas and performing spatial multiplexing on data signals using a Multi Input Multi Output (MIMO) technology.

In 3GPP, in order to realize high-speed data communication between the base station apparatus and the terminal device, carrier aggregation (CA) in which simultaneous communication is performed by using a plurality of component carriers has been employed (NPL 1).

In 3GPP, as a frame structure type of a bi-directional communication scheme (duplex communication scheme), frequency division duplex (FDD) and time division duplex (TDD) has been employed. In FDD, a full duplex scheme in which bi-directional communication is able to be simultaneously performed, and a half duplex scheme in which the bi-directional communication is realized by switching uni-directional communication have been employed (NPL 2). LTE that employs the TDD may be referred to as TD-LTE or LTE TDD.

In 3GPP, TDD-FDD carrier aggregation (TDD-FDD CA) in which communication is performed by aggregating a component carrier (TDD carrier) which supports the TDD and a component carrier (FDD carrier) which supports the FDD has been examined (NPL 3).

CITATION LIST

Non Patent Literature

NPL 1: 3rd Generation Partnership Project Technical Specification Group Radio Access Network; Evolved Universal Terrestrial Radio Access (E-UTRA) and Evolved Universal Terrestrial Radio Access Network (E-UTRAN); Overall description; Stage 2 (Release 10), TS36.300 v10.10.0 (2013-06).

NPL 2: 3rd Generation Partnership Project Technical Specification Group Radio Access Network; Evolved Universal Terrestrial Radio Access (E-UTRA); Physical Channels and Modulation (Release 8), TS36.211 v8.8.0 (2009-09).

NPL 3: "Potential solutions of TDD-FDD joint operation", R1-132886, 3GPP TSG-RAN WG1 Meeting #74, Barcelona, Spain, 19-23 Aug. 2013.

SUMMARY OF INVENTION

Technical Problem

In carrier aggregation performed by a TDD cell and an FDD cell, a mechanism in which HARQ-ACK information corresponding to a PDCCH/EPDCCH indicating a cell PDSCH of a certain frame structure type or a PDCCH/EPDCCH indicating SPS releasing is transmitted and received to and from a cell of a frame structure type different from the aforementioned cell is not provided, and thus, there is a problem that appropriate communication is not performed.

Some aspects of the present invention have been made in view of the aforementioned problems, and an object of the aspects of the present invention is to provide a terminal device capable of performing appropriate communication.

Solution to Problem (1) Some aspects of the present invention have been made in order to solve the aforementioned problems. A terminal of an aspect of the present invention is a terminal communicating with a base station by using an FDD cell and a TDD cell. The terminal includes a reception unit that performs reception over a PDCCH transmitted using a DCI format. In a case where the TDD cell is configured as a primary cell for the terminal, a first uplink reference UL-DL configuration used for determining an interval between reception of the PDCCH indicating transmission of a PUSCH and the transmission of the PUSCH is configured for the TDD cell, and a second uplink reference UL-DL configuration used for determining whether or not to use DAI included in the DCI format of the PDCCH indicating the transmission of the PUSCH is configured for the FDD cell.

(2) A terminal according to another aspect of the present invention is a terminal communicating with a base station by using an FDD cell and a TDD cell. The terminal includes a reception unit that performs reception over a PDCCH transmitted using a DCI format. In a case where the TDD cell is configured as a primary cell for the terminal, a first downlink reference UL-DL configuration used for determining an interval between reception of a PDSCH and transmission of HARQ-ACK corresponding to the PDSCH is configured for the TDD cell and the FDD cell, and in a case where the FDD cell is configured as the primary cell for the terminal, a second uplink reference UL-DL configuration used for determining a downlink subframe or a special subframe is configured for the TDD cell.

(3) A base station according to still another aspect of the present invention is a base station communicating with a terminal by using an FDD cell and a TDD cell. The base station includes a transmission unit that transmits a PDCCH transmitted using a DCI format to the terminal. In a case where the TDD cell is configured as a primary cell for the terminal, a first uplink reference UL-DL configuration used for determining an interval between transmission of the PDCCH indicating transmission of a PUSCH and reception of the PUSCH is configured for the TDD cell, and a second uplink reference UL-DL configuration used for determining whether or not to use DAI included in a DCI format of the PDCCH indicating the transmission of the PUSCH is configured for the FDD cell.

(4) A base station according to still another aspect of the present invention is a base station communicating with a terminal by using an FDD cell and a TDD cell. The base station includes a transmission unit that transmits a PDCCH transmitted using a DCI format to the terminal. In a case where the TDD cell is configured as a primary cell for the terminal, a first downlink reference UL-DL configuration used for determining an interval between transmission of a PDSCH and reception of HARQ-ACK corresponding to the PDSCH is configured for the TDD cell and the FDD cell, and in a case where the FDD cell is configured as the primary cell for the terminal, a second uplink reference UL-DL configuration used for determining a downlink subframe or a special subframe is configured for the TDD cell.

(5) A communication method according to still another aspect of the present invention is a communication method used in a terminal communicating with a base station by using an FDD cell and a TDD cell. The communication method includes a step of performing reception over a PDCCH transmitted using a DCI format, a step of configuring a first uplink reference UL-DL configuration used for determining an interval between reception of the PDCCH indicating transmission of a PUSCH and the transmission of the PUSCH for the TDD cell in a case where the TDD cell is configured as a primary cell for the terminal, and a step of configuring a second uplink reference UL-DL configuration used for determining whether or not to use DAI included in a DCI format of the PDCCH indicating the transmission of the PUSCH for the FDD cell.

Advantageous Effects of Invention

According to some aspects of the present invention, it is possible to improve communication efficiency by allowing a terminal device to perform appropriate transmission control and reception control in a communication system in which a base station apparatus and the terminal device communicate with each other.

BRIEF DESCRIPTION OF DRAWINGS

FIG. 3 is a diagram illustrating a structure of a subframe pattern in a TDD UL/DL configuration.

FIG. 6 is a diagram illustrating the correspondence between a subframe in which a PDCCH/EPDCCH is transmitted and a subframe in which the HARQ-ACK information is transmitted according to the first embodiment of the present invention.

FIG. 7 is a diagram illustrating a calculation expression of the PUCCH resource including the HARQ-ACK information in TDD according to the first embodiment of the present invention.

FIG. 9 is a diagram illustrating an example of the correspondence between a subframe in which the PDCCH/EPDCCH is transmitted and a subframe in which the HARQ-ACK information is transmitted in the TDD and FDD carrier aggregation according to the first embodiment of the present invention.

FIG. 10 is a diagram illustrating the correspondence between a combination of UL-DL configurations and a downlink reference UL-DL configuration according to the first embodiment of the present invention.

FIG. 11 is a diagram illustrating an example of the correspondence between a subframe in which the PDCCH/EPDCCH is transmitted and a subframe in which the HARQ-ACK information is transmitted in the TDD and FDD carrier aggregation according to the first embodiment of the present invention.

FIG. 12 is a diagram illustrating the correspondence between a value of DAI and the number of subframes of the PDCCH/EPDCCH indicating transmission of a PDSCH or releasing of a downlink SPS according to the first embodiment of the present invention.

FIG. 13 is a diagram illustrating an uplink relevant index according to the first embodiment of the present invention.

FIG. 14 is a diagram illustrating a calculation expression of the number of downlink subframes required to feed an HARQ-ACK information bit back according to the first embodiment of the present invention.

FIG. 15 a diagram illustrating an example of the correspondence between a subframe in which the PDCCH/EPDCCH is transmitted and a subframe in which the HARQ-ACK information is transmitted in the TDD and FDD carrier aggregation according to the first embodiment of the present invention.

FIG. 16 is a diagram illustrating an example of a calculation expression of $n_{HARQ}$ according to the first embodiment of the present invention.

DESCRIPTION OF EMBODIMENTS

Figure 1:
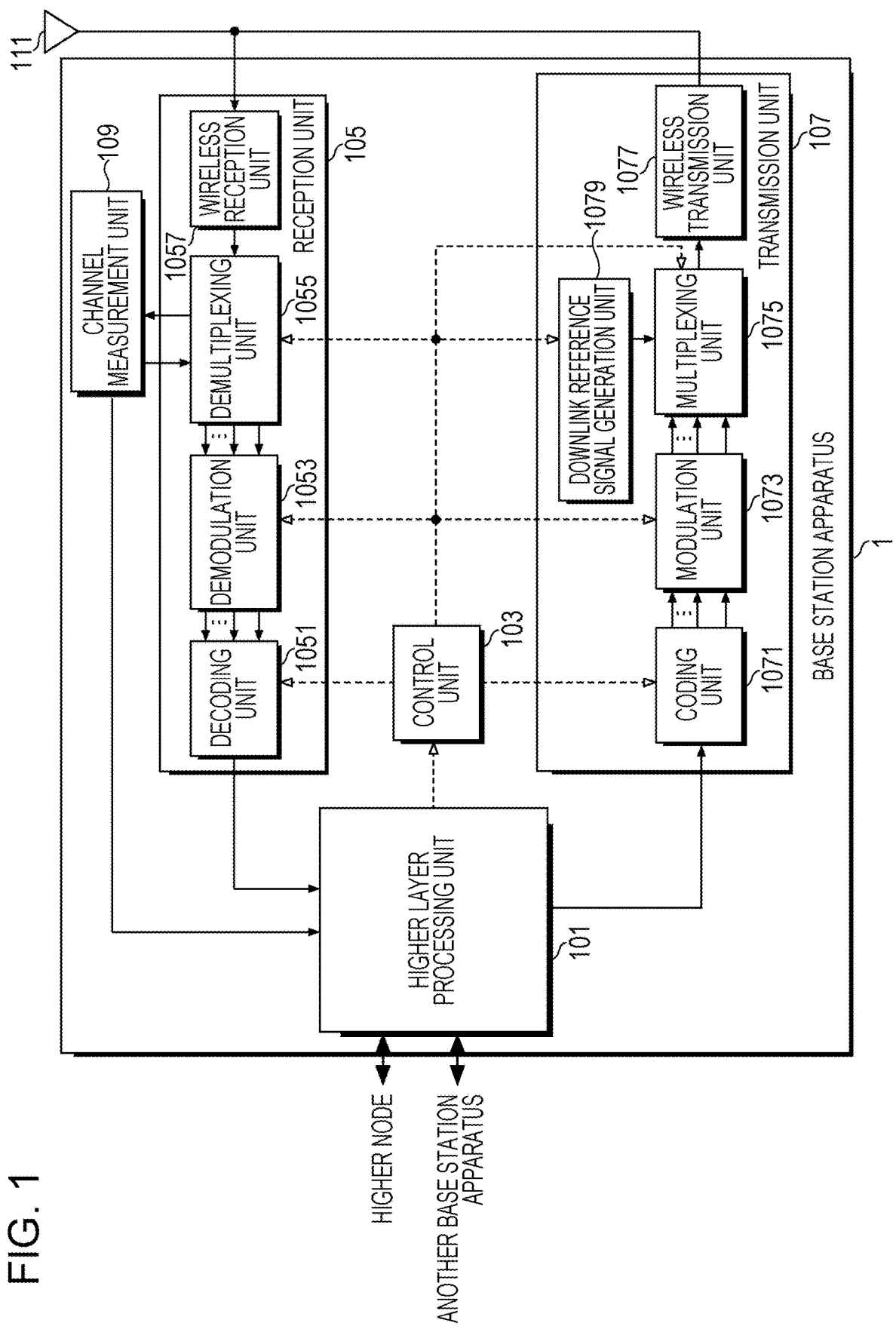
FIG. 1 is a schematic block diagram illustrating a structure of a base station apparatus 1 according to a first embodiment of the present invention.

Carrier aggregation in which communication is performed by aggregating (integrating or combining) a plurality of component carriers is applied to a communication system according to the present embodiment. Since a cell may include a component carrier, the carrier aggregation may be referred to as cell aggregation. That is, the communication system according to the present embodiment may perform communication by aggregating a plurality of cells. The cell aggregation in the communication system of the present embodiment performs communication by aggregating a cell (TDD cell, TDD serving cell, TDD carrier, TDD component carrier, or TDD operation) to which a TDD scheme is applied and a cell (FDD cell, FDD serving cell, FDD carrier, FDD component carrier, or FDD operation) to which an FDD scheme is applied. That is, the cell aggregation of a plurality of cells for which a different frame structure type is configured is applied to the communication system according to the present embodiment. The frame structure type may be referred to as a duplex mode. In LTE and LTE-A, frame structure type 1 is defined as FDD, and frame structure type 2 is defined as TDD.

The cell aggregation means that communication is performed by aggregating one primary cell and one or more secondary cells. The primary cell may include an uplink component carrier and a downlink component carrier, whereas the secondary cell may include only a downlink component carrier.

A plurality of configured serving cells (plurality of configured cells) includes one primary cell and one or a plurality of secondary cells. The primary cell is a serving cell in which an initial connection establishment procedure is performed, a serving cell in which a connection reestablishment procedure is started, or a cell indicated as a primary cell in a handover procedure. The secondary cell may be configured when or after RRC connection is established. A plurality of serving cells may be constituted by one base station apparatus 1, and a plurality of serving cells may be constituted by a plurality of base station apparatuses 1.

A frequency band (UL/DL operating band) of an uplink and a downlink and a duplex mode (TDD or FDD) are correlated with one index. A frequency band (operating band) of an uplink and a downlink and a duplex mode are managed by one table. This index may also be referred to as an E-UTRA operating band, an E-UTRA band, or a band. For example, Index 1 may also be referred to as Band 1, Index 2 may also be referred to as Band 2, and Index n may also be referred to as Band n. For example, in Band 1, an uplink operating band ranges from 1920 MHz to 1980 MHz, a downlink operating band ranges from 2110 MHz to 2170 MHz, and the duplex mode is FDD. In Band 33, the uplink and downlink operating bands range from 1900 MHz to 1920 MHz, and the duplex mode is TDD.

A combination (E-UTRA CA Band) of bands in which the carrier aggregation is able to be performed may be configured. For example, a case where the carrier aggregation using component carriers is able to be performed within Band 1 and Band 5 may be shown. That is, whether or not the carrier aggregation using component carriers is able to performed in different bands may be shown.

A combination of a band supported by a terminal device 2 and a band in which the carrier aggregation is able to be performed is configured for function information (UE capability or UE-EUTRA-Capability) of the terminal device 2. The terminal device 2 transmits the function information, and thus, the base station apparatus 1 is able to recognize a function of the terminal device 2.

The present invention may be applied to some of a plurality of configured cells. A cell configured for the terminal device 2 may also be referred to as a serving cell.

TDD is a technology in which uplink communication and downlink communication are able to be performed in a single frequency band (carrier frequency or component carrier) by performing time-division multiplexing on an uplink signal and a downlink signal. In LTE, the downlink and the uplink may be switched on a subframe basis based on a previously performed configuration. In TDD, a subframe (downlink subframe or subframe reserved for downlink transmission) in which downlink transmission is able to be performed, a subframe (uplink subframe or subframe reserved for uplink transmission) in which uplink transmission is able to be performed, and a guard period (GP) are provided, and thus, a subframe (special subframe) in which the downlink transmission and the uplink transmission are able to be switched in a time domain (symbol area) is defined. In the special subframe, a time domain (symbol corresponding to a time domain) in which the downlink transmission is able to be performed is referred to as a downlink pilot time slot (DwPTS), and a time domain (symbol corresponding to a time domain) in which the uplink transmission is able to be performed is referred to as an uplink pilot time slot (UpPTS). For example, in a case where a subframe i is a downlink subframe, the terminal device 2 is able to receive a downlink signal transmitted from the base station apparatus 1, and in a case where a subframe j different from the subframe i is an uplink subframe, an uplink signal is able to be transmitted to the base station apparatus 1 from the terminal device 2. In a case where a subframe k different from the subframe i and the subframe j is a special subframe, a downlink signal is able to be received in a downlink time domain DwPTS, and an uplink signal is able to be transmitted in an uplink time domain UpPTS.

In order to perform communication using the TDD scheme in LTE and LTE-A, a specific information element (TDD UL/DL (UL-DL) configuration(s) (TDD uplink-downlink configuration(s)), TDD configuration(s) (tdd-Config or TDD config), and UL/DL (UL-DL) configuration (uplink-downlink configuration(s))) is notified. The terminal device 2 may perform a transmission and reception process by regarding a certain subframe as any one of the uplink subframe, the downlink subframe, and the special subframe based on the notified information.

A plurality of patterns is defined as a structure (length of DwPTS, UpPTS, and GP within the special subframe) of the special subframe, and these patterns are managed in the form of table. The plurality of patterns is respectively correlated with values (indices) and this value is notified, so that the terminal device performs a process of the special subframe based on the pattern correlated with the notified value. That is, information regarding the structure of the special subframe may be notified to the terminal device 2 from the base station apparatus 1.

A traffic adaptive control technology in which a ratio between uplink resources and downlink resources is changed depending on uplink traffic and downlink traffic (information amount, data amount, or communication amount) may be applied to TDD. For example, a ratio between the downlink subframes and the uplink subframes may be dynamically changed. The downlink subframe and the uplink subframe may be adaptively switched for a certain subframe. Such a subframe is referred to as a flexible subframe. The base station apparatus 1 is able to receive an uplink signal or transmit a downlink signal in the flexible subframe depending on a condition (situation). The terminal device 2 may regard the flexible subframe as the downlink subframe and may perform a reception process as long as the base station apparatus 1 does not indicate the terminal device to transmit an uplink signal in the flexible subframe. Such TDD in which the ratio between the downlink subframes and the uplink subframes, the uplink and downlink subframes, or the TDD UL/DL (re)configuration is dynamically changed may also be referred to as dynamic TDD (DTDD) or enhanced interference mitigation and traffic adaptation (eIMTA). For example, TDD UL/DL configuration information may be transmitted through L1 signaling.

Meanwhile, FDD is a technology in which downlink communication and uplink communication are able to be performed in different frequency bands (carrier frequencies or component carriers).

As the communication system, a cellular communication system in which a plurality of areas covered by the base station apparatus 1 is arranged in a cell shape may be applied. A single base station apparatus 1 may manage a plurality of cells. A single base station apparatus 1 may manage a plurality of remote radio heads (RRHs). A single base station apparatus 1 may manage a plurality of local areas. A single base station apparatus 1 may manage a plurality of heterogeneous networks (HetNets). A single base station apparatus 1 may manage a plurality of low-power base station apparatuses (low power node (LPN)).

In this communication system, the terminal device 2 measures reference signal received power (RSRP) based on a cell-specific reference signal(s) (CRS).

In this communication system, communication may be performed by using carriers (component carriers) in which some of physical channels or signals defined in LTE are not mapped. Here, such a carrier is referred to as a new carrier type (NCT). For example, in the new carrier type, a cell-specific reference signal, a physical downlink control channel, or a synchronization signal (primary synchronization signal or secondary synchronization signal) may be not mapped. In a cell for which the new carrier type is configured, the introduction of a physical channel (physical discovery channel (PDCH), new discovery signal(s) (NDS), discovery reference signal (DRS), or discovery signal (DS)) for performing mobility measurement or time or frequency synchronization detection has been examined. The new carrier type may also be referred to as an additional carrier type (ACT). An existing carrier type against the NCT may also be referred to as a legacy carrier type (LCT).

In the present embodiment, "X/Y" includes the meaning of "X or Y". In the present embodiment, "X/Y" includes the meaning of "X and Y". In the present embodiment, "X/Y" includes the meaning of "X and/or Y".

(Physical Channel)

The primary physical channel (or physical signal) used in LTE and LTE-A will be described. The channel means a medium used in transmission of a signal. The physical channel means a physical medium used in transmission of a signal. Although there is a possibility that the physical channel will be added or the structure or the format thereof will be changed or added in LTE, LTE-A, and the release of the subsequent standard, such a case does not influence the descriptions of the respective embodiments of the present invention.

In LTE and LTE-A, the physical channel is scheduled using a radio frame. One radio frame is 10 ms, and one radio frame includes 10 subframes. One subframe includes 2 slots (that is, one slot is 0.5 ms). A resource block is managed as a smallest unit in which scheduling for allocating the physical channel is performed. The resource block is defined as a region which includes a predetermined frequency domain in which a frequency axis is constituted by a set of a plurality of subcarriers (for example, 12 subcarriers) and a predetermined transmission time interval (for example, one slot or seven symbols).

In order to improve communication accuracy, a cyclic prefix (CP) allocated to a redundancy of the physical channel is applied to the physical channel and is transmitted. The number of symbols allocated within one slot is changed depending on the length of the CP. For example, seven symbols may be allocated within one slot in the case of a normal CP, and six symbols may be allocated within one slot in the case of an extended CP.

A subcarrier interval is narrowed, and thus, 24 subcarriers may be allocated within one resource block. Such a case may be applied to a specific physical channel.

The physical channel corresponds to a set of resource elements for transmitting information output from a higher layer. The physical signal is used in a physical layer, and does not transmit information output from the higher layer. That is, control information of a higher layer such as a radio resource control (RRC) message or system information (SI) is transmitted over a physical channel.

As a downlink physical channel, there are a physical downlink shared channel (PDSCH), a physical broadcast channel (PBCH), a physical multicast channel (PMCH), a physical control format indicator channel (PCFICH), a physical downlink control channel (PDCCH), a physical hybrid ARQ indicator channel (PHICH), and an enhanced physical downlink control channel (EPDCCH). As the downlink physical signal, there are various reference signals and various synchronization signals. As the downlink reference signal (DL-RS), there are a cell-specific reference signal (CRS), a terminal device-specific reference signal (UE-specific reference signal (UERS)), and a channel state information reference signal (CSI-RS). As the synchronization signal, there are a primary synchronization signal (PSS), and a secondary synchronization signal (SSS).

As the uplink physical channel, there are a physical uplink shared channel (PUSCH), a physical uplink control channel (PUCCH), and a physical random access channel (PRACH). As the uplink physical signal, there are various reference signals. As the uplink reference signal, there are a demodulation reference signal (DMRS) and a sounding reference signal (SRS).

The synchronization signal includes three types of PSSs and SSSs including 31 types of codes interleave in different frequency domains, and indicates 504 physical layer cell identities (PCI, physical cell identity, or physical cell identifier) for identifying the base station apparatus 1 and frame timings for radio synchronization by a combination of the PSSs and the SSSs. The terminal device 2 specifies a cell identifier of the received synchronization signal, by performing cell search. The cell identifier may also be referred to as a cell ID. The physical layer cell identity may also be referred to as a physical cell ID.

The physical broadcast channel (PBCH) is transmitted for notifying of a control parameter (broadcast information or system information) which is commonly used between the terminal devices 2 within a cell. Broadcast information (for example, SIB1 or part of system information) which is not notified over the PBCH is transmitted over a PDSCH through a DL-SCH. As the broadcast information, a cell global identifier (CGI) indicating a cell individual identifier, a tracking area identifier (TAI) for managing a waiting area through paging, random access configuration information (transmission timing timer), or common radio resource configuration information (shared radio resource configuration information) is notified.

The downlink reference signal is classified into a plurality of types according to the purpose of use. For example, the cell-specific reference signal (CRS) is a pilot signal transmitted to each cell with a prescribed power, and is a downlink reference signal which is periodically repeated in the frequency domain and in the time domain based on a prescribed rule. The terminal device 2 measures reception quality of each cell by receiving the cell-specific reference signal. The terminal device 2 uses the cell-specific reference signal as a reference signal for demodulating a physical downlink control channel or a physical downlink shared channel transmitted through the same antenna port as that used for the cell-specific reference signal. As a sequence used for the cell-specific reference signal, a sequence capable of being identified in each cell is used. Although the CRS may be transmitted in all downlink subframes from the base station apparatus 1, the terminal device 2 may receive the CRS only in a designated downlink subframe.

The downlink reference signal is also used for estimating propagation fluctuation in the downlink. The downlink reference signal used for estimating propagation fluctuation may be referred to as a channel state information reference signal (CSI-RS) or a CSI reference signal. A CSI reference signal which is not actually transmitted or is transmitted with zero power may be referred to as a zero power channel state information reference signal (ZP CSI-RS) or a zero power CSI reference signal. A CSI reference signal which is actually transmitted may be referred to as a non zero power channel state information reference signal (NZP CSI-RS) or a non zero power CSI reference signal.

The downlink resource used for measuring an interference component may be referred to as a channel state information-interference measurement resource (CSI-IMR) or a CSI-IM resource. The terminal device 2 may measure an interference signal by using a zero power CSI reference signal included in a CSI-IM resource in order to calculate a value of a CQI. A downlink reference signal which is dedicatedly configured for each terminal device 2 is referred to as a terminal device-specific reference signal (UE-specific reference signal (UERS)), a dedicated reference signal, or a downlink demodulation reference signal (DL DMRS), and is used for demodulating the physical downlink control channel or the physical downlink shared channel.

A sequence of the downlink reference signals may be generated based on a pseudo-random sequence. The sequence of the downlink reference signals may be generated based on a Zadoff-Chu sequence. The sequence of the downlink reference signals may be generated based on a Gold sequence. The sequence of the downlink reference signals may be generated based on changes or modifications of the pseudo-random sequence, the Zadoff-Chu sequence, or the Gold sequence.

The physical downlink shared channel (PDSCH) is used for transmitting downlink data (DL-SCH). The PDSCH is also used in a case where system information is transmitted over the DL-SCH. Radio resource assignment information of the physical downlink shared channel is indicated by the physical downlink control channel. The PDSCH is also used for notifying of a parameter (information element or RRC message) regarding the downlink and the uplink.

The physical downlink control channel (PDCCH) is transmitted in some OFDM symbols from the leading of each subframe, and is used for notifying the terminal device 2 of resource assignment information or an adjustment amount of an increase or a decrease in a transmit power based on the scheduling of the base station apparatus 1. The terminal device 2 needs to monitor a physical downlink control channel of the terminal device before Layer 3 message (paging, handover command, or RRC message) is transmitted and received and to acquire resource assignment information which is called an uplink grant at the time of transmission or a downlink grant (also referred to as a downlink assignment) at the time of reception from the physical downlink control channel of the terminal device. The physical downlink control channel may be transmitted in the above-described OFDM symbols, and may also be transmitted in a region of resource blocks which are dedicatedly allocated to the terminal device 2 from the base station apparatus 1. The physical downlink control channel transmitted in the region of the resource blocks which are dedicatedly allocated to the terminal device 2 from the base station apparatus 1 may also be referred to as an enhanced physical downlink control channel (EPDCCH: Enhanced PDCCH). The PDCCH transmitted in the above-described OFDM symbols may also be referred to as a first control channel. The EPDCCH may also be referred to as a second control channel. A resource region to which the PDCCH is able to be allocated may also be referred to as a first control channel region, and a resource region to which the EPDCCH is able to be allocated may also be referred to as a second control channel region. It is assumed that a PDCCH to be described below basically includes an EPDCCH.

The base station apparatus 1 may transmit a PCFICH, a PHICH, a PDCCH, an EPDCCH, a PDSCH, a synchronization signal (PSS/SSS), or a downlink reference signal in a DwPTS of a special subframe. The base station apparatus 1 may not transmit a PBCH in the DwPTS of the special subframe.

The terminal device 2 may transmit the PRACH and the SRS in an UpPTS of the special subframe. The terminal device 2 may not transmit the PUCCH, the PUSCH, and the DMRS in the UpPTS of the special subframe.

In a case where the special subframe includes only a GP and an UpPTS, the terminal device 2 may transmit the PUCCH and/or the PUSCH and/or the DMRS in the UpPTS of the special subframe.

Here, the terminal device 2 monitors a set of PDCCH candidates and/or EPDCCH candidates. Hereinafter, for the sake of simplicity in description, a PDCCH may include an EPDCCH. The PDCCH candidate indicates a candidate having a possibility that the PDCCH will be mapped or transmitted by the base station apparatus 1. The PDCCH candidate includes one or a plurality of control channel elements (CCEs). The monitoring may include a case where the terminal device 2 attempts to decode each of PDCCHs within a set of PDCCH candidates depending on all DCI formats to be monitored.

Here, the set of PDCCH candidates monitored by the terminal device 2 is also referred to as a search space. The search space refers to a set of resources having a possibility that the resources will be used for transmitting the PDCCH by the base station apparatus 1. A common search space (CSS) and a terminal device-specific search space (UE-specific search space (USS)) are included (defined or configured) in the PDCCH region.

The CSS is used for transmitting downlink control information to a plurality of terminal devices 2. That is, the CSS is defined by a common resource for the plurality of terminal devices 2. The USS is used for transmitting the downlink control information to a certain specific terminal device 2. That is, the USS is dedicatedly configured for the certain specific terminal device 2. The USS may be configured for the plurality of terminal devices 2.

Downlink control information (DCI) is transmitted to the terminal device 2 from the base station apparatus 1 in a specific format (structure or form). This format may be referred to as a DCI format. Transmission of the DCI format includes a case where DCI having a certain format is transmitted. The DCI format may be described as a format for transmitting the DCI. As the DCI format transmitted to the terminal device 2 from the base station apparatus 1, a plurality of formats is prepared (for example, DCI format 0/1/1A/1B/1C/1D/2/2A/2B/2C/2D/3/3A/4). Fields (bit fields) corresponding to various downlink control information items are set for the DCI format.

The base station apparatus 1 transmits a common DCI (single DCI) in a PDCCH (or EPDCCH) CSS in a case where the common DCI is transmitted to the plurality of terminal devices 2 in a certain DCI format, and transmits the DCI in a PDCCH (or EPDCCH) USS in a case where the DCI is dedicatedly transmitted to each of the terminal devices 2 in a certain DCI format.

As the DCI transmitted in the DCI format, there are resource assignment of the PUSCH or a PDSCH, a modulation and coding scheme, a sounding reference signal request (SRS request), a channel state information request (CSI request), an indication of initial transmission or retransmission of a single transport block, a transmit power control command for the PUSCH, a transmit power control command for the PUCCH, cyclic shift of an UL DMRS, and an index of an orthogonal code cover (OCC). In addition, various DCI items are defined by the specifications.

A format used in uplink transmission control (for example, scheduling of the PUSCH or the like) may be referred to as an uplink DCI format (for example, DCI format 0/4) or DCI associated with an uplink. The uplink transmission control may be referred to as an uplink grant (uplink grant). A format used in downlink reception control (for example, scheduling of a PDSCH or the like) may be referred to as a downlink DCI format (for example, DCI format 1/1A/1B/1C/1D/2/2A/2B/2C/2D) or DCI associated with a downlink. The downlink reception control may be referred to as a downlink grant, downlink assignment, or downlink allocation. A format used for adjusting a transmit power of each of the plurality of terminal devices 2 may be referred to as a group triggering DCI format (for example, DCI format 3/3A).

For example, DCI format 0 is used for transmitting information regarding resource assignment of the PUSCH which is required for scheduling one PUSCH in one serving cell, information regarding a modulation scheme, or information regarding a transmit power control (TPC) command for the PUSCH. These DCI items are transmitted over a PDCCH/EPDCCH. The DCI format may include at least one DCI item.

The terminal device 2 monitors PDCCHs in a CSS and/or a USS of a PDCCH region, and detects a PDCCH of the terminal device.

An RNTI allocated to the terminal device 2 by the base station apparatus 1 is used for transmitting downlink control information (transmission over the PDCCH). Specifically, a cyclic redundancy check (CRC) parity bit is added to the DCI format (may be downlink control information), and then, the CRC parity bit is scrambled using the RNTI after the CRC parity bit is added.

The terminal device 2 attempts to decode a DCI format to which the CRC parity bit scrambled using the RNTI is added, and detects a DCI format in which the CRC has succeeded as the DCI format of the terminal device (may also be referred to blind decoding). That is, the terminal device 2 attempts to decode a PDCCH with the CRC scrambled using the RNTI, and detects a PDCCH in which the CRC has failed as the PDCCH of the terminal device.

Here, the RNTI includes a cell-radio network temporary identifier (C-RNTI). The C-RNTI is a unique identifier used for identifying RRC connection and scheduling. The C-RNTI is used for uni-cast transmission to be dynamically scheduled.

The RNTI includes a temporary C-RNTI. The temporary C-RNTI is an identifier used for a random access procedure. For example, the terminal device 2 may decode the DCI format (for example, DCI format 0) to which the CRC scrambled using the temporary C-RNTI is added and which is associated with the uplink only in the CSS. The terminal device 2 may attempt to decode the DCI format (for example, DCI format 1A) to which the CRC scrambled using the temporary C-RNTI is added and which is associated with the downlink, in the CSS and the USS.

The base station apparatus 1 may add a CRC parity bit scrambled using the temporary C-RNTI or the C-RNTI to the DCI (DCI format) in a case where the DCI is transmitted in the CSS, and may add CRC scrambled using the C-RNTI to the DCI (DCI format) in a case where the DCI is transmitted in the USS.

A physical uplink shared channel (PUSCH) is primarily used for transmitting uplink data and uplink control information (UCI). The UCI transmitted on a PUSCH includes channel state information (CSI), and/or ACK/NACK. The CSI transmitted over a PUSCH includes aperiodic CSI (A-CSI) and periodic CSI (P-CSI). Similarly to the case of the downlink, resource assignment information of the physical uplink shared channel is indicated by a physical downlink control channel. The uplink data is transmitted over the PUSCH scheduled using a dynamic scheduling grant. Information (for example, identification information of the terminal device 2 or Message 3) of the base station apparatus which is associated with random access is transmitted over the PUSCH scheduled using a random access response grant. Parameters used for setting a transmit power for transmission over the PUSCH may be different depending on the type of the detected grant. Control data is transmitted in the form of channel quality information (CQI and/or PMI), HARQ-ACK information (HARQ-ACK or HARQ-ACK response), and RI. That is, the control data is transmitted in the form of uplink control information.

The physical uplink control channel (PUCCH) is used for notifying of a reception acknowledgement response (acknowledgement/negative acknowledgement (ACK/NACK)) of downlink data transmitted over a physical downlink shared channel, notifying of channel information (channel state information) of the downlink, and performing a scheduling request (SR) which is a resource assignment request (radio resource request) of the uplink. Channel state information (CSI) includes a channel quality indicator (CQI), a precoding matrix indicator (PMI), a precoding type indicator (PTI), and a rank indicator (RI). Although each indicator may be described as indication, the purpose of use and the meaning of the indication is the same as those of the indicator. A format of the PUCCH may be switched depending on the transmitted UCI. For example, in a case where the UCI includes HARQ-ACK information and/or SR, the UCI may be transmitted over a PUCCH of a format 1/1a/1b/3 (PUCCH format 1/1a/1b/3). In a case where the UCI includes the CSI, the UCI may be transmitted over a PUCCH of a format 2/2a/2b (PUCCH format 2/2a/2b). As the PUCCH format 1/1a/1b, there are a shortened format which is punctured as many as one symbol and a normal format which is not punctured as many as one symbol in order to avoid collision with the SRS. For example, in a case where simultaneous transmission of the PUCCH and the SRS in the same subframe is available, the PUCCH format 1/1a/1b in a SRS subframe is transmitted in the shortened format. In a case where simultaneous transmission of the PUCCH and the SRS in the same subframe is not available, the PUCCH format 1/1a/1b in the SRS subframe is transmitted in the normal format. Here, even when transmission of the SRS occurs, the SRS may not be transmitted.

As a CSI report, there are periodic CSI reporting for reporting channel state information in a periodical manner or in a case where an event condition for triggering the CSI reporting is satisfied or aperiodic CSI reporting for reporting the channel state information in a case where the CSI reporting is requested by the CSI request included in the DCI format. The periodic CSI reporting is performed over the PUCCH or the PUSCH, and the aperiodic CSI reporting is performed over the PUSCH. In a case where an indication is transmitted based on information (CSI request) included in the DCI format, the terminal device 2 may transmit CSI without the uplink data over the PUSCH.

The uplink reference signal (UL-RS) includes a demodulation reference signal (DMRS) used by the base station apparatus 1 in order to demodulate the physical uplink control channel PUCCH and/or the physical uplink shared channel PUSCH and a sounding reference signal (SRS) used by the base station apparatus 1 in order to primarily estimate a channel state of the uplink. As the sounding reference signal, there are a periodic sounding reference signal (P-SRS) configured such that the sounding reference signal is periodically transmitted by the higher layer and an aperiodic sounding reference signal (A-SRS) of which the transmission is requested by the SRS request included in the downlink control information format. The uplink reference signal may also be referred to as an uplink pilot signal or an uplink pilot channel.

A sequence of the uplink reference signals may be generated based on a pseudo-random sequence. The sequence of the uplink reference signals may be generated based on a Zadoff-Chu sequence. The sequence of the uplink reference signals may be generated based on a Gold sequence. The sequence of the uplink reference signals may be generated based on changes or modifications of the pseudo-random sequence, the Zadoff-Chu sequence, or the Gold sequence.

The periodic sounding reference signal may also be referred to as a periodic sounding reference signal and a Trigger Type 0 sounding reference signal (Trigger Type 0 SRS). The aperiodic sounding reference signal may also be referred to as an aperiodic sounding reference signal and a Trigger Type 1 sounding reference signal (Trigger Type 1 SRS).

The A-SRS may be classified into a signal (for example, may also be referred to as a Trigger Type 1a SRS) specialized for estimating an uplink channel and a signal (for example, may also be referred to as a Trigger Type 1b SRS) used for causing the base station apparatus 1 to measure a channel state (CSI, CQI, PMI, or RI) by using channel reciprocity in TDD in coordinated communication. The DMRS is configured so as to correspond to each of the PUSCH and the PUCCH. The DMRS is time-multiplexed in the same subframe as that of the PUSCH or the PUCCH, and is transmitted.

The time multiplexing method of the DMRS may be different between the PUSCH and the PUCCH. For example, the DMRS for the PUSCH is mapped to only one symbol within one slot including seven symbols, whereas the DMRS for the PUCCH is mapped to three symbols within one slot including seven symbols.

As the SRS, various parameters (a bandwidth, a cyclic shift, and a transmission subframe) are notified through higher layer signaling. As the SRS, a subframe in which the SRS is transmitted is determined based on information regarding a transmission subframe which is included in the configuration of the SRS and is notified through the higher layer signaling. As the information regarding the transmission subframe, there are information (shared information) configured so as to be specific to the cell and information (dedicated information or individual information) configured so as to be specific to the terminal device. The information configured so as to be specific to the cell includes information indicating a subframe in which the SRS shared by all the terminal devices 2 within the cell is transmitted.

The information configured so as to be specific to the terminal device includes information indicating periodicity and a subframe offset which functions as a subset of the subframe configured so as to be specific to the cell. The terminal device 2 may determine a subframe (may also be referred to as a SRS subframe or a SRS transmission subframe) in which the SRS is able to be transmitted based on these information items. In a case where the PUSCH is transmitted in the subframe in which the SRS configured so as to be specific to the cell is transmitted, the terminal device 2 may puncture as many time resources of the PUSCH as symbols in which the SRS is transmitted, and may transmit the PUSCH in the punctured time resources. Thus, it is possible to avoid the collision of the PUSCH transmission with the SRS transmission between the terminal devices 2. It is possible to prevent a deterioration in performance of the terminal device 2 which transmits the PUSCH. It is possible to ensure channel estimation accuracy in the terminal device 2 which transmits the SRS. Here, the information configured so as to be specific to the terminal device may be independently configured of the P-SRS and the A-SRS.

For example, in a case where various parameters are configured through the higher layer signaling, a first uplink reference signal is periodically transmitted based on the configured transmission subframe. In a case where a transmission request is indicated by a field (SRS request) regarding a transmission request of a second uplink reference signal included in the downlink control information format, the second uplink reference signal is aperiodically transmitted. In a case where an SRS request included in a certain downlink control information format indicates a positive index (value) or an index (value) equivalent to the positive index (value), the terminal device 2 transmits the A-SRS in a prescribed transmission subframe. In a case where the detected SRS request indicates a negative index (value) or an index (value) equivalent to the negative index (value), the terminal device 2 does not transmit the A-SRS in the prescribed subframe. The information (shared parameter or shared information) configured so as to be specific to the cell is notified using system information or a dedicated control channel (DCCH). The information (dedicated parameter, individual parameter, dedicated information, or individual information) configured so as to be specific to the terminal device is notified using a common control channel (CCCH). These information items may be notified using an RRC message. The RRC message may be notified by the higher layer.

A physical random access channel (PRACH) is a channel used for notifying of a preamble sequence, and has a guard time. The preamble sequence expresses 6-bit information by using 64 types of sequences. The physical random access channel is used for causing the terminal device 2 to access the base station apparatus 1. The terminal device 2 uses the physical random access channel in order to request a radio resource when the physical uplink control channel is not configured in response to the scheduling request (SR) or in order to request transmission timing alignment information (also referred to timing advance (TA)) necessary to match an uplink transmission timing and a reception timing window of the base station apparatus from the base station apparatus 1.

Specifically, the terminal device 2 transmits a preamble sequence by using a radio resource for the physical random access channel which is configured by the base station apparatus 1. The terminal device 2 that receives the transmission timing alignment information configures a transmission timing timer which counts an available time of the transmission timing alignment information which is commonly configured by the broadcast information (or which is individually configured by the layer 3 message), and manages a state of the uplink by setting a period of time during the available time (during the counting) of the transmission timing timer as a transmission timing aligned state and a period of time (during stopping) other than an available period of time as a transmission timing non-aligned state (transmission timing un-aligned state). The layer 3 message is a message of a control-plane (C-plane) which is transmitted and received in a radio resource control (RRC) layer between the terminal device 2 and the base station apparatus 1, and is used as the same meaning as that of the RRC signaling or the RRC message. The RRC signaling may also be referred to higher layer signaling or dedicated signaling.

The random access procedure includes two random access procedures including a contention based random access procedure and a non-contention based random access procedure. The contention based random access procedure is a random access in which there is a possibility that collision will occur between the plurality of terminal devices 2.

The non-contention based random access procedure is a random access in which collision does not occur between the plurality of terminal devices 2.

The non-contention based random access procedure is formed from three steps, and the random access preamble assignment is notified to the terminal device 2 from the base station apparatus 1 through the dedicated signaling of the downlink. Here, the base station apparatus 1 assigns a non-contention random access preamble to the terminal device 2, and the random access preamble assignment is transmitted by a source base station apparatus (source eNB) at the time of handover and is signaled by a handover command generated by a target base station apparatus (target eNB) or the PDCCH in the case of downlink data arrival.

The terminal device 2 that receives the random access preamble assignment transmits a random access preamble (Message 1) over the RACH in the uplink. In this case, the terminal device 2 transmits the assigned non-contention random access preamble.

The base station apparatus 1 that receives the random access preamble transmits a random access response using the downlink data (downlink shared channel (DL-SCH)) to the terminal device 2. Information transmitted using the random access response includes an initial uplink grant (random access response grant) and timing alignment information for the handover and timing alignment information and a random access preamble identifier for the downlink data arrival. The downlink data may also be referred to downlink shared channel data (DL-SCH data).

Here, the non-contention based random access procedure is applied to handover, downlink data arrival, and positioning. The contention based random access procedure is applied to initial access from RRC_IDLE, reestablishment of RRC connection, handover, downlink data arrival, and uplink data arrival.

The random access procedure according to the present embodiment is the contention based random access procedure. An example of the contention based random access procedure will be described.

The terminal device 2 acquires system information block type 2 (SIB2) transmitted by the base station apparatus 1. The SIB2 is a common configuration (common information) for all the terminal devices 2 (or the plurality of terminal devices 2) within the cell. For example, the common configuration includes a configuration of the PRACH.

The terminal device 2 randomly selects the number of the random access preamble. The terminal device 2 transmits a random access preamble (Message 1) of the selected number to the base station apparatus 1 by using the PRACH. The base station apparatus 1 estimates a transmission timing of the uplink by using the random access preamble.

The base station apparatus 1 transmits a random access response (Message 2) by using the PDSCH. The random access response includes a plurality of information items for the random access preamble detected by the base station apparatus 1. For example, the plurality of information items includes the number of the random access preamble, the temporary C-RNTI, a timing advance command (TA command), and a random access response grant.

The terminal device 2 transmits (initially transmits) the uplink data (Message 3) over the PUSCH scheduled using the random access response grant. The uplink data includes an identifier (initial UE-identity or information indicating the C-RNTI) for identifying the terminal device 2.

In a case where the decoding of uplink data fails, the base station apparatus 1 indicates the retransmission of the uplink data by using the DCI format to which the CRC parity bit scrambled using the temporary C-RNTI is added. In a case where the retransmission of the uplink data is indicated by the DCI format, the terminal device 2 retransmits the same uplink data over the PUSCH scheduled using the DCI format to which the CRC parity bit scrambled using the temporary C-RNTI is added.

In a case where the decoding of the uplink data fails, the base station apparatus 1 may indicate the retransmission of the uplink data by using the PHICH (NACK). In a case where the retransmission of the uplink data is indicated using the NACK, the terminal device 2 retransmits the same uplink data over the PUSCH.

The base station apparatus 1 succeeds in decoding the uplink data, and acquires the uplink data. As a result, the base station apparatus is able to recognize the terminal devices 2 that transmits the random access preamble and the uplink data. That is, before the decoding of the uplink data succeeds, the base station apparatus 1 is not able to recognize the terminal device 2 that transmits the random access preamble and the uplink data.

In a case where Message 3 including the initial UE-identity is received, the base station apparatus 1 transmits a contention resolution identity (Message 4) generated based on the received initial UE-identity to the terminal device 2 by using the PDSCH. In a case where the received contention resolution identity matches the transmitted initial UE-identity, the terminal device 2 regards the contention resolution of the random access preamble as succeeding (1), sets the value of the temporary C-RNTI to the C-RNTI (2), discards the temporary C-RNTI (3), and regards the random access procedure as being correctly completed (4).

In a case where Message 3 including information indicating the C-RNTI is received, the base station apparatus 1 transmits the DCI format (Message 4) to which the CRC parity bit scrambled using the received C-RNTI is added to the terminal device 2. In a case where the DCI format to which the CRC parity bit scrambled using the C-RNTI is added is decoded, the terminal device 2 regards the contention resolution of the random access preamble as succeeding (1), discards the temporary C-RNTI (2), and regards the random access procedure as being correctly completed (3).

That is, the base station apparatus 1 schedules the PUSCH by using the random access response grant as a part of the contention based random access procedure.

The terminal device 2 transmits the uplink data (Message 3) over the PUSCH scheduled using the random access response grant. That is, the terminal device 2 performs transmission over the PUSCH corresponding to the random access response grant, as a part of the contention based random access procedure.

The base station apparatus 1 schedules the PUSCH by using the DCI format to which the CRC scrambled using the temporary C-RNTI is added, as a part of the contention based random access procedure. The base station apparatus 1 performs scheduling/indication of transmission on the PUSCH by using a PHICH (NACK), as a part of the contention based random access procedure.

The terminal device 2 transmits (retransmits) the uplink data (Message 3) over the PUSCH scheduled using the DCI format to which the CRC scrambled using the temporary C-RNTI is added. The terminal device 2 transmits (retransmits) the uplink data (Message 3) over the scheduled PUSCH in response to the reception of the PHICH. That is, the terminal device 2 performs transmission over the PUSCH corresponding to the retransmission of the same uplink data (transport block), as a part of the contention based random access procedure.

Hereinafter, a logical channel will be described. The logical channel is used for transmitting the RRC message or the information element. The logical channel is transmitted over the physical channel through the transport channel.

A broadcast control channel (BCCH) is a logical channel used for broadcasting system control information. For example, system information or information required for initial access is transmitted using this channel. A master information block (MIB) or system information block type 1 (SIB1) is transmitted using this logical channel.

A common control channel (CCCH) is a logical channel used for transmitting control information between a network and a terminal device which does not establish the RRC connection with the network. For example, terminal-specific control information or configuration information is transmitted using this logical channel.

A dedicated control channel (DCCH) is a logical channel used for transmitting dedicated control information (individual control information) between the terminal device 2 that establishes the RRC connection and the network in a bi-directional manner. For example, cell-specific reconfiguration information is transmitted using this logical channel.

Signaling using a CCCH or a DCCH may be generally referred to RRC signaling.

Information regarding uplink power control includes information notified as the broadcast information, information notified as information (shared information) shared between terminal devices 2 within the same cell, and information notified as terminal device-specific dedicated information. The terminal device 2 sets a transmit power based on only the information notified as the broadcast information, or based on the information notified as the broadcast information/shared information and the information notified as the dedicated information.

Radio resource control configuration shared information may be notified as the broadcast information (or the system information). The radio resource control configuration shared information may be notified as the dedicated information (mobility control information).

A radio resource configuration includes a random access channel (RACH) configuration, a broadcast control channel (BCCH) configuration, a paging control channel (PCCH) configuration, a physical random access channel (PRACH) configuration, a physical downlink shared channel (PDSCH) configuration, a physical uplink shared channel (PUSCH) configuration, a physical uplink control channel (PUCCH) configuration, a sounding reference signal (SRS) configuration, a configuration relating to the uplink power control, and a configuration relating to an uplink cyclic prefix length. That is, the radio resource configuration is configured for notifying of a parameter used for generating the physical channel/physical signal. Parameters (information elements) to be notified may be different between a case where a parameter is notified as the broadcast information and a case where a parameter is notified as the reconfiguration information.

Information elements required for configuring the parameters relating to various physical channels/physical signals (PRACH, PUCCH, PUSCH, SRS, UL DMRS, CRS, CSI-RS, PDCCH, PDSCH, PSS/SSS, UERS, PBCH, and PMCH) include shared configuration information shared between the terminal devices 2 within the same cell and dedicated configuration information configured for each terminal device 2. The shared configuration information may be transmitted using the system information. In a case where reconfiguration is performed, the shared configuration information may be transmitted as the dedicated information. These configurations include a configuration of a parameter. The configuration of the parameter includes a configuration of a value of the parameter. In a case where the parameters are managed in the form of table, the configuration of the parameter includes a configuration of a value of an index.

Information regarding the parameter of the physical channel is transmitted to the terminal device 2 by using the RRC message. That is, the terminal device 2 configures the resource assignment or transmit power of each physical channel based on the received RRC message. As the RRC message, there are a message relating to the broadcast channel, a message relating to the multicast channel, a message relating to a paging channel, a message relating to each channel of the downlink, and a message relating to each channel of the uplink. Each RRC message may include an information element (IE). The information element may include information equivalent to the parameter. The RRC message may also be referred to as a message. A message class is a set of one or more messages. The message may include the information element. As the information element, there are an information element relating to radio resource control, an information element relating to security control, an information element relating to mobility control, an information element relating to measurement, and an information element relating to a multimedia broadcast multicast service (MBMS). The information element may include a lower information element. The information element may be configured as the parameter. The information element may be defined as control information indicating one or more parameters.

The information element (IE) is used for defining (designating or configuring) parameters for the system information (SI) or various channels/signals/information items in dedicated signaling. A certain information element includes one or more fields. The information element may include one or more information elements. A field included in the information element may also be referred to as a parameter. That is, the information element may include one or more types of parameters (one or more parameters). The terminal device 2 performs radio resource assignment control, uplink power control, or transmission control based on various parameters. The system information may be defined as the information element.

The information element may be configured for a field constituting the information element. The parameter may be configured for the field constituting the information element.

The RRC message includes one or more information elements. The RRC message to which a plurality of RRC messages is set is referred to as a message class.

As parameters which are notified to the terminal device 2 by using the system information and are related to the uplink transmit power control, there are a standard power for the PUSCH, a standard power for the PUCCH, a pathloss compensation coefficient α, a list of power offsets configured for each PUCCH format, and a power offset of a preamble and Message 3. As parameters which are notified to the terminal device 2 by using the system information and are related to the random access channel, there are a parameter relating to the preamble, a parameter relating to the transmit power control of the random access channel, and a parameter relating to the transmission control of the random access preamble. These parameters are used at the time of the initial access or at the time of reconnection/reestablishment after radio link failure (RLF) occurs.

Information used for configuring the transmit power may be notified to the terminal device 2, as the broadcast information. Information for configuring the transmit power may be notified to the terminal device 2, as the shared information. Information for configuring the transmit power may be notified to the terminal device 2, as the dedicated information (individual information).

First Embodiment

Hereinafter, a first embodiment of the present invention will be described. A communication system according to the first embodiment of the present invention includes a primary base station apparatus (referred to as a macro base station apparatus, a first base station apparatus, a first communication apparatus, a serving base station apparatus, an anchor base station apparatus, a master base station apparatus, a first access point, a first point, a first transmission point, a first reception point, a macrocell, a first cell, a primary cell, a master cell, or a master small cell) as the base station apparatus 1 (hereinafter, referred to as an access point, a point, a transmission point, a reception point, a cell, a serving cell, a transmission device, a reception device, a transmission station, a reception station, a transmit antenna group, a transmit antenna port group, a receive antenna group, a receive antenna port group, a communication apparatus, a communication terminal, and eNodeB). The primary cell and the master cell (master small cell) may be independently provided. The communication system according to the first embodiment may include a secondary base station apparatus (referred to as a remote radio head (RRH), a remote antenna, an overhang antenna, a distributed antenna, a second access point, a second point, a second transmission point, a second reception point, a reference node, a low power base station apparatus (low power node (LPN)), a micro base station apparatus, a pico base station apparatus, a femto base station apparatus, a small base station apparatus, a local area base station apparatus, a phantom base station apparatus, a home (indoor) base station apparatus (Home eNodeB, Home NodeB, HeNB, or HNB), a second base station apparatus, a second communication apparatus, a coordinated base station apparatus group, a coordinated base station apparatus set, a coordinated base station apparatus, a microcell, a picocell, a femtocell, a small cell, a phantom cell, a local area, a second cell, or a secondary cell). The communication system according to the first embodiment may include a terminal device 2 (hereinafter, referred to as a mobile station, a mobile station apparatus, a mobile terminal, a reception device, a transmission device, a reception terminal, a transmission terminal, a third communication device, a receive antenna group, a receive antenna port group, a transmit antenna group, a transmit antenna port group, a user device, or a user terminal (UE: User Equipment). Here, the secondary base station apparatus may be described as a plurality of secondary base station apparatuses. For example, the primary base station apparatus and the secondary base station apparatus may communicate with the terminal device by using heterogeneous network arrangement in which a portion or the whole of the coverage of the secondary base station apparatus is included in the coverage of the primary base station apparatus.

The communication system according to the first embodiment includes the base station apparatus 1 and the terminal device 2. A single base station apparatus 1 may manage one or more terminal devices 2. The single base station apparatus 1 may manage one or more cells (serving cell, primary cell, secondary cell, femtocell, picocell, small cell, or phantom cell). The single base station apparatus 1 may manage one or more frequency bands (component carriers or carrier frequencies). The single base station apparatus 1 may manage one or more low power base station apparatuses (low power nodes (LPN)). The single base station apparatus 1 may manage one or more home (indoor) base station apparatuses (Home eNodeB (HeNB)). The single base station apparatus 1 may manage one or more access points. Base station apparatuses 1 may be connected to each other using a wired (an optical fiber, a copper wire, or a coaxial cable) or wireless (an X2 interface, an X3 interface, or an Xn interface) manner. That is, a plurality of base station apparatuses 1 may communicate with each other at a high speed (without delay) by using an optical fiber (ideal backhaul), or may communicate with each other at a low speed through the X2 interface (non ideal backhaul). In this case, various information items (configuration information or channel state information (CSI), function information (UE capability) of the terminal device 2, or information for handover) of the terminal device 2 may be communicated. The plurality of base station apparatuses 1 may be managed over the network. The single base station apparatus 1 may manage one or more relay station apparatus (Relay).

The communication system according to the first embodiment may realize coordinated communication (Coordination Multiple Points (CoMP)) in a plurality of base station apparatuses, low power base station apparatuses, or home base station apparatuses. That is, the communication system according to the first embodiment may perform dynamic point selection (DPS) for dynamically switching a point (transmission point and/or reception point) communicating with the terminal device 2. The communication system according to the first embodiment may perform coordinated scheduling (CS) or coordinated beamforming (CB). The communication system according to the first embodiment may perform joint transmission (JT) or joint reception (JR).

A plurality of low power base station apparatuses or small cells which are disposed so as to be close to each other may be clustered (grouped). The plurality of clustered low power base station apparatuses may notify of the same configuration information. An area (coverage) of the clustered small cells may also be referred to as a local area.

In downlink transmission, the base station apparatus 1 may also be referred to as a transmission point (TP). In uplink transmission, the base station apparatus 1 may also be referred to as a reception point (RP). The downlink transmission point and the uplink reception point may function as a pathloss reference point (reference point) for measuring downlink pathloss. The reference point for measuring pathloss may be configured independently of the transmission point and the reception point.

The small cell, the phantom cell, or the local area cell may be configured as a third cell. The small cell, the phantom cell, or the local area cell may be reconfigured as the primary cell. The small cell, the phantom cell, or the local area cell may be reconfigured as the secondary cell. The small cell, the phantom cell, or the local area cell may be reconfigured as the serving cell. The small cell, the phantom cell, or the local area cell may be included in the serving cell.

The base station apparatus 1 capable of constituting the small cell may perform discrete reception (DRX) or discrete transmission (DTX), if necessary. The base station apparatus 1 capable of constituting the small cell may intermittently or semi-statically turn on or off power supplies of some apparatuses (for example, transmission units or reception units).

Independent identifiers (identities (IDs)) may be configured for the base station apparatuses 1 constituting the macrocell and the base station apparatuses 1 constituting the small cell. That is, identifiers of the macrocell and the small cell may be independently configured. For example, in a case where cell-specific reference signals (CRSs) are transmitted from the macrocell and the small cell, even when transmission frequencies are the same as each other and radio resources are the same as each other, scrambling may be performed by using different identifiers. The cell-specific reference signal for the macrocell may be scrambled using a physical layer cell ID (physical layer cell identity (PCI)), and the cell-specific reference signal for the small cell may be scrambled using a virtual cell ID (virtual cell identity (VCI)). Scrambling may be performed in the macrocell by using the physical layer cell ID (physical layer cell identity (PCI)), and scrambling may be performed in the small cell by using a global cell ID (global cell identity (GCI)). Scrambling may be performed in the macrocell by using a first physical layer cell ID, and scrambling may be performed in the small cell by using a second physical layer cell ID. Scrambling may be performed in the macrocell by using a first virtual cell ID, and scrambling may be performed in the small cell by using a second virtual cell ID. Here, the virtual cell ID may be an ID configured for a physical channel/physical signal. The virtual cell ID may be an ID which is configured independently of the physical layer cell ID. The virtual cell ID may be an ID used for scrambling a sequence used in the physical channel/physical signal.

Some of physical channels/physical signals may not be transmitted in a small cell, or a serving cell configured as the small cell, or a component carrier corresponding to a small cell. For example, a cell-specific reference signal (CRS) or a physical downlink control channel (PDCCH) may be not transmitted. A new physical channel/physical signal may be transmitted in the small cell, the serving cell configured as the small cell, or the component carrier component carrier corresponding to the small cell.

Hereinafter, a structure of one or a plurality of HARQ-ACK feedback bits $\{o^{ACK}_{c,0}, o^{ACK}_{c,1}, \ldots, o^{ACK}_{c,oACKc-1}\}$ will be described.

The HARQ-ACK bit is received in each subframe of each cell from the higher layer. Each positive response (ACK) is encoded as a bit value '1', and each negative response (NACK) is encoded as a bit value '0'. In a case where the HARQ-ACK bit is used for transmitting HARQ-ACK feedback information for which PUCCH format 3 is configured in the higher layer, the HARQ-ACK feedback is constituted by coupling the HARQ-ACK bits of the respective serving cells. 1-bit HARQ-ACK information $a_k$ is used in the cell for which transmission mode 1, 2, 5, 6, or 7 such as one code word transmission mode is configured. 2-bit HARQ-ACK information $a_{k,ak+1}$ is used in the cell for which other transmission modes, that is, two or more code word transmission modes are configured. Here, $a_k$ corresponds to Code word 0, and $a_{k+1}$ corresponds to Code word 1.

Areas are individually configured for the plurality of HARQ-ACK feedback bits $\{o^{ACK}_{c,0}, o^{ACK}_{c,1}, \ldots, o^{ACK}_{c,oACKc-1}\}$ by the serving cell c.

The HARQ-ACK feedback bits of the serving cells c are rearranged in the bit sequence of the HARQ-ACK feedback bits aggregated in all the serving cells before these bits are encoded. The HARQ-ACK feedback bits aggregated in all the serving cells are assigned in ascending order of indices of the serving cells. The plurality of HARQ-ACK feedback bits of the respective serving cells are assigned in ascending order of DAI values included in the received downlink grant.

Hereinafter, HARQ processes will be described.

A retransmission process of the PDSCH is an asynchronous HARQ and retransmission timings of the downlink subframe and the PDSCH are independently configured. Thus, a HARQ process number is used in order to associate the initial-transmission PDSCH with the retransmission PDSCH. The base station apparatus 1 notifies the terminal device 2 of the HARQ process number by using the DCI included in the PDCCH indicating the retransmission PDSCH. The terminal device 2 performs HARQ combination on the retransmission PDSCH and the PDSCH associated with the HARQ process number stored in a buffer by using the HARQ process number included in the DCI. As the HARQ combination, chase combining (CC) or incremental redundancy (IR) are used. The number of maximum downlink HARQ processes is 8 in FDD and is maximally 15 in TDD. The bit field of the DCI for notifying the HARQ process number is configured as 3 bits in the FDD cell or 4 bits in TDD according to the number of maximum downlink HARQ processes.

Hereinafter, a process or a configuration relating to a PUCCH resource of HARQ-ACK information will be described. The HARQ-ACK information includes response information for PDSCH transmission which is indicated by detection of the control channel and response information for the control channel including control information indicating the releasing (end) of the semi-persistent scheduling (SPS). The HARQ-ACK information indicates ACK indicating that the signal is normally received, NACK indicating that the signal is not normally received, and/or DTX indicating that the signal is not transmitted (is not received).

The terminal device 2 transmits the HARQ-ACK information to the base station apparatus 1 through the PUCCH and/or PUSCH. The base station apparatus 1 receives the HARQ-ACK information from the terminal device 2 through the PUCCH and/or PUSCH. Thus, the base station apparatus 1 recognizes whether or not the terminal device 2 correctly receives the PDSCH or the control channel.

Hereinafter, the PUCCH resource set by the base station apparatus 1 will be described. The HARQ-ACK information is spread in a SC-FDMA sample region by using pseudo constant-amplitude zero-autocorrelation (CAZAC) sequence which is cyclically shifted, and is spread into 4 SC-FDMA symbols within a slot by using an orthogonal cover code (OCC) of which a code length is 4. Symbols spread by two codes are mapped on two RBs having different frequencies. As stated above, the PUCCH resource is defined by three elements of the cyclic shift amount, an orthogonal code, and/or the mapped RB. The cyclic shift in the SC-FDMA sample region may be expressed by phase rotation which is equally increased in the frequency domain.

An uplink control channel region (PUCCH region) used in the transmission of the PUCCH is a prescribed number of RB pairs, and is constituted by using RB pairs at both ends of an uplink system bandwidth. A physical resource used in the transmission of the PUCCH includes two RBs having different frequencies in a first slot and in a second slot. The physical resource used in the transmission of the PUCCH is represented by m (m=0, 1, 2, . . . ). One PUCCH is allocated to any physical resource used in the transmission of the PUCCH. Thus, since one PUCCH is transmitted by using resources having different frequencies, a frequency diversity effect is obtained.

The PUCCH resource (uplink control channel logical resource) which is a resource used for transmitting the PUCCH is defined by using an orthogonal code, a cyclic shift amount, and/or a frequency resource. For example, a PUCCH resource in a case where it is assumed that three orthogonal codes of OC0, OC1, and OC2, six cyclic shift amounts of CS0, CS2, CS4, CS6, CS8, and CS10, and m indicating the frequency resource are used as elements constituting the PUCCH resource may be used. A combination of an orthogonal code, a cyclic shift amount, and m is uniquely defined so as to correspond to an nPUCCH which is an index indicating the PUCCH resource (uplink control channel logical resource). The index indicating the PUCCH resource is also referred to as a PUCCH resource number. The correspondence between the nPUCCH and the combination of the orthogonal code, the cyclic shift amount, and m is an example, and other correspondences may be provided. For example, the correspondence may be performed such that cyclic shift amounts are changed between continuous nPUCCHs, or the correspondence may be performed such that m is changed between continuous nPUCCHs. CS1, CS3, CS5, CS7, CS9, and CS11 which are cyclic shift amounts different from CS0, CS2, CS4, CS6, CS8, and CS10 may be used. Here, a case where the value of m is equal to or greater than NF2 is described. The frequency resource of which m is less than NF2 is NF2 number of frequency resources which are reserved for the transmission of the PUCCH for performing feedback of the channel state information.

Hereinafter, the transmission mode used in the transmission of the HARQ-ACK information will be described. The HARQ-ACK information defines various transmission modes (transmission methods). The transmission mode used in the transmission of the HARQ-ACK information is determined by information or a configuration specific to the base station apparatus 1, information or a configuration specific to the terminal device 2, and/or information regarding the PDCCH corresponding to the HARQ-ACK information, or the configuration of the higher layer. The transmission mode used in the transmission of the HARQ-ACK information is HARQ-ACK information bundling (HARQ-ACK bundling), and HARQ-ACK information multiplexing (HARQ-ACK multiplexing).

A plurality of HARQ-ACK information items may be transmitted in a certain uplink subframe. The number of HARQ-ACK information items transmitted in the certain uplink subframe is determined by the number of code words (transport blocks) transmitted on one PDSCH, a subframe configuration, and/or a configuration of carrier aggregation. For example, one PDSCH may maximally transmit two code words through multiple-input and multiple-output (MIMO) transmission, and HARQ-ACK information is generated for each code word. For example, in TDD, the type of a subframe is determined based on the subframe configuration. Thus, in a case where the HARQ-ACK information corresponding to the transmission of PDSCHs in a plurality of downlink subframes is transmitted in a certain uplink subframe, a plurality of HARQ-ACK information items corresponding to code words of the PDSCHs in the downlink subframes is generated. For example, in a case where carrier aggregation is configured by a plurality of cells, a plurality of HARQ-ACK information items corresponding to the code words of PDSCHs transmitted in the cells is generated.

In a case where a plurality of HARQ-ACK information items is transmitted in a certain uplink subframe, the HARQ-ACK information items are transmitted by using HARQ-ACK information bundling and/or HARQ-ACK information multiplexing.

In the HARQ-ACK information bundling, a logical AND operation is performed on a plurality of HARQ-ACK information items. The HARQ-ACK information bundling may be performed in various units. For example, the HARQ-ACK information bundling is performed on all code words in a plurality of downlink subframes. The HARQ-ACK information bundling is performed on all code words within one downlink subframe. Particularly, a case where the HARQ-ACK information bundling is performed all the code words within one downlink subframe within one serving cell is referred to as spatial HARQ-ACK information bundling. Through the HARQ-ACK information bundling, it is possible to reduce the information amount of the HARQ-ACK information. In the HARQ-ACK information multiplexing, multiplexing is performed on the plurality of HARQ-ACK information items. Multiplexing may be performed on information on which the HARQ-ACK information bundling. In the following description, information on which the HARQ-ACK information bundling has been performed is also simply referred to as HARQ-ACK information.

A PUCCH for transmitting the HARQ-ACK information may define a plurality of types of formats. As a format of the PUCCH for transmitting the HARQ-ACK information, there are PUCCH format 1a, PUCCH format 1b, PUCCH format 1b (PUCCH 1b with channel selection) for selecting a channel, and PUCCH format 3. The transmission mode used in the transmission of the HARQ-ACK information also includes the PUCCH format to be transmitted.

The PUCCH format 1a is a PUCCH format used for transmitting 1-bit HARQ-ACK information. In a case where the HARQ-ACK information is transmitted by the PUCCH format 1a, one PUCCH resource is assigned, and the HARQ-ACK information is transmitted by using the assigned PUCCH resource.

The PUCCH format 1b is a PUCCH format used for transmitting 2-bit HARQ-ACK information. In a case where the HARQ-ACK information is transmitted by the PUCCH format 1b, one PUCCH resource is assigned, and the HARQ-ACK information is transmitted by using the assigned PUCCH resource.

The PUCCH format 1b for performing channel selection is a PUCCH format used for transmitting 2, 3, or 4 HARQ-ACK information items. 2, 3, or 4 PUCCH resources (channels) are configured for the PUCCH format used for transmitting 2, 3, or 4 HARQ-ACK information items. In the channel selection, any of a plurality of configured PUCCH resources is selected and the selected PUCCH resource is used as a portion of information. 2-bit information capable of being transmitted by using the selected PUCCH resource is also used as a portion of the information. Since QPSK modulation is performed on the 2-bit information, the 2-bit information is transmitted as one symbol. That is, 2, 3, or 4 HARQ-ACK information items are transmitted by using a combination of the PUCCH resource selected from the plurality of configured PUCCH resources and 2-bit information capable of being transmitted by using the selected PUCCH resource by the PUCCH format 1b for performing the channel selection. The combination thereof and each HARQ-ACK information item are previously defined. The HARQ-ACK information is ACK, NACK, DTX, or NACK/DTX. The NACK/DTX indicates NACK or DTX. For example, in a case where carrier aggregation is not configured, 2, 3, or 4 HARQ-ACK information items are HARQ-ACK information corresponding to the transmission of the PDSCH transmitted in 2, 3, or 4 downlink subframes.

The PUCCH format 3 is a PUCCH format used for maximally transmitting 20-bit HARQ-ACK information. One PUCCH resource in the PUCCH format 3 is configured. One PUCCH resource in the PUCCH format 3 is used for maximally transmitting 20-bit HARQ-ACK information. The PUCCH resource in the PUCCH formats 1a/1b and the PUCCH resource in the PUCCH format 3 are independent. For example, the base station apparatus 1 preferably configures the resources such that the PUCCH resource in the PUCCH formats 1a/1b and the PUCCH resource in the PUCCH format 3 are different physical resources (that is, two RBs constituting the physical resource used in the transmission of the PUCCH).

In a case where the HARQ-ACK information is transmitted over the PUCCH, the HARQ-ACK information is mapped to and transmitted in the PUCCH resource which is explicitly and/or implicitly configured. The PUCCH resource used in the transmission of the HARQ-ACK information is uniquely determined by information or a configuration specific to the base station apparatus 1, information or a configuration specific to the terminal device 2, and/or information regarding the PDCCH or the EPDCCH corresponding to the HARQ-ACK information. For example, the PUCCH resource number indicating the PUCCH resources used in the transmission of the HARQ-ACK information is calculated by using parameters included in the information items and/or parameters obtained from these information items, and a prescribed method (operation).

In a general FDD cell (for example, FDD cell which does not perform carrier aggregation or FDD cell which performs carrier aggregation with only another FDD cell), HARQ-ACK information corresponding to the PDSCH transmitted in the downlink component carrier or the PDCCH indicating releasing of downlink semi-persistent scheduling (SPS) (SPS releasing) in a subframe n−4 is transmitted by an uplink component carrier corresponding to the downlink component carrier. The HARQ-ACK information corresponding to the PDSCH allocated in a subframe n is transmitted by using the PUCCH/PUSCH allocated in a subframe n+4. That is, after the PDSCH is received in a certain subframe, the terminal device 2 transmits the HARQ-ACK information corresponding to the PDSCH to the base station by using the PUCCH/PUSCH after four subframes. Thus, the base station is able to receive the HARQ-ACK information corresponding to the transmitted PDSCH from the terminal device 2, and is able to determine whether or not the PDSCH is retransmitted based on information of ACK/NACK.

That is, in the FDD cell, in a case where one serving cell is configured for the terminal device 2 or in a case where more than one serving cell is configured for the terminal device 2 and the primary cell is the FDD cell, when PDSCH transmission in which the terminal device 2 is used as a target and the HARQ-ACK information is given is detected in the subframe n−4, the terminal device 2 transmits the HARQ-ACK information in the subframe n.

Meanwhile, in a general TDD cell (for example, TDD cell which does not perform carrier aggregation or TDD cell which performs carrier aggregation with only another TDD cell), the uplink subframe does not necessarily need to be configured after four subframes from the downlink subframe. Thus, an uplink subframe corresponding to the downlink subframe is defined. In an example of the details of the HARQ-ACK information multiplexing in PDSCH transmission indicated by the PDCCH or the EPDCCH, a downlink association set illustrated in FIG. 6 is used. FIG. 6 is a diagram illustrating an example of an index K: $\{k_0, k_1, \ldots k_{M-1}\}$ of the downlink association set. The HARQ-ACK information included in the PUCCH/PUSCH allocated to the subframe n corresponds to the PDSCH indicated by detecting the associated PDCCH in a subframe $n-k_i$ or the PDCCH indicating the releasing of the downlink SPS in the subframe $n-k_i$. In other words, the HARQ-ACK information corresponding to the PDSCH indicated by detecting the PDCCH in the subframe n or to the PDCCH indicating the releasing of the downlink SPS is transmitted while being included in the PUCCH/PUSCH in a subframe $n+k_i$.

That is, in the TDD cell, in a case where one serving cell is configured for the terminal device 2 or in a case where more than one serving cell is configured for the terminal device 2 and all UL-DL configurations are the same, when the transmission of the PDSCH in which the terminal device 2 is used as a target and the HARQ-ACK information is given is detected in the subframe n−k, the terminal device 2 transmits the HARQ-ACK information in the uplink subframe n. Here, k belongs to a set K (k∈K), and the set K is defined in FIG. 6.

Figure 4:
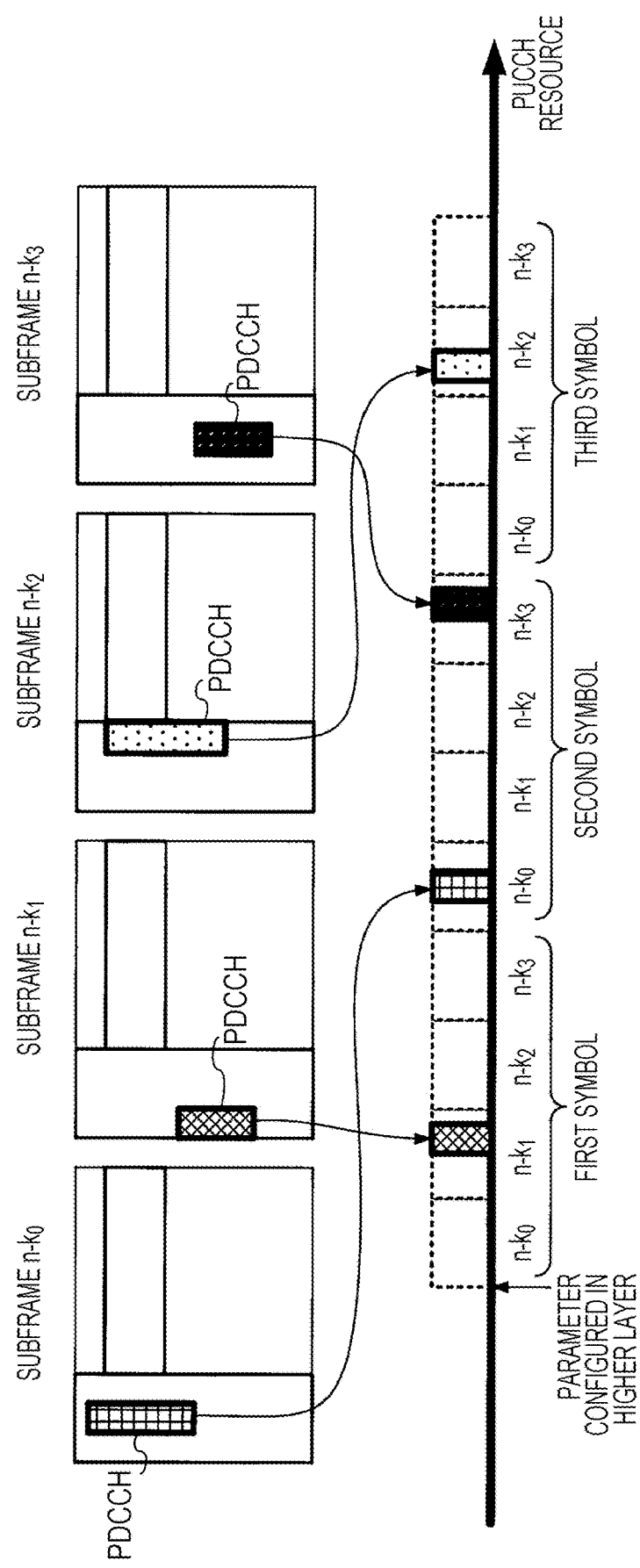
FIG. 4 is a diagram illustrating an example in which HARQ-ACK information corresponding to a PDCCH is mapped to a PUCCH resource according to the first embodiment of the present invention.

FIG. 4 is a diagram illustrating an example of the HARQ-ACK information multiplexing in the transmission of the PDSCH indicated by the PDCCH in the TDD cell. FIG. 4 illustrates PUCCH resources used for the HARQ-ACK information multiplexing in a case where the HARQ-ACK information items for four downlink subframes (4 bits) are transmitted by using the PUCCH format 1b for performing channel selection. This diagram illustrates a PUCCH resource extracted from a subframe $n-k_i$ in a certain uplink subframe n. Here, the subframe $n-k_i$ indicates a subframe before $k_i$ number of subframes from the subframe n. If it is assumed that the number of subframes (bits) for performing the HARQ-ACK information multiplexing is M, i is an integer which is equal to or greater than 0 and is equal to or less than M−1. That is, in FIG. 4, in the subframe n, 4-bit HARQ-ACK information is transmitted by using PUCCH resources extracted from four downlink subframes (subframe $n-k_0$, subframe $n-k_1$, subframe $n-k_2$, and subframe $n-k_3$). The value of M and the value of $k_i$ are defined by the number of the subframe n and the subframe configuration. Here, a time window including a set of subframes expressed by n−k (k corresponds to each $k_i$ included in K) may be referred to as a bundling window. The number of subframes within the bundling window is M, and the subframes within the bundling window mean a subframe $n-k_0$ to a subframe $n-k_{M-1}$. The size (time length) of the bundling window may be different depending on the subframe n having the corresponding uplink subframe. The size of the bundling window may be different depending on the subframe structure (UL/DL configuration) in TDD.

If the downlink association set is redefined in the FDD cell similarly to the HARQ-ACK information multiplexing in the transmission of the PDSCH indicated by the PDCCH in the TDD cell, since the M values of all the subframes n are 1 and $k_0$ is defined for all the subframes n, the downlink association set is able to be rewritten as a downlink association set K in which all $k_0$ is 4.

The PUCCH resource used for the HARQ-ACK information in the transmission of the PDSCH indicated by the PDCCH is determined based on at least a parameter $N^{(1)}_{PUCCH}$ configured in the higher layer and the first CCE number $n_{CCE}$ used for transmitting the PDCCH associated with the HARQ-ACK information. As illustrated in FIG. 4, indices of PUCCH resources used for the HARQ-ACK information in the transmission of the PDSCH indicated by the PDCCH are given in order of OFDM symbols to which $n_{CCE}$ is mapped in the respective subframes. That is, block interleaving is performed between the subframes on which the HARQ-ACK information multiplexing has been performed. Thus, since the number of OFDM symbols constituting a PDCCH region which is a region to which the PDCCH is able to be mapped may be configured for each subframe, there is a high possibility that the PUCCH resources will be located in front. Accordingly, the PUCCH resources used for the HARQ-ACK information are efficiently used.

Figure 5:
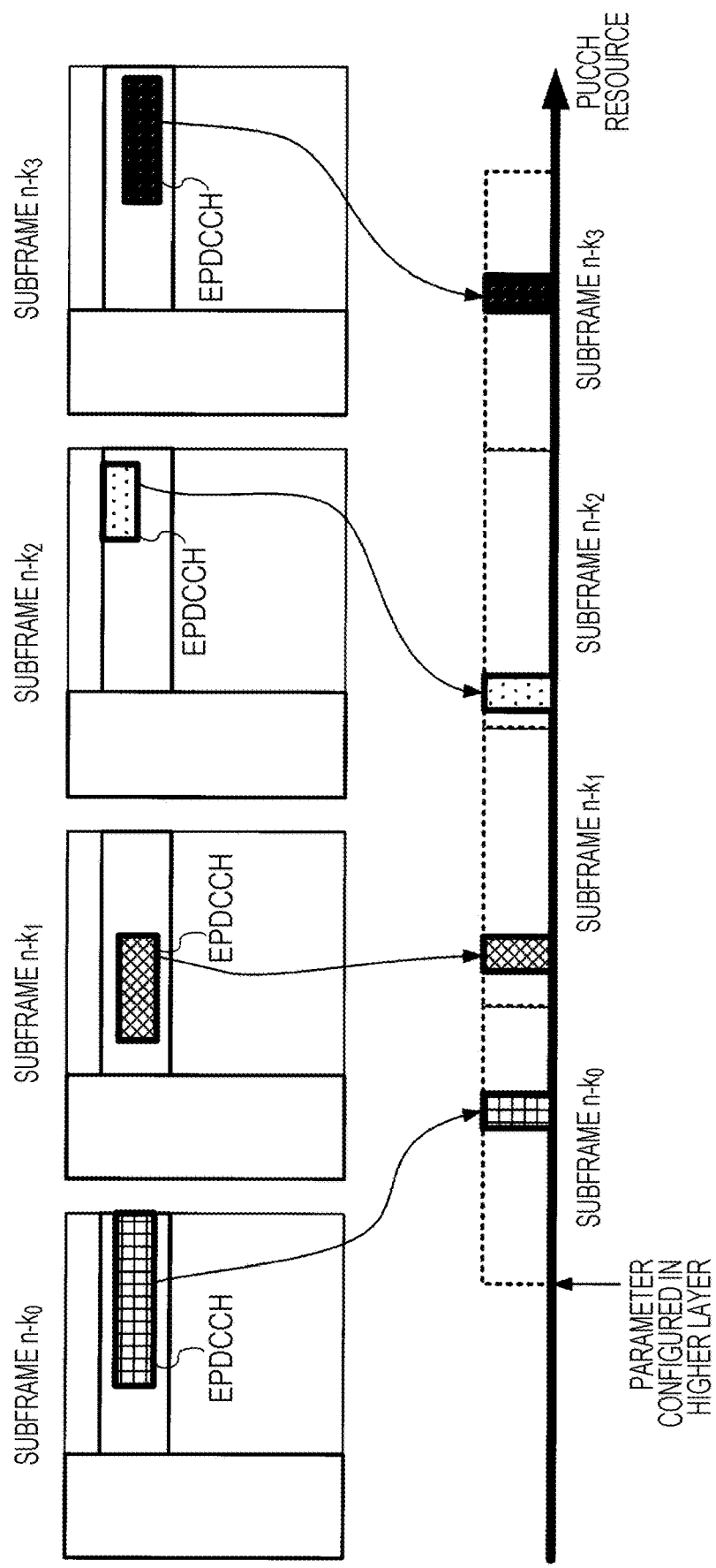
FIG. 5 is a diagram illustrating an example n which the HARQ-ACK information corresponding to an EPDCCH is mapped to a PUCCH resource according to the first embodiment of the present invention.

FIG. 5 is a diagram illustrating an example of the HARQ-ACK information multiplexing in the transmission of the PDSCH indicated by the EPDCCH. FIG. 5 illustrates PUCCH resources used for the HARQ-ACK information multiplexing in a case where the HARQ-ACK information for four downlink subframes (4 bits) is transmitted by using the PUCCH format 1b for performing channel selection. FIG. 5 illustrates a PUCCH resource extracted from a subframe $n-k_i$ in a certain uplink subframe n. Here, the subframe $n-k_i$ indicates a subframe before $k_i$ number of subframes from the subframe n. If it is assumed that the number of subframes (bits) for performing the HARQ-ACK information multiplexing is M, i is an integer which is equal to or greater than 0 and is equal to or less than M−1. That is, in FIG. 5, in the subframe n, 4-bit HARQ-ACK information is transmitted by using PUCCH resources extracted from four downlink subframes (subframe $n-k_0$, subframe $n-k_1$, subframe $n-k_2$, and subframe $n-k_3$). The value of M and the value of $k_i$ are defined by the number of the subframe n and the subframe configuration.

The PUCCH resource used for the HARQ-ACK information in the transmission of the PDSCH indicated by the EPDCCH is determined based on at least a parameter $N^{(e1)}_{PUCCH}$ configured in the higher layer and the first CCE number $n_{ECCE}$ used for transmitting the EPDCCH associated with the HARQ-ACK information. As illustrated in FIG. 5, indices of PUCCH resources used for the HARQ-ACK information in the transmission of the PDSCH indicated by the EPDCCH are given in order from the EPDCCH mapped to the subframe $n-k_0$.

Hereinafter, the details of the HARQ-ACK information multiplexing in the transmission of the PDSCH indicated by the PDCCH or the EPDCCH will be described.

In an example of the details of the HARQ-ACK information multiplexing in the transmission of the PDSCH indicated by the PDCCH or the EPDCCH, a downlink association set illustrated in FIG. 6 and an operation of PUCCH resources used in the transmission of the HARQ-ACK information as illustrated in FIG. 7 are used. FIG. 6 is a diagram illustrating an example of an index K: {$k_0$, $k_1$, . . . , $k_{M-1}$} of the downlink association set. FIG. 7 is a diagram illustrating an example of an expression for applying PUCCH resources used in the transmission of the HARQ-ACK information.

In a case where the HARQ-ACK information multiplexing is performed in the subframe n having M which is greater than 1, $n^{(1)}_{PUCCH, i}$ indicating a PUCCH resource extracted from the subframe $n-k_i$, and HARQ-ACK(i) indicating a response of ACK/NACK/DTX from the subframe $n-k_i$ will be described as follows. M is the number of elements in the set K defined in FIG. 6. M is the number obtained based on the HARQ-ACK information on which multiplexing has been performed. $k_i$ is included in the set K, and i is equal to greater than 0 and is equal to or less than M−1. For example, in a case where the uplink-downlink configuration is 2, the set K in the subframe 2 is {8, 7, 4, 6}, M is 4, $k_0$ is 8, $k_1$ is 7, $k_2$ is 4, and $k_3$ is 6.

PUCCH resources for the PDCCH indicating the transmission of the PDSCH indicated by detecting the PDCCH associated in the subframe $n-k_i$ or the releasing (SPS releasing) of the downlink semi-persistent scheduling (downlink SPS) in the subframe $n-k_i$ are given by Expression (a) in FIG. 7. Here, $n_{CCE, i}$ is the number (index) of the first CCE used for transmitting the PDCCH associated in the subframe $n-k_i$, and $N^{(1)}_{PUCCH}$ is a parameter configured in the higher layer. $N^{DL}_{RB}$ is the number of resource blocks in the downlink, and $N^{RB}_{sc}$ is the number of subcarriers per resource block.

PUCCH resources for the EPDCCH indicating the transmission of the PDSCH indicated by detecting the EPDCCH associated in the subframe $n-k_i$ or the releasing (SPS releasing) of the downlink semi-persistent scheduling (downlink SPS) in the subframe $n-k_i$ are given by Expression (b-1) and Expression (b-2) in FIG. 7. In a case where an EPDCCH set (EPDCCH-PRB-set) q is configured for distributed transmission, Expression (b-1) in FIG. 7 is used for the PUCCH resources. In a case where the EPDCCH set (EPDCCH-PRB-set) q is configured for localized transmission, Expression (b-2) in FIG. 7 is used for the PUCCH resources. Here, $n_{ECCE, q}$ is the number (index) of the first CCE used for transmitting DCI allocation associated in the subframe $n-k_i$ and the EPDCCH set q. That is, the number of the CCE is the smallest index of an ECCE used for constituting the EPDCCH. $N^{(e1)}_{PUCCH, q}$ is a parameter configured in the higher layer in the EPDCCH set q. $N^{ECCE, q_{RB}}$ is the total number of resource blocks configured for the EPDCCH set q in the subframe $n-k_i$.

That is, M number of PUCCH resources are given in the subframe n. The M number of PUCCH resources are used for transmitting the PUCCH having the PUCCH format 1b for performing channel selection. For example, in a case where the uplink-downlink configuration is 2, four PUCCH resources are given in the subframe 2. The four PUCCH resources are used for transmitting the PUCCH having the PUCCH format 1b for performing channel selection.

Here, a subframe indicated by each set K within the downlink association set illustrated in FIG. 6 corresponds to a downlink subframe, a special subframe, and/or a flexible subframe. Thus, even in a case where the flexible subframe may be configured in addition to the downlink subframe and the special subframe, it is possible to efficiently transmit the HARQ-ACK information for the PDSCH which is transmitted in the downlink subframe, the special subframe, and/or the flexible subframe.

Hereinafter, an uplink reference UL-DL configuration (an uplink reference UL/DL configuration, a UL-reference UL/DL configuration, or a first uplink reference UL-DL configuration) and a downlink UL-DL configuration (a downlink reference UL/DL configuration, a DL-reference UL/DL configuration, or a first downlink reference UL-DL configuration) will be described.

If the base station apparatus 1 or the terminal device 2 satisfies a certain condition, one of the base station apparatus and the terminal device may configure the information as the uplink reference UL-DL configuration, and the other thereof may configure the information as the downlink reference UL-DL configuration. For example, the terminal device 2 may receive two information items regarding a first configuration and information regarding a second configuration, and then may configure the information items as the uplink reference UL-DL configuration and the downlink reference UL-DL configuration. The DCI format (for example, DCI format 0/4) associated with the uplink may be transmitted in the downlink subframe configured as the uplink reference UL-DL configuration.

The uplink reference UL-DL configuration and the downlink reference UL-DL configuration may be configured by using the same table. In a case where the indices of the uplink reference UL-DL configuration and the downlink reference UL-DL configuration are configured based on the same table, the uplink reference UL-DL configuration and the downlink reference UL-DL configuration are preferably configured as different indices. That is, as the uplink reference UL-DL configuration and the downlink reference UL-DL configuration, different subframe patterns are preferably configured.

The uplink reference UL-DL configuration and the downlink reference UL-DL configuration may be independently configured for one serving cell. The uplink reference UL-DL configuration and the downlink reference UL-DL configuration may be individually configured for one serving cell in self scheduling for scheduling the PDSCH/PUSCH of the serving cell from the PDCCH/EPDCCH of the serving cell and cross carrier scheduling for scheduling the PDSCH/PUSCH of the serving cell from the PDCCH/EPDCCH of a serving cell different from the serving cell.

In a case where a plurality of TDD UL/DL configurations are indicated for one serving cell (primary cell or secondary cell), any one thereof may be configured as the uplink reference UL-DL configuration, and the other may be configured as the downlink reference UL-DL configuration in some conditions. The uplink reference UL-DL configuration may be at least used for determining the correspondence between the subframe to which the physical downlink control channel is allocated and the subframe to which the physical uplink shared channel corresponding to the physical downlink control channel is allocated, and may be different from an actual transmission direction (that is, uplink or downlink) of a signal. The downlink reference UL-DL configuration may be at least used for determining the correspondence between the subframe to which the physical downlink shared channel is allocated and the subframe in which the HARQ-ACK information corresponding to the physical downlink shared channel is transmitted, and may be different from an actual transmission direction (that is, uplink or downlink) of a signal. That is, the uplink reference UL-DL configuration is used for specifying (selecting or determining) the correspondence between the subframe n to which the PDCCH/EPDCCH/PHICH is allocated and the subframe n+k to which the PUSCH corresponding to the PDCCH/EPDCCH/PHICH is allocated. In a case where one primary cell is configured or in a case where one primary cell and one secondary cell are configured and the uplink reference UL-DL configuration for the primary cell and the uplink reference UL-DL configuration for the secondary cell are the same, the corresponding uplink reference UL-DL configuration is used for determining the correspondence between the subframe to which the PDCCH/EPDCCH/PHICH is allocated and the subframe to which the PUSCH corresponding to the PDCCH/EPDCCH/PHICH is allocated in each of the two serving cells. The downlink reference UL-DL configuration is used for specifying (selecting or determining) the correspondence between the subframe n to which the PDSCH is allocated and the subframe n+k in which the HARQ-ACK information corresponding to the PDSCH is transmitted. In a case where one primary cell is configured or in a case where one primary cell and one secondary cell are configured and the downlink reference UL-DL configuration for the primary cell and the downlink reference UL-DL configuration for the secondary cell are the same, the corresponding downlink reference UL-DL configuration is used for specifying (selecting or determining) the correspondence between the subframe n to which the PDSCH is allocated and the subframe n+k in which the HARQ-ACK information corresponding to the PDSCH is transmitted in each of the two serving cells.

As an example in which the downlink reference UL-DL configuration is configured for the terminal device 2, there is a case where two or more TDD cells are configured for the terminal device 2 and UL-DL configurations of at least two serving cells are differently configured. In this case, the downlink reference UL-DL configuration of the serving cell is determined from a combination of the set number defined in FIG. 10 so as to indicate the primary cell or the secondary cell and a pair of a primary cell UL-DL configuration and a secondary cell UL-DL configuration. In this case, the HARQ-ACK information included in the PUCCH/PUSCH allocated to the subframe n corresponds to the PDSCH indicated by detecting the associated PDCCH in the subframe n−k or the PDCCH indicating the releasing of the downlink SPS in the subframe n−k. Here, k is correlated with a value defined in FIG. 6 from the downlink reference UL-DL configuration.

That is, in the TDD cell, in a case where more than one serving cell is configured for the terminal device 2, at least two serving cells have different UL-DL configurations, and the serving cell is the primary cell, the UL-DL configuration of the primary cell is a downlink reference UL-DL configuration of the serving cell.

That is, in the TDD cell, the downlink reference UL-DL configuration of the serving cell is defined in FIG. 10 in any case of a case where more than one serving cell is configured for the terminal device 2, at least two serving cells have different UL-DL configurations, the serving cell is the secondary cell, and thus a pair of the primary cell UL-DL configuration and the secondary cell UL-DL configuration belongs to a set 1 in FIG. 10, a case where monitoring of the PDCCH/EPDCCH from another serving cell is not configured for the terminal device in scheduling the serving cell and the pair of the primary cell UL-DL configuration and the secondary cell UL-DL configuration belongs to a set 2 or a set 3 in FIG. 10, and a case where monitoring of the PDCCH/EPDCCH from another serving cell is configured for the terminal device 2 in scheduling the serving cell and the pair of the primary cell UL-DL configuration and the secondary cell UL-DL configuration belongs to a set 4 or a set 5 in FIG. 10.

That is, in the TDD cell, in a case where more than one serving cell is configured for the terminal device 2, at least two serving cells have different UL-DL configurations, and the downlink reference UL-DL configuration of at least one serving cell is TDD UL-DL configuration 5, it is not expected that more than two serving cells are configured for the terminal device 2.

That is, in the TDD cell, in a case where more than one serving cell is configured for the terminal device 2 and at least two serving cells have different UL-DL configurations, when the transmission of the PDSCH in which the terminal device 2 is used as a target and the HARQ-ACK information is given is detected in the subframe n–k of the serving cell c, the terminal device 2 transmits the HARQ-ACK information in the uplink subframe n. Here, k belongs to a set $K_c$ ($k \in K_c$), and the set K is defined in FIG. 6. Here, the set $K_c$ includes the value of k belonging to the set K in the subframe n–k corresponding to the downlink subframe or the special subframe for the serving cell c. Here, the UL-DL configuration in FIG. 6 refers to the downlink reference UL-DL configuration of this FDD cell.

Hereinafter, a transmission timing of the HARQ-ACK information in a case where it is assumed that a plurality of cells to which different frame structure types are applied are aggregated.

Here, for example, the case where the plurality of cells to which different frame structure types are applied are aggregated includes a case where a cell in which a frame structure type is Type 1 (FDD) and a cell in which a frame structure type is Type 2 (TDD) are aggregated. Hereinafter, the case where the cell having the frame structure type of Type 1 (FDD) and the cell having the frame structure type of Type 2 (TDD) are aggregated is referred to as TDD-FDD carrier aggregation (TDD-FDD CA, TDD-FDD, or FDD-TDD). For example, the case where the plurality of cells to which different frame structure types are applied includes a case where a plurality of cells in which a frame structure type is Type 1 (FDD) and a plurality of cells in which a frame structure type is Type 2 (TDD) are aggregated. That is, for example, the case where the plurality of cells to which different frame structure types are applied includes a case where one or more cells in which a frame structure type is Type 1 (FDD), and one or more cells in which a frame structure type is Type 2 (TDD) are aggregated. The description of the frame structure type is an example, and may be similarly applied to a case where Type 3 or Type 4 is defined. Hereinafter, a cell of which the primary cell is TDD is referred to as a TDD primary cell, a cell of which the secondary cell is TDD is referred to as a TDD secondary cell, a cell of which the primary cell is FDD is referred to as an FDD primary cell, and a cell of which the secondary cell is FDD is referred to as an FDD secondary cell. In a case where carrier aggregation is configured, the terminal device 2 transmits a PUCCH in the primary cell, and the base station apparatus 1 receives the PUCCH from the terminal device 2 in the primary cell. The terminal device 2 does not need to transmit the PUCCH in the secondary cell, and the base station apparatus 1 does not need to receive the PUCCH from the terminal device 2 in the secondary cell.

Here, the uplink reference UL-DL configuration and the downlink reference UL-DL configuration may be configured for the FDD cell. Only the uplink reference UL-DL configuration may be configured for the FDD cell. Only the downlink reference UL-DL configuration may be configured for the FDD cell. The uplink reference UL-DL configuration and the downlink reference UL-DL configuration are individually configured by the scheduling method (self scheduling or cross carrier scheduling). For example, the uplink reference UL-DL configuration is not configured for the FDD cell in the case of the self scheduling, and the uplink reference UL-DL configuration is configured for the FDD cell in the case of the cross carrier scheduling. The configuration may be configured depending on the type (primary cell or secondary cell) of the serving cell or the combination of the aggregations of the serving cells. For example, the downlink reference UL-DL configuration is not configured for the FDD primary cell in a case where the cell is configured as the FDD primary cell for the terminal device 2, and the downlink reference UL-DL configuration is configured for the FDD secondary cell in a case where the cell is configured as the FDD secondary cell for the terminal device 2 and the primary cell is TDD.

In a case where the uplink reference UL-DL configuration is not configured for the FDD cell, the base station apparatus 1 performs the scheduling of the PUSCH and the transmission of the PHICH in a transmission timing of the FDD. In a case where the downlink reference UL-DL configuration is not configured for the FDD cell, the base station apparatus 1 performs the scheduling of the PDSCH in the transmission timing of the FDD, and the terminal device 2 transmits the HARQ-ACK information corresponding to the PDSCH in the transmission timing of the FDD.

A virtual TDD UL-DL configuration (TDD-FDD UL-DL configuration) may be configured for the FDD cell from the higher layer, and the downlink reference UL-DL configuration of the FDD cell may be configured based on the virtual TDD UL-DL configuration. In this case, the downlink reference UL-DL configuration of the FDD cell is determined by using FIG. 10 from the pair of the TDD UL-DL configuration of the TDD primary cell and the virtual TDD UL-DL configuration of the FDD secondary cell.

An example of the transmission timing of the HARQ-ACK information in the FDD cell in a case where the primary cell is the TDD cell will be described.

The HARQ-ACK information corresponding to the PDSCH detected in the FDD secondary cell or the PDCCH indicating the releasing of the downlink SPS may be transmitted by using the PUCCH. The PUCCH is transmitted from the uplink subframe of the TDD primary cell. That is, the downlink reference UL-DL configuration for determining the transmission timing of the HARQ-ACK information of the FDD secondary cell which performs carrier aggregation with the TDD primary cell follows the TDD UL-DL configuration of the primary cell.

That is, in the FDD cell, in a case where more than one serving cell is configured for the terminal device 2 and the primary cell is the TDD cell, the downlink reference UL-DL configuration of the FDD cell is the TDD UL-DL configuration of the primary cell.

That is, in the FDD cell, in a case where more than one serving cell is configured for the terminal device 2, the primary cell is the TDD cell, and at least one serving cell has TDD UL-DL configuration 5, it is not expected that more than two serving cells are configured for the terminal device 2.

That is, in the FDD cell, in a case where more than one serving cell is configured for the terminal device 2 and the primary cell is the TDD cell, when the transmission of the PDSCH in which the terminal device 2 is used as a target and the HARQ-ACK information is given is detected in the subframe n–k, the terminal device 2 transmits the HARQ-ACK information in the uplink subframe n. Here, k belongs to a set K ($k \in K$), and the set K is defined in FIG. 6. Here, the UL-DL configuration in FIG. 6 refers to the downlink reference UL-DL configuration of the FDD cell.

An example of the transmission timing of the HARQ-ACK information in the FDD cell in a case where the primary cell is the TDD cell will be described.

In a case where the HARQ-ACK information of the FDD cell is transmitted according to the TDD UL-DL configuration of the TDD primary cell, since the TDD primary cell is not able to be correlated in the subframe functioning as the uplink subframe, scheduling of the PDSCH or the PDCCH indicating the releasing of the downlink SPS is not performed in the subframe even in the FDD secondary cell. A table in which the PDSCH, the PDCCH indicating the releasing of the downlink SPS, and the transmission timing of the HARQ-ACK information are correlated with each other is also used in the subframe which functions as the uplink subframe. FIGS. 9 and 15 illustrate examples of the transmission timing of the HARQ-ACK information which corresponds to the PDSCH of the FDD secondary cell and the PDCCH indicating the releasing of the downlink SPS in the case of the TDD primary cell. It is possible to transmit the PDSCH and the PDCCH indicating the releasing of the downlink SPS in the FDD secondary cell even in the subframe which functions as an uplink subframe in the TDD primary cell by using the transmission timing defined in FIG. 9 or 15, and the HARQ-ACK information corresponding to the PDSCH and the PDCCH is transmitted in the uplink subframe of the TDD primary cell. That is, the downlink reference UL-DL configuration for determining the transmission timing of the HARQ-ACK information of the FDD cell follows the TDD UL-DL configuration of the primary cell, and the transmission timing is determined by using the table of the transmission timing of the HARQ-ACK information for the FDD secondary cell which performs the carrier aggregation with the TDD primary cell.

The table of FIG. 9 shows that the delay of the HARQ-ACK information feedback is shorter than that of the table of FIG. 15. Thus, throughput performance using HARQ is favorable. Meanwhile, the table of FIG. 15 is defined such that the maximum M value within the TDD UL-DL configuration is less than that of the table of FIG. 9. Thus, since M is equal to or less than 4 in the TDD UL-DL configuration other than the TDD UL-DL configurations 2, 4, and 5, it is possible to perform the feedback of the HARQ-ACK information by using the PUCCH format 1b in the TDD UL-DL configurations 0, 1, 3, and 6.

That is, in the FDD cell, in a case where more than one serving cell is configured for the terminal device 2 and the primary cell is the TDD cell, the downlink reference UL-DL configuration of the FDD cell is the TDD UL-DL configuration of the primary cell.

In the FDD cell, in a case where more than one serving cell is configured for the terminal device 2, the primary cell is the TDD cell, and at least one serving cell has TDD UL-DL configuration 5, it is not expected that more than two serving cells are configured for the terminal device 2.

In the FDD cell, in a case where more than one serving cell is configured for the terminal device 2 and the primary cell is the TDD cell, when the transmission of the PDSCH in which the terminal device 2 is used as a target and the HARQ-ACK information is given is detected in the subframe n−k, the terminal device 2 transmits the HARQ-ACK information in the uplink subframe n. Here, k belongs to the set K (k∈K), and the set K is defined in FIG. 9. Here, the UL-DL configuration of FIG. 9 refers to the downlink reference UL-DL configuration of the FDD cell.

The downlink reference UL-DL configuration of the FDD cell may be configured by the higher layer.

That is, in the FDD cell, in a case where more than one serving cell is configured for the terminal device 2 and the primary cell is the TDD cell, the downlink reference UL-DL configuration of this FDD cell is configured in the higher layer.

In a case where the primary cell is the TDD and the serving cell is the FDD in the TDD-FDD CA, the definition of the downlink association set may be switched by the scheduling type. For example, in a case where the cross carrier scheduling is configured for the FDD cell from the TDD cell, the downlink association set in a case where communication is performed in one TDD cell is used, and in other cases, the downlink association set associated with the subframe as the uplink subframe of the TDD cell is used. That is, the downlink association set of FIG. 9 may be used in a case where the self scheduling is configured for the terminal device 2 (the cross carrier scheduling is not configured for the FDD serving cell from the TDD cell), the downlink association set of FIG. 6 may be used in a case where the cross carrier scheduling is configured for the FDD serving cell from the TDD cell in the terminal device 2, and the downlink association set of FIG. 9 may be used in a case where the cross carrier scheduling is configured for the FDD serving cell from the FDD cell in the terminal device 2.

The table of FIG. 11 may be used instead of the table of FIG. 9 or 15. FIG. 11 illustrates an example of the transmission timing of the HARQ-ACK information which corresponds to the PDSCH of the FDD secondary cell and the PDCCH indicating the releasing of the downlink SPS in the case of the TDD primary cell. In the table of FIG. 11, the transmission timing of the HARQ-ACK information of the subframe as the uplink subframe is defined in the TDD primary cell in the TDD UL-DL configurations 0, 1, 2, 3, 4, and 6, and the transmission timing of the HARQ-ACK information of the subframe as the uplink subframe is not defined in the TDD primary cell in the TDD UL-DL configuration 5. The configuration may be performed such that the number of maximum downlink HARQ processes is equal to or less than 16 by using this table. The TDD UL-DL configuration may be the downlink reference UL-DL configuration.

In a case where the set K of TDD UL-DL configuration 5 is configured using the transmission timing defined in FIG. 9 or 15, the base station apparatus 1 may perform the scheduling such that the number of times the PDSCH is transmitted within one radio frame is limited to 9 in a certain cell. It is not expected that the terminal device 2 receives the PDSCH in 10 subframes or more within one radio frame in a certain cell. Accordingly, it is possible to perform communication in which the number of maximum downlink HARQ processes is equal to or less than 16.

An example of the transmission timing of the HARQ-ACK information in the FDD cell in a case where the primary cell is the TDD cell will be described.

The number of maximum downlink HARQ processes needs to be equal to or greater than 17 in the transmission timing defined in FIG. 9 or 15. For example, in TDD UL-DL configuration 5 of FIG. 9, the number of maximum downlink HARQ processes needs to be equal to 19. In a case where the number of maximum downlink HARQ processes is equal to or greater than 17, a bit field having 5 bits or more is required in the DCI for notifying of the HARQ process number. Thus, the transmission timing defined in the set K in which the number of maximum downlink HARQ processes does not exceed 17 is used. For example, the set K defined in the transmission timing table of FIG. 9 or 15 is used in the TDD UL-DL configurations 0, 1, 2, 3, 4, and 6, and the set K defined in the transmission timing table of FIG. 6 is used in the TDD UL-DL configuration 5. Accordingly, it is possible to perform communication in which the number of maximum downlink HARQ processes is equal to or less than 16.

That is, in the FDD cell, in a case where more than one serving cell is configured for the terminal device 2 and the primary cell is the TDD cell, the downlink reference UL-DL configuration of the FDD cell is the TDD UL-DL configuration of the primary cell.

In the FDD cell, in a case where more than one serving cell is configured for the terminal device 2, the primary cell is the TDD cell, and at least one serving cell has TDD UL-DL configuration 5, it is not expected that more than two serving cells are configured for the terminal device 2. In a case where more than one serving cell is configured for the terminal device 2, the primary cell is the TDD cell, at least one serving cell is the FDD, and at least one serving cell has the TDD UL-DL configuration 2 or 4, it is not expected that more than four serving cells are configured for the terminal device 2.

In the FDD cell, in a case where more than one serving cell is configured for the terminal device 2 and the primary cell is the TDD cell, when the transmission of the PDSCH in which the terminal device 2 is used as a target and the HARQ-ACK information is given is detected in the subframe n−k, the terminal device 2 transmits the HARQ-ACK information in the uplink subframe n. Here, k belongs to the set K (k∈K), and the set K is defined by the table of FIG. 6 or 9. Here, the UL-DL configuration of FIG. 9 is referred in a case where the downlink reference UL-DL configuration of the FDD cell is 0, 1, 2, 3, 4, and 6. Here, the UL-DL configuration of FIG. 6 is referred in a case where the downlink reference UL-DL configuration of the FDD cell is 5.

Hereinafter, the number of component carriers (CCs) on which the carrier aggregation is able to be performed in a case where the table of the downlink association set different from that of the TDD primary cell is defined for the FDD secondary cell in a case where a plurality of cells to which different frame structure types are applied is aggregated will be described.

It is possible to transmit the HARQ-ACK information having a maximum length of 20 bits in the PUCCH format 3. In a case where the carrier aggregation is performed, the number of bits in which the HARQ-ACK information is transmitted is compressed by performing the spatial HARQ-ACK information bundling. However, in a case where the length of the HARQ-ACK information exceeds 20 bits even though the spatial HARQ-ACK information bundling is performed, it is difficult to transmit the HARQ-ACK information. For example, in a case where the primary cell is the TDD, the carrier aggregation between the FDD cell and the TDD cell is performed, and the table of FIG. 6 and the table of FIG. 9 are respectively applied to the primary cell and the secondary cell, and also in a case where the TDD UL-DL configuration of the TDD primary cell is 2 and the TDD UL-DL configuration of the FDD secondary cell is 2, the number of bits on which the spatial HARQ-ACK information bundling of the HARQ-ACK information corresponding to the PDCCH/EPDCCH indicating the releasing of the downlink SPS or the PUSCH transmission has been performed is maximally 9 bits. However, in a case where four FDD cells in which the TDD UL-DL configuration is 2 are configured for the TDD cell in which the TDD UL-DL configuration is 2, the number of bits after the spatial HARQ-ACK information bundling has been performed is maximally 24 bits, and exceeds the number of bits at which the PUCCH format 3 is able to be transmitted. Thus, the terminal device 2 is not able to transmit the HARQ-ACK information by using the PUCCH format 3.

Thus, the number of serving cells in which the carrier aggregation is able to be performed is limited depending on the TDD UL-DL configuration.

For example, in a case where the primary cell is the TDD and the table of FIG. 15 is applied to the FDD secondary cell, the base station apparatus 1 does not configure the TDD primary cell for the terminal device 2 and two or more FDD secondary cells for at least one FDD cell in a case where the downlink reference UL-DL configuration is 5. The base station apparatus 1 does not configure the TDD primary cell for the terminal device 2 and four or more FDD secondary cells for at least one FDD cell in a case where the downlink reference UL-DL configuration is 2 or 4.

In a case where more than one serving cell is configured for the terminal device 2, the primary cell is the TDD cell, at least one serving cell is the FDD, and at least one serving cell is the downlink reference UL-DL configuration 2 or 4, it is not expected that more than four serving cells are configured for the terminal device 2. In a case where at least one serving cell is the TDD UL-DL configuration is 5, it is not expected that more than two serving cells are configured for the terminal device 2.

For example, in a case where the primary cell is the TDD and the table of FIG. 9 is applied to the FDD secondary cell, the base station apparatus 1 does not configure the TDD primary cell for the terminal device 2 and two or more FDD secondary cells for at least one FDD cell in a case where the downlink reference UL-DL configuration is 5. The base station apparatus 1 does not configure the TDD primary cell for the terminal device 2 and three or more FDD secondary cells for at least one FDD cell in a case where the downlink reference UL-DL configuration is 3 or 4. The base station apparatus 1 does not configure the TDD primary cell for the terminal device 2 and four or more FDD secondary cells for at least one FDD cell in a case where the downlink reference UL-DL configuration is 2.

In a case where more than one serving cell is configured for the terminal device 2, the primary cell is the TDD cell, at least one serving cell is the FDD, and at least one serving cell is the downlink reference UL-DL configuration 2 or 4, it is not expected that more than four serving cells are configured for the terminal device 2. In a case where more than one serving cell is configured for the terminal device 2, the primary cell is the TDD cell, at least one serving cell is the FDD, and at least one serving cell is the downlink reference UL-DL configuration 3 or 4, it is not expected that more than three serving cells are configured for the terminal device 2. In a case where at least one serving cell is the TDD UL-DL configuration is 5, it is not expected that more than two serving cells are configured for the terminal device 2.

The number of serving cells in which the carrier aggregation is able to be performed may be limited depending on the maximum M value within the TDD UL-DL configuration.

In a case where the maximum M value within the TDD UL-DL configuration is equal to or greater than 7, three or more serving cells are not configured. In a case where the maximum M value within the TDD UL-DL configuration is 6, four or more serving cells are not configured. In a case where the maximum M value within the TDD UL-DL configuration is 5, five or more serving cells are not configured.

Hereinafter, the supporting of the PUCCH format 1b for performing channel selection in a case where the table of the downlink association set different from that of the TDD primary cell is defined for the FDD secondary cell in a case where a plurality of cells to which different frame structure types are applied is aggregated will be described.

In a case where the carrier aggregation between the TDD cell and the FDD cell is configured and the primary cell is the TDD, and in a case where the maximum M value within the TDD UL-DL configuration is equal to or less than 4, the HARQ-ACK information is transmitted using the PUCCH format 1b or the PUCCH format 3 for performing the channel selection. In a case where the maximum M value within the TDD UL-DL configuration is equal to or greater than 5, the HARQ-ACK information is transmitted using only the PUCCH format 3.

For example, in a case where the downlink association set is defined for the FDD secondary cell in the table of FIG. 15, and also in a case where the downlink reference UL-DL configuration is 2, 4, or 5, only the PUCCH format 3 is supported, and the PUCCH format 1b for performing the channel selection is not supported.

In a case where more than one serving cell is configured for the terminal device 2, the primary cell is the TDD, and the downlink reference UL-DL configuration of at least one serving cell is 5, only the PUCCH format 3 is supported for the first and second serving cells. In a case where more than one serving cell is configured for the terminal device 2, the primary cell is the TDD, and the downlink reference UL-DL configuration of at least one serving cell is 2 or 4, only the PUCCH format 3 is supported for the first to fourth serving cells. In a case where more than one serving cell is configured for the terminal device 2, the primary cell is the TDD, and the downlink reference UL-DL configuration of at least one serving cell is 2, 4, or 5, the PUCCH format 1b for performing the channel selection is not supported.

For example, in a case where the downlink association set is defined for the FDD secondary cell in the table of FIG. 9, and also in a case where the downlink reference UL-DL configuration is 2, 3, 4, or 5, only the PUCCH format 3 is supported, and the PUCCH format 1b for performing the channel selection is not supported.

In a case where more than one serving cell is configured for the terminal device 2, the primary cell is the TDD, and the downlink reference UL-DL configuration of at least one serving cell is 5, only the PUCCH format 3 is supported for the first and second serving cells. In a case where more than one serving cell is configured for the terminal device 2, the primary cell is the TDD, and the downlink reference UL-DL configuration of at least one serving cell is 3 or 4, only the PUCCH format 3 is supported for the first to third serving cells. In a case where more than one serving cell is configured for the terminal device 2, the primary cell is the TDD, and the downlink reference UL-DL configuration of at least one serving cell is 2, only the PUCCH format 3 is supported for the first to fourth serving cells. In a case where more than one serving cell is configured for the terminal device 2, the primary cell is the TDD, and the downlink reference UL-DL configuration of at least one serving cell is 2, 4, or 5, the PUCCH format 1b for performing the channel selection is not supported.

The transmission of the PUCCH format may be switched for each subframe. For example, in a case where the carrier aggregation between the TDD cell and the FDD cell is configured and the primary cell is the TDD, and in a case where the maximum M value is equal to or less than 4 in the subframe n, the HARQ-ACK information is transmitted using the PUCCH format 1b or the PUCCH format 3 for performing the channel selection. In a case where the maximum M value is equal to or greater than 5 in the subframe n, the HARQ-ACK information is transmitted using only the PUCCH format 3.

For example, in a case where the downlink association set is defined in the table of FIG. 9 for the FDD secondary cell and the downlink reference UL-DL configuration is 3, the HARQ-ACK information is transmitted in only the PUCCH format 3 in the subframe 2, and the HARQ-ACK information is transmitted by the PUCCH format 1b or the PUCCH format 3 for performing the channel selection in the subframe 3 or 4. The selection of whether the HARQ-ACK information is transmitted the PUCCH format 1b or the PUCCH format 3 for performing the channel selection in the subframe 3 or 4 is configured in the higher layer. The transmission of the HARQ-ACK information in the PUCCH format 3 in the subframe 2 is configured irrespective of the configuration of the higher layer.

In a case where more than one serving cell is configured for the terminal device 2, the primary cell is the TDD, and the downlink reference UL-DL configuration of at least one serving cell is 5, only the PUCCH format 3 is supported for the first and second serving cells. In a case where more than one serving cell is configured for the terminal device 2, the primary cell is the TDD, and the downlink reference UL-DL configuration of at least one serving cell is 2, only the PUCCH format 3 is supported for the first to fourth serving cells. In a case where more than one serving cell is configured for the terminal device 2, the primary cell is the TDD, and the downlink reference UL-DL configuration of at least one serving cell is 2 or 5, the PUCCH format 1b for performing the channel selection is not supported. In a case where more than one serving cell is configured for the terminal device 2, the primary cell is the TDD, and the downlink reference UL-DL configuration of at least one serving cell is 3 or 4, the HARQ-ACK information is transmitted in the PUCCH format 3 in a case where M is greater than 4 and the HARQ-ACK information is transmitted by the PUCCH format 1b or the PUCCH format 3 for performing the channel selection in a case where M is equal to or less 4 in the subframe n.

Hereinafter, an example of the transmission timing of the HARQ-ACK information in the TDD cell in a case where the primary cell is the FDD cell will be described.

In a case where the primary cell is the FDD cell, the uplink resources (uplink component carriers) are configured in all the subframes. The transmission timing of the HARQ-ACK information corresponding to the PDSCH or the PDCCH indicating the releasing of the downlink SPS may follow the transmission timing of the HARQ-ACK information which is configured in the FDD cell. That is, even in the TDD cell, in a case where the primary cell is the FDD cell, the transmission timing is the same as the transmission timing of the HARQ-ACK information in a case where one FDD cell is configured or in a case where carrier aggregation in only the FDD cell is performed. That is, the terminal device 2 receives the PDSCH in a certain subframe, and then transmits the HARQ-ACK information corresponding to the PDSCH to the base station apparatus 1 over the PUCCH/PUSCH after 4 subframes.

That is, in the TDD cell, in a case where more than one serving cell is configured for the terminal device 2, at least two serving cells have different frame structure types, and the primary cell is the FDD cell, when the transmission of the PDSCH in which the terminal device 2 is used as a target and the HARQ-ACK information is given is detected in the subframe n−4, the terminal device 2 transmits the HARQ-ACK information in the subframe n.

In a case where the FDD cell is the primary cell and the TDD cell is the secondary cell, the base station apparatus 1 receives the HARQ-ACK information corresponding to the PDSCH which is transmitted in the TDD cell in a subframe after 4 subframes from the subframe in which the PDSCH is transmitted. In a case where the FDD cell is the primary cell and the TDD cell is the secondary cell, the terminal device 2 transmits the HARQ-ACK information corresponding to the PDSCH which is transmitted in the TDD cell in a subframe after 4 subframes from the subframe in which the PDSCH is transmitted in the TDD cell.

Accordingly, even when carrier aggregation between the TDD cell and the FDD cell is performed, the terminal device 2 can transmit the HARQ-ACK information corresponding to the PDSCH or the PDCCH indicating the releasing of the downlink SPS with high efficiency.

Hereinafter, the switching between the configurations of the uplink reference UL-DL configurations (UL-reference UL/DL configuration, virtual UL-DL configuration, virtual uplink reference UL-DL configuration, and PUSCH/PHICH-reference configuration) of the FDD cell and the TDD cell will be described.

The uplink reference UL-DL configuration applied (configured or referred) in the serving cell is configured depending on whether the types (FDD cell or TDD cell) of aggregated cells and the TDD UL-DL configurations are the same or are different or whether or not the cross carrier scheduling is configured for the serving cell.

In the FDD cell, the transmission timing of the PUSCH in the subframe n in which the uplink grant is transmitted is constantly n+4. Thus, in the determination of the transmission timing of the PUSCH, the uplink reference UL-DL configuration may not be configured for the FDD cell.

In the FDD cell, in a case where one or more FDD cells are configured for the terminal device 2, the uplink reference UL-DL configuration of the FDD cell is not configured.

In the FDD cell, in a case where two or more serving cells are configured for the terminal device 2, the FDD cell is the primary cell, and the monitoring of the PDCCH/EPDCCH of another TDD cell for the scheduling of the FDD cell is not configured for the terminal device 2, the uplink reference UL-DL configuration of the FDD cell is not configured.

In the TDD cell, in a case where one or more TDD cells are configured for the terminal device 2 and the UL-DL configurations of all the TDD cells are the same, the uplink reference UL-DL configuration of the TDD cell is the UL-DL configuration of the TDD.

In the TDD cell, in a case where two or more TDD cells are configured for the terminal device 2, the UL-DL configurations of at least two TDD cells are different, the TDD cell is the primary cell, and the monitoring of the PDCCH/EPDCCH of another TDD cell for the scheduling of the TDD cell is not configured for the terminal device 2, the uplink reference UL-DL configuration of the TDD cell is the UL-DL configuration of the TDD cell.

In the TDD cell, in a case where two or more TDD cells are configured for the terminal device 2, the UL-DL configurations of at least two TDD cells are different, the TDD cell is the secondary cell, and the monitoring of the PDCCH/EPDCCH of another TDD cell for the scheduling of the TDD cell is configured for the terminal device 2, the uplink reference UL-DL configuration of the TDD cell is determined from the predetermined table by the combination of the UL-DL configurations of the TDD cell and the another TDD cell.

In the TDD cell, in a case where two or more serving cells are configured for the terminal device 2, the TDD cell is the secondary cell, and the monitoring of the PDCCH/EPDCCH of another FDD cell for the scheduling of the TDD cell is configured for the terminal device 2, the uplink reference UL-DL configuration of the TDD cell is not configured.

In the TDD-FDD CA, the transmission timing of the PUSCH of the TDD cell in a case where the primary cell is the TDD follows the transmission timing of the TDD cell.

That is, in a case where the serving cell is the primary cell in the FDD-TDD and the primary cell frame structure type 2, the uplink reference UL-DL configuration of the serving cell is the UL/DL configuration of the serving cell.

In the TDD-FDD CA, the transmission timing of the PUSCH of the TDD cell for which the self scheduling is configured in a case where the secondary cell is the TDD follows the transmission timing of the TDD cell.

That is, in the FDD-TDD, in a case where the monitoring of the PDCCH/EPDCCH for the scheduling of the secondary serving cell in the frame structure type 2 in another serving cell is not configured for the terminal device 2, the uplink reference UL-DL configuration of the serving cell is the UL/DL configuration of the serving cell.

In the TDD-FDD CA, the transmission timing of the PUSCH of the TDD cell for which the cross carrier scheduling from the FDD cell is configured in a case where the secondary cell is the TDD follows the transmission timing of the TDD cell.

That is, in the FDD-TDD and the secondary serving cell in the frame structure type 2, in a case where the monitoring of the PDCCH/EPDCCH in the serving cell in another frame structure type 1 for the scheduling of the serving cell is configured for the terminal device 2, the uplink reference UL-DL configuration of the serving cell is the UL/DL configuration of the serving cell.

In the TDD-FDD CA, in a case where the cross carrier scheduling is configured for the TDD serving cell from the TDD serving cell, the transmission timing of the PUSCH is determined based on the uplink reference UL-DL configuration of the TDD serving cell scheduled by the combination of the UL-DL configurations of two TDD serving cells.

That is, in the FDD-TDD, in a case where more than one serving cell in the frame structure type 2 is configured for the terminal device 2, a prescribed serving cell is the secondary serving cell in the frame structure type 2, and the monitoring of the PDCCH/EPDCCH in the serving cell in another frame structure type 2 for the scheduling of the prescribed serving cell is configured, the uplink reference UL-DL configuration of the prescribed serving cell is determined from the prescribed table by the combination of the UL-DL configurations of the prescribed serving cell and the other serving cell.

Accordingly, even in a case where the carrier aggregation between the TDD cell and the FDD cell is performed, the terminal device 2 is able to transmit the PUSCH with high efficiency.

Hereinafter, a downlink assignment index (DAI) will be described.

The DAI is used for detecting the PDCCH/EPDCCH for assigning the transmission of the PDSCH which is transmitted from the base station apparatus 1 and is lost during the transmission and for detecting the PDCCH/EPDCCH indicating the releasing of the downlink SPS.

For example, in a state in which a plurality of HARQ-ACK information items in a plurality of downlink subframes is transmitted in one uplink subframe through the HARQ-ACK information bundling, even in a case where the PDCCH/EPDCCH transmitted in a certain downlink subframe is lost and the terminal device 2 is not able to detect the PDCCH/EPDCCH by the terminal device 2, since the terminal device 2 transmits ACK in a case where the reception of the PDSCH indicated by the PDCCH/EPDCCH transmitted in another downlink subframe succeeds, the base station apparatus 1 is not able to detect the lost PDCCH/EPDCCH.

Thus, the base station apparatus 1 notifies the terminal device 2 of a value which is based on the number of times of transmission of the PDCCH/EPDCCH indicating the releasing of the downlink SPS and the PDCCH/EPDCCH in the plurality of downlink subframes corresponding to one uplink subframe in which the HARQ-ACK information corresponding to the transmission of the PDSCH in the plurality of downlink subframes is able to be transmitted while being included in the DCI format by using the DAI. The terminal device 2 acquires a value which is based on the number of times of transmission of the PDCCH/EPDCCH indicating the releasing of the downlink SPS and the PDCCH/EPDCCH for assigning the transmission of the PDSCH transmitted from the base station apparatus 1 by using the DAI, and compares the value based on the number of times of transmission of the PDCCH/EPDCCH and the number of times the reception of the PDCCH/EPDCCH actually succeeds. If the value based on the number of times of the transmission and the number of times the reception succeeds are different, the terminal device 2 determines that the PDCCH/EPDCCH transmitted in a certain downlink subframe is lost, and transmits NACK to the base station apparatus 1. Since the base station apparatus 1 receives NACK, the base station apparatus 1 performs a retransmission process while including the PDSCH corresponding to the lost PDCCH/EPDCCH. Accordingly, even in a case where the PDCCH/EPDCCH is lost during the transmission, the terminal device 2 is able to detect the PDCCH/EPDCCH, and is able to perform the retransmission process.

When the multiplexed HARQ-ACK information is transmitted, the DAI is used for determining the number of bits of the multiplexed HARQ-ACK information. The DAI is used for determining the number of bits of the HARQ-ACK information transmitted over the PUCCH/PUSCH. The DAI is used for determining the arrangement of bits of the HARQ-ACK information transmitted over the PUCCH/PUSCH.

The DAI notified while being included in the downlink grant indicates an accumulated value of the PDCCH/EPDCCHs indicating the releasing of the downlink SPS and the PDCCH/EPDCCHs for assigning the transmission of the PDSCH until the current subframe of the plurality of downlink subframes corresponding to one uplink subframe in which the HARQ-ACK information corresponding to the transmission of the PDSCH in the plurality of downlink subframes is able to be transmitted. In other words, the DAI included in the downlink grant for triggering the transmission of the PDSCH in a subframe $n-k_i$ indicates the number of subframes in which the transmission of the PDSCH (the transmission of the PDSCH through the dynamic scheduling and/or the transmission of the PDSCH through the semi-persistent scheduling) to the terminal device 2 is performed among subframes ($n-k_0$ to $n-k_{i-1}$) before the subframe $n-k_i$ within the bundling window corresponding to the subframe n. In a case where a DAI field has two bits, the DAI field may represent the remainder calculated by dividing 4 by the number of subframes instead of the actual number of subframes.

The DAI notified while being included in the uplink grant indicates the value of the PDCCH/EPDCCH indicating the releasing of the downlink SPS and the PDCCH/EPDCCH for assigning the transmission of all the PDSCHs in the plurality of downlink subframes corresponding to one uplink subframe in which the HARQ-ACK information corresponding to the transmission of the PDSCH in the plurality of downlink subframes is able to be transmitted. In other words, the DAI included in the uplink grant for triggering the PUSCH transmission in the subframe n indicates the number of subframes in which the transmission of the PDSCH to the terminal device 2 is performed within the bundling window corresponding to the subframe n.

Figure 8:
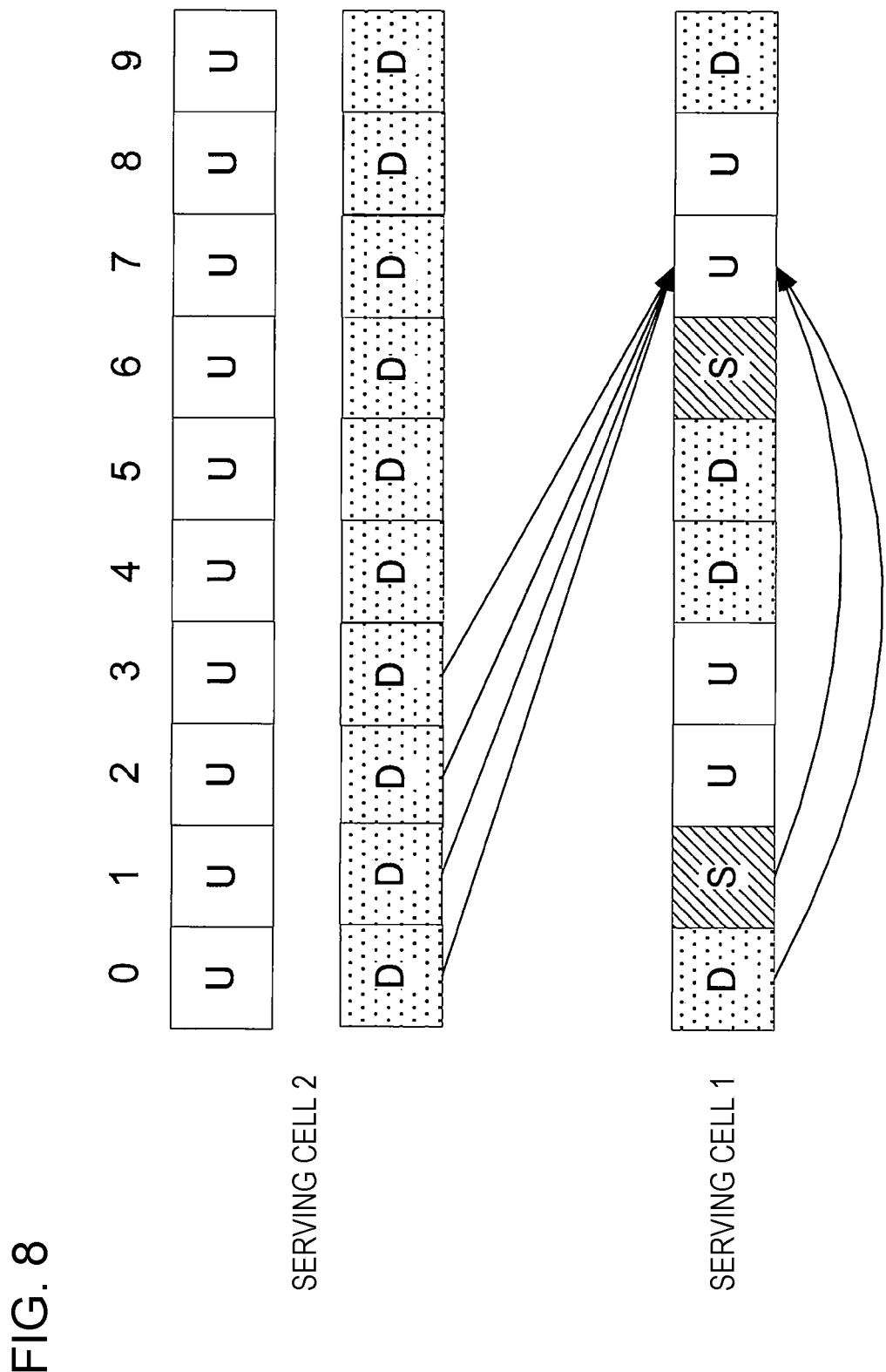
FIG. 8 is a diagram illustrating an example of a transmission timing of the HARQ-ACK information in TDD and FDD carrier aggregation according to the first embodiment of the present invention.

In the carrier aggregation between the FDD cell and the TDD cell, the relationship between the plurality of downlink subframes corresponding to one uplink subframe in which the HARQ-ACK information corresponding to the transmission of the PDSCH is able to be transmitted will be described. FIG. 8 illustrates an example of the relationship between the uplink subframe and the downlink subframe in the transmission of the HARQ-ACK information corresponding to the transmission of the PDSCH. In FIG. 8, it is assumed that a serving cell 1 is the TDD cell and a serving cell 2 is the FDD cell. The HARQ-ACK information corresponding to the transmission of the PDSCH which is transmitted in the downlink subframe of the subframe 1 is transmitted in the uplink subframe of the serving cell 1, and the HARQ-ACK information corresponding to the transmission of the PDSCH which is transmitted in the downlink subframe of the serving cell 2 is also transmitted in the uplink subframe of the serving cell 1. In the example of FIG. 8, the HARQ-ACK information corresponding to the transmission of the PDSCH of the subframes 0 and 1 of the serving cell 1 is transmitted in the uplink subframe of the subframe 7 of the serving cell 1. Since the plurality of downlink subframes is associated with one uplink subframe, it is detected that the PDCCH/EPDCCH is lost by using information of the DAI. The HARQ-ACK information corresponding to the transmission of the PDSCH in the subframes 0, 1, 2, and 3 of the serving cell 2 is also transmitted in the uplink subframe of the subframe 7 of the serving cell 1. In this case, the plurality of downlink subframes is also associated with one uplink subframe. That is, the information of the DAI is also included in the PDCCH/EPDCCH indicating the transmission of the PDSCH in the FDD cell, and thus, it is possible to detect that the PDCCH/EPDCCH is lost, and it is possible to perform communication with high efficiency.

The DAI is configured for each terminal.

The DAI (UL DAI) notified while being included in the uplink grant is commonly configured between the cells on which the carrier aggregation has been performed. The DAI notified while being included in the uplink grant may be individually configured for each of the cells on which the carrier aggregation has been performed. A case where the DAI is configured for each of the cells on which the carrier aggregation has been performed is, for example, a case where the transmission of the PUCCH is permitted in the secondary cell.

The DAI (DL DAI) notified while being included in the downlink grant is individually configured for each of the cells on which the carrier aggregation has been performed.

Hereinafter, the presence of a DAI field and application of the DAI in a case where it is assumed that the plurality of cells to which different frame structure types are applied is aggregated will be described.

The configuration of the DAI is switched depending on the frame structure type of the cell in which the HARQ-ACK information is transmitted. For example, in a case where the HARQ-ACK information of the FDD cell is transmitted in the TDD cell, the DAI field is configured for the DCI transmitted in the FDD cell. Meanwhile, in a case where the HARQ-ACK information of the TDD cell is transmitted in the FDD cell, the DAI field may not be configured for the DCI transmitted in the TDD cell.

The configuration of the DAI may be switched depending on the transmission timing of the HARQ-ACK information. For example, in a case where the HARQ-ACK information of the FDD cell is transmitted in the TDD cell by using the transmission timing of the HARQ-ACK information of the TDD cell, the HARQ-ACK information corresponding to the plurality of downlink subframes is transmitted in one uplink subframe, and thus, the DAI field is configured. In a case where the HARQ-ACK information of the TDD cell is transmitted in the FDD cell by using the transmission timing of the HARQ-ACK information of the FDD cell, the HARQ-ACK information corresponding to one downlink subframe is transmitted in one uplink subframe, and thus, the DAI field is not configured. Meanwhile, in a case where the HARQ-ACK information of the TDD cell is transmitted in the FDD cell by using the transmission timing of the HARQ-ACK information of the TDD cell, the HARQ-ACK information corresponding to the plurality of downlink subframes is transmitted in one uplink subframe, and thus, the DAI field is configured. In a case where the transmission timing of the HARQ-ACK information of the TDD cell is also applied to the FDD cell, if the HARQ-ACK information of the FDD cell is transmitted in the FDD cell, the DAI field is configured for the DCI.

That is, in a case where the HARQ-ACK information of the FDD cell is transmitted in the TDD cell by using the transmission timing of the HARQ-ACK information of the TDD cell, the DAI field is configured for the DCI. In a case where the HARQ-ACK information of the TDD cell is transmitted in the FDD cell by using the transmission timing of the HARQ-ACK information of the TDD cell, the DAI field is configured for the DCI. In a case where the HARQ-ACK information of the FDD cell is transmitted in the FDD cell by using the transmission timing of the HARQ-ACK information of the TDD cell, the DAI field is configured for the DCI. In a case where the HARQ-ACK information of the TDD cell is transmitted in the FDD cell by using the transmission timing of the HARQ-ACK information of the FDD cell, the DAI field may not be configured for the DCI.

The base station apparatus 1 performs transmission over the PDCCH by using the first DCI format or the second DCI format. The terminal device 2 performs reception over the PDCCH transmitted by using the first DCI format or the second DCI format. In a case where the total number of FDD cells and TDD cells is configured for the terminal device 2, the first DAI indicating the accumulated number of EPDCCHs or PDCCHs indicting the releasing of the downlink semi-persistent scheduling or the transmission of the PDSCH in the subframes until the current subframe within the prescribed subframe is present in the first DCI format of the FDD cell and is applied to the FDD cell, and the second DAI is present in the second DCI format of the FDD cell and is applied to the FDD cell.

Hereinafter, an example of the presence of the DAI field and the application of the DAI by the combination of the primary cell and the secondary cell will be described.

An example of the presence of the DAI field included in the DCI relating to the downlink grant will be described.

For example, in the terminal device 2 for which the FDD primary cell and the TDD secondary cell are configured, the number of downlink subframes of the TDD secondary cell is less than the number of uplink subframes of the FDD primary cell. Thus, the value of the DAI is generally configured as 1. In such a state, since the information of the DAI is not required, the information of the DAI may be excluded from the DCI for controlling the scheduling of the PDSCH of the TDD cell. That is, in a case where the primary cell is the FDD cell, the DAI field is not configured in the TDD cell and the FDD cell.

In the case of the TDD primary cell, in a case where the PDSCH is transmitted in the TDD cell and in a case where the PDSCH is transmitted in the FDD cell, the DAI is also transmitted while being included in the DCI relating to the downlink grant. In the case of the FDD primary cell, in both a case where the PDSCH is transmitted in the TDD cell and a case where the PDSCH is transmitted in the FDD cell, the DAI is transmitted without being included in the DCI relating to the downlink grant.

That is, only when the primary cell is the TDD cell, a 2-bit DAI field is present for the serving cell (FDD cell or TDD cell) in the DCI transmitted by the DCI format 1/1B/1D/2/2A/2B/2C/2D or the DCI format 1A used for a random access procedure which is initialized by the PDCCH order and compact scheduling of a code word of one PDSCH of a certain cell. Meanwhile, when the primary cell is the FDD cell, the DAI field is not present in the DCI.

An example of the presence of the DAI field included in the DCI relating to the downlink grant will be described.

The PUCCH including the HARQ-ACK information is primarily transmitted by using the PUCCH resource of the uplink subframe of the primary cell. Since the number of downlink subframes of the FDD secondary cell is greater than the number of uplink subframes of the TDD primary cell, the information of the DAI is also required in the DCI indicating the FDD cell. Meanwhile, in a case where the PUCCH including the HARQ-ACK information is able to be transmitted in the uplink subframe of the FDD secondary cell, the information of the DAI is not required in the DCI indicating the FDD cell.

That is, a 2-bit DAI field is present in the DCI transmitted to the TDD cell through all the UL-DL configurations or the FDD secondary cell (the FDD cell aggregated with the TDD primary cell) for which the transmission of the PUCCH in the FDD secondary cell is not configured by the higher layer and in which the primary cell is operated by TDD by the DCI format 1A used for the random access procedure initialized by the PDCCH order and the compact scheduling of the code word of one PDSCH of a certain cell or the DCI format 1/1B/1D/2/2A/2B/2C/2D.

That is, meanwhile, in a case where the transmission of the PUCCH in the FDD secondary cell by the higher layer is configured, the DAI field is not present in the DCI transmitted to the FDD cell.

An example of the presence of the DAI field included in the DCI relating to the downlink grant will be described.

The 2-bit DAI field is present in the DCI transmitted to the TDD cell in a case where the transmission of the PUCCH in the FDD secondary cell is configured by the higher layer or the serving cell (FDD cell or TDD cell) in a case where the transmission of the PUCCH in the FDD secondary cell is not configured by the higher layer and the primary cell is the TDD by the DCI format 1A used for the random access procedure initialized by the PDCCH order and the compact scheduling of the code word of one PDSCH of a certain cell or the DCI format 1/1B/1D/2/2A/2B/2C/2D.

Meanwhile, the DAI field is not present in the DCI transmitted to the FDD cell in a case where the transmission of the PUCCH in the secondary cell is configured by the higher layer or the serving cell in a case where the transmission of the PUCCH in the secondary cell is not configured by the higher layer and the primary cell is not the TDD cell.

An example of the presence of the DAI field included in the DCI relating to the uplink grant will be described.

When the primary cell is the TDD cell, in a case where the PDSCH is transmitted in the TDD cell for which the UL-DL configurations 1 to 6 are configured and in a case where the PDSCH is transmitted in the FDD cell, the DAI is also transmitted while being included in the DCI relating to the uplink grant. Meanwhile, when the primary cell is the FDD cell, in a case where the PDSCH is transmitted in the TDD cell and in a case where the PDSCH is transmitted in the FDD cell, the DAI is also transmitted without being included in the DCI relating to the uplink grant.

That is, only when the primary cell is the TDD cell, the 2-bit DAI field is present in the DCI transmitted to the FDD cell or the TDD cell for which the UL-DL configurations 1 to 6 are configured by the DCI format 0/4.

That is, when the primary cell is not the TDD cell, the DAI field is not present in the DCI transmitted by the DCI format 0/4.

An example of the presence of the DAI field included in the DCI relating to the uplink grant will be described.

In a case where the transmission of the PUCCH in the FDD secondary cell is not configured by the higher layer, the 2-bit DAI field is present in the DCI transmitted to the FDD secondary cell (the FDD cell aggregated with the TDD primary cell) in which the primary cell is operated by the TDD or the TDD cell for which the UL-DL configurations 1 to 6 are configured by the DCI format 0/4.

In a case where the transmission of the PUCCH in the FDD secondary cell is configured by the higher layer, the DAI field is not present in the DCI transmitted to the FDD cell or the TDD cell for which the UL-DL configuration 0 is configured by the DCI format 0/4.

An example of the presence of the DAI field included in the DCI relating to the uplink grant will be described.

In a case where the transmission of the PUCCH in the FDD secondary cell is configured by the higher layer, the 2-bit DAI field is present in the DCI transmitted to the TDD cell for which the UL-DL configurations 1 to 6 are configured by the DCI format 0/4.

In a case where the transmission of the PUCCH in the FDD secondary cell is configured by the higher layer, the DAI field is not present in the DCI transmitted to the FDD cell and the TDD cell for which the UL-DL configuration 0 is configured by the DCI format 0/4.

An example of the application of the DAI field included in the DCI relating to the downlink grant will be described.

When the carrier aggregation between the TDD cell and the FDD cell is performed, the DAI field may be generally applied to the FDD cell.

In a case where one or more TDD cells are configured and the UL-DL configurations of all the TDD cells are the same, the DAI field in the DCI relating to the downlink grant is applied to the TDD cell for which the UL-DL configurations 1 to 6 are configured. In a case where two or more TDD cells are configured and different UL-DL configurations are configured for at least two TDD cells, the DAI field in the DCI relating to the downlink grant is applied to the TDD cell for which the downlink reference UL-DL configurations 1 to 6 are configured. In a case where the primary cell is the TDD cell and at least one secondary cell is the FDD, the DAI field in the DCI relating to the downlink grant is applied to the FDD cell.

That is, in a case where one TDD cell is configured for the terminal device 2 or in a case where more than one TDD cell is configured for the terminal device 2 and the UD-DL configurations of all the TDD cells are the same, the DAI field is applied to the serving cell for which the UL-DL configurations 1 to 6 are configured. In a case where more than one serving cell is configured for the terminal device 2 and different UL-DL configurations are configured for at least two TDD cells or in a case where at least one serving cell is the FDD cell, the DAI field is applied to the FDD cell or the TDD cell for which the downlink reference UL-DL configurations 1 to 6 are configured.

An example of the application of the DAI field included in the DCI relating to the uplink grant will be described.

In a case where one or more TDD cells are configured and the UL-DL configurations of all the TDD cells are the same, the DAI field in the DCI relating to the uplink grant is applied to the TDD cell for which the UL-DL configurations 1 to 6 are configured. In a case where two or more TDD cells are configured and different UL-DL configurations are configured for at least two TDD cells, the DAI field in the DCI relating to the uplink grant is applied to the TDD cell for which the uplink reference UL-DL configurations 1 to 6 are configured. In a case where the primary cell is the TDD cell and at least one secondary cell is the FDD cell, the DAI field in the DCI relating to the uplink grant is applied to the FDD cell.

That is, in a case where one TDD cell is configured for the terminal device 2 or in a case where more than one TDD cell is configured for the terminal device 2 and the UD-DL configurations of all the TDD cells are the same, the DAI field is applied to the serving cell for which the UL-DL configurations 1 to 6 are configured. In a case where more than one serving cell is configured for the terminal device 2 and different UL-DL configurations are configured for at least two TDD cells or in a case where at least one serving cell is the FDD cell, the DAI field is applied to the FDD cell or the TDD cell for which the uplink reference UL-DL configurations 1 to 6 are configured.

The combination of the presence of the DAI field included in the DCI relating to the downlink grant or the uplink grant and the application of the DAI is not limited thereto.

An example of the combination of the presence of the DAI field included in the DCI relating to the downlink grant or the uplink grant and the application of the DAI will be described.

In a case where one TDD cell is configured for the terminal device 2 or in a case where more than one serving cell is configured for the terminal device 2 and the primary cell is the TDD, the base station apparatus 1 configures the DAI field for the DCI included in the PDCCH/EPDCCH transmitted in association with the serving cell (TDD cell or FDD cell).

Only when the primary cell is the TDD cell, the 2-bit DAI field is present in the DCI transmitted to the serving cell (FDD cell or TDD cell) by the DCI format 1/1B/1D/2/2A/2B/2C/2D or the DCI format 1A used for the compact scheduling of the code word of one PDSCH of a certain cell and the random access procedure initialized by the PDCCH order. Meanwhile, when the primary cell is the FDD cell, the DAI field is not present in the DCI.

Irrespective of whether or not the primary cell is the TDD cell, the 2-bit field may be reserved in the DCI transmitted to the TDD cell for which the UL-DL configuration 0 is configured by the DCI format 1/1B/1D/2/2A/2B/2C/2D or the DCI format 1A used for the compact scheduling of the code word of one PDSCH of the certain cell and the random access procedure initialized by the PDCCH order.

In a case where one serving cell is configured for the terminal device 2 or in a case where more than one serving cell is configured for the terminal device 2 and the UD-DL configurations of all the serving cells are the same, the DAI field is applied to the serving cell for which the UL-DL configurations 1 to 6 are configured. In a case where more than one serving cell is configured for the terminal device 2 and different UL-DL configurations are configured for at least two serving cells or in a case where at least one serving cell is the FDD cell, the DAI field is applied to the FDD cell or the TDD cell for which the downlink reference UL-DL configurations 1 to 6 are configured. In other words, in a case where one serving cell is configured for the terminal device 2 or in a case where more than one serving cell is configured for the terminal device 2 and the UD-DL configurations of all the serving cells are the same, the DAI field is not applied to the serving cell for which the UL-DL configuration 0 is configured. In a case where more than one serving cell is configured for the terminal device 2 and different UL-DL configurations are configured for at least two serving cells or in a case where at least one serving cell is the FDD cell, the DAI field is not applied to the serving cell for which the downlink reference UL-DL configuration 0 is configured.

The 2-bit DAI field is present in the DCI transmitted to the TDD cell by the DCI format 1A in which the CRC is scrambled by the RA-RNTI, the P-RNTI, or the SI-RNTI.

Meanwhile, the DAI field is not present in the DCI transmitted to the FDD cell by the DCI format 1A in which the CRC is scrambled by the RA-RNTI, the P-RNTI, or the SI-RNTI.

Only when the primary cell is the TDD cell, the 2-bit DAI field is present in the DCI transmitted to the FDD cell or the TDD cell for which the UL-DL configurations 1 to 6 are configured by DCI format 0/4. When the primary cell is not the TDD cell, the DAI field is not provided in the DCI transmitted by the DCI format 0/4.

In a case where one TDD cell is configured for the terminal device 2 or in a case where more than one TDD cell is configured for the terminal device 2 and the UD-DL configurations of all the TDD cells are the same, the DAI field is applied to the serving cell for which the UL-DL configurations 1 to 6 are configured. In a case where more than one serving cell is configured for the terminal device 2 and different UL-DL configurations are configured for at least two TDD cells or in a case where at least one serving cell is the FDD cell, the DAI field is applied to the FDD cell or the TDD cell for which the uplink reference UL-DL configurations 1 to 6 are configured.

The DAI field may not be reserved in the DCI transmitted to the TDD cell for which the UL-DL configuration 0 is configured by the DCI format 0/4.

An example of the combination of the presence of the DAI field included in the DCI relating to the downlink grant or the uplink grant and the application of the DAI will be described.

In a case where the transmission of the PUCCH in the secondary cell is not configured by the higher layer and also in a case where one TDD cell is configured for the terminal device 2, or in a case where more than one serving cell is configured for the terminal device 2 and the primary cell is the TDD cell, the base station apparatus 1 configures the DAI field for the DCI included in the PDCCH/EPDCCH transmitted in association with the TDD cell and the FDD cell. In other words, in a case where the transmission of the PUCCH in the secondary cell is configured by the higher layer, the base station apparatus 1 does not configure the DAI field for the DCI included in the PDCCH/EPDCCH transmitted in association with the FDD cell.

The 2-bit DAI field is present in the DCI transmitted by the TDD cell through all the UL-DL configurations or the FDD secondary cell (the FDD cell aggregated with the TDD primary cell) for which the transmission of the PUCCH in the FDD secondary cell is not configured by the higher layer and the primary cell is operated by the TDD by the DCI format 1/1B/1D/2/2A/2B/2C/2D or the DCI format 1A used for the compact scheduling of the code word of one PDSCH of a certain cell and a random access procedure initialized by the PDCCH order.

In a case where one TDD cell is configured for the terminal device 2 or in a case where more than one TDD cell is configured for the terminal device 2 and the UD-DL configurations of all the TDD cells are the same, the DAI field is applied to the serving cell for which the UL-DL configurations 1 to 6 are configured. In a case where more than one serving cell is configured for the terminal device 2 and different UL-DL configurations are configured for at least two TDD cells or in a case where at least one serving cell is the FDD cell, the DAI field is applied to the FDD cell or the TDD cell for which the downlink reference UL-DL configurations 1 to 6 are configured. In other words, in a case where one TDD cell is configured for the terminal device 2 or in a case where more than one serving cell is configured for the terminal device 2 and the UD-DL configurations of all the serving cells are the same, the DAI field is not applied to the serving cell for which the UL-DL configuration 0 is configured. In a case where more than one serving cell is configured for the terminal device 2 and different UL-DL configurations are configured for at least two serving cells, the DAI field is not applied to the serving cell for which the downlink reference UL-DL configuration 0 is configured.

In a case where the transmission of the PUCCH in the FDD secondary cell is configured by the higher layer, the DAI field is not present in the DCI transmitted to the FDD cell.

The 2-bit DAI field is present in the DCI transmitted to the TDD cell by the DCI format 1A in which the CRC is scrambled by the RA-RNTI, the P-RNTI, or the SI-RNTI.

Meanwhile, the DAI field is not present in the DCI transmitted to the FDD cell by the DCI format 1A in which the CRC is scrambled by the RA-RNTI, the P-RNTI, or the SI-RNTI.

In a case where the transmission of the PUCCH in the FDD secondary cell is not configured by the higher layer, the 2-bit DAI field is present in the DCI transmitted to the FDD secondary cell (the FDD cell aggregated with the TDD primary cell) in which the primary cell is operated by the TDD or the TDD cell for which the UL-DL configurations 1 to 6 are configured by the DCI format 0/4.

In a case where one TDD cell is configured for the terminal device 2 or in a case where more than one TDD cell is configured for the terminal device 2 and the UD-DL configurations of all the TDD cells are the same, the DAI field is applied to the serving cell for which the UL-DL configurations 1 to 6 are configured. In a case where more than one serving cell is configured for the terminal device 2 and different UL-DL configurations are configured for at least two TDD cells or in a case where at least one serving cell is the FDD cell, the DAI field is applied to the FDD cell or the TDD cell for which the uplink reference UL-DL configurations 1 to 6 are configured.

Meanwhile, in a case where the transmission of the PUCCH in the FDD secondary cell is configured by the higher layer, the DAI field is not present in the DCI transmitted to the FDD cell and the TDD cell for which the UL-DL configuration 0 is configured by the DCI format 0/4.

An example of the combination of the presence of the DAI field included in the DCI relating to the downlink grant or the uplink grant and the application of the DAI will be described.

In a case where the transmission of the PUCCH including HARQ-ACK information in the uplink subframe of the FDD secondary cell is configured and in a case where the PUCCH including the DAI is transmitted to the TDD cell or the transmission of the PUCCH including the HARQ-ACK information in the uplink subframe of the FDD secondary cell is not configured, when the primary cell is the TDD cell, the PUCCH including the DAI is transmitted to the serving cell (FDD cell or TDD cell).

That is, in a case where the transmission of the PUCCH in the secondary cell is not configured by the higher layer, in a case where one TDD cell is configured for the terminal device 2, or in a case where more than one serving cell is configured for the terminal device 2 and the primary cell is the TDD cell, the base station apparatus 1 configures the DAI field for the DCI included in the PDCCH/EPDCCH transmitted in association with the serving cell (FDD cell or TDD cell).

The 2-bit DAI field is present in the DCI transmitted to the TDD cell in a case where the transmission of the PUCCH in the FDD secondary cell is configured by the higher layer or the serving cell (FDD cell or TDD cell) in a case where the transmission of the PUCCH in the FDD secondary cell is not configured by the higher layer and the primary cell is the TDD by the DCI format 1A used for the random access procedure initialized by the PDCCH order and the compact scheduling of the code word of one PDSCH of a certain cell or the DCI format 1/1B/1D/2/2A/2B/2C/2D.

In a case where one TDD cell is configured for the terminal device 2 or in a case where more than one TDD cell is configured for the terminal device 2 and the UD-DL configurations of all the TDD cells are the same, the DAI field is applied to the serving cell for which the UL-DL configurations 1 to 6 are configured. In a case where more than one serving cell is configured for the terminal device 2 and different UL-DL configurations are configured for at least two TDD cells or in a case where at least one serving cell is the FDD cell, the DAI field is applied to the FDD cell or the TDD cell for which the downlink reference UL-DL configurations 1 to 6 are configured. In other words, in a case where one TDD cell is configured for the terminal device 2 or in a case where more than one serving cell is configured for the terminal device 2 and the UD-DL configurations of all the serving cells are the same, the DAI field is not applied to the serving cell for which the UL-DL configuration 0 is configured. In a case where more than one serving cell is configured for the terminal device 2 and different UL-DL configurations are configured for at least two serving cells, the DAI field is not applied to the serving cell for which the downlink reference UL-DL configuration 0 is configured.

Meanwhile, the DAI field is not present in the DCI transmitted to the FDD cell in a case where the transmission of the PUCCH in the secondary cell is configured by the higher layer or the serving cell in a case where the transmission of the PUCCH in the secondary cell is not configured by the higher layer and the primary cell is not the TDD cell.

The 2-bit DAI field is present in the DCI transmitted to the TDD cell by the DCI format 1A in which the CRC is scrambled by the RA-RNTI, the P-RNTI, or the SI-RNTI.

Meanwhile, the DAI field is not present in the DCI transmitted to the FDD cell by the DCI format 1A in which the CRC is scrambled by the RA-RNTI, the P-RNTI, or the SI-RNTI.

In a case where the transmission of the PUCCH in the FDD secondary cell is configured by the higher layer, the 2-bit DAI field is present in the DCI transmitted to the TDD cell for which the UL-DL configurations 1 to 6 are configured by the DCI format 0/4.

In a case where one TDD cell is configured for the terminal device 2 or in a case where more than one TDD cell is configured for the terminal device 2 and the UD-DL configurations of all the TDD cells are the same, the DAI field is applied to the serving cell for which the UL-DL configurations 1 to 6 are configured. In a case where more than one serving cell is configured for the terminal device 2 and different UL-DL configurations are configured for at least two TDD cells or in a case where at least one serving cell is the FDD cell, the DAI field is applied to the FDD cell or the TDD cell for which the uplink reference UL-DL configurations 1 to 6 are configured.

In a case where the transmission of the PUCCH in the FDD secondary cell is configured by the higher layer, the DAI field is not present in the DCI transmitted to the FDD cell and the TDD cell for which the UL-DL configuration 0 is configured by the DCI format 0/4.

In a case where the carrier aggregation between the TDD cell and the FDD cell is performed, a field having a length of 3 bits or more may be configured for the DAI notified while being included in the uplink grant. The field having a length of 3 bits or more may be configured for the DAI notified while being included in the downlink grant.

The DAI is used in a case where the number of elements M of the downlink association set is greater than 1 (two or more). The DAI is not used in a case where the field of the DAI is not present. The DAI may not be used in a case where the number of elements M of the downlink association set is 1.

That is, in a case where the TDD UL/DL configuration configured for the serving cell belongs to any one of {1, 2, 3, 4, 5, 6}, since the number of elements M of the downlink association set is greater than 1, the DAI is used. In a case where the TDD UL/DL configuration configured for the serving cell is 0, since the number of elements M of the downlink association set is 1, the DAI may not be used.

That is, in a case where the uplink reference UL-DL configuration configured for the serving cell belongs to any one of {1, 2, 3, 4, 5, 6}, since the number of elements M of the downlink association set is greater than 1, the UL DAI is used. In a case where the TDD UL/DL configuration configured for the serving cell is 0, since the number of elements M of the downlink association set is 1, the UL DAI may not be used.

That is, in a case where the downlink reference UL-DL configuration configured for the serving cell belongs to any one of {1, 2, 3, 4, 5, 6}, since the number of elements M of the downlink association set is greater than 1, the DL DAI is used. In a case where the TDD UL/DL configuration configured for the serving cell is 0, since the number of elements M of the downlink association set is 1, the DL DAI may not be used.

Hereinafter, a HARQ-ACK reporting procedure to which the UL DAI and the DL DAI are applied will be described.

In the TDD-FDD CA, in a case where the primary cell is the TDD (frame structure type 2), the DAI field is configured for the DCI. Thus, the number of HARQ-ACK bits and the allocation of the HARQ-ACK are determined using the UL DAI and the DL DAI.

That is, the FDD-TDD HARQ-ACK reporting procedure in the primary cell frame structure type 2 follows the HARQ-ACK reporting procedure in a case where the UL-DL configurations of two TDD serving cells are different.

Here, in the TDD-FDD CA (the carrier aggregation in a case where two or more serving cells are configured, the frame structure types of two serving cells are different, and the primary cell is the TDD) of the TDD primary cell, in a case where the cross carrier scheduling from the TDD cell is not configured for the FDD cell, the PDSCH is able to be transmitted in the subframe as the uplink subframe of the TDD primary cell. Thus, for example, the downlink association set associated with the transmission timing of the HARQ-ACK is applied to the FDD cell in the subframe as the uplink subframe illustrated in FIG. 9. Meanwhile, in other cases, for example, the downlink association set which is not associated with the transmission timing of the HARQ-ACK is applied to the subframe as the uplink subframe illustrated in FIG. 6.

That is, in the FDD-TDD HARQ-ACK reporting procedure in the primary cell frame structure type 2, in a case where the monitoring of the PDCCH/EPDCCH in another serving cell for the scheduling of the serving cell is not configured in the serving cell of the frame structure type 1, K is defined by the downlink association set of FIG. 6, and in other cases, K is defined by the downlink association set of FIG. 9.

In the TDD-FDD CA in which the primary cell is the TDD, the reception timing of the uplink grant in the subframe n in which the PUSCH is transmitted to the FDD cell is generally n−4. Thus, the UL DAI included in the DCI scheduled for the FDD cell is notified in the subframe n−4.

That is, in the FDD-TDD HARQ-ACK reporting procedure in the primary cell frame structure type 2, a value of $W^{UL}_{DAI}$ is determined by the DAI which corresponds to the PUSCH transmitted in the serving cell and is included in the DCI format 0/4 transmitted in the subframe n−4 in the serving cell having the frame structure type 1.

In the TDD-FDD CA in which the primary cell is the TDD, in a case where the self scheduling is performed on the FDD cell, as to the UL DAI included in the DCI scheduled for the FDD cell, the value of the DAI field notified in the subframe n−4 is applied in a case where the UL-DL configuration of the TDD primary cell is 1 to 6, and the value of the DAI field is not applied in a case where the UL-DL configuration of the TDD primary cell is 0.

That is, in the FDD-TDD HARQ-ACK reporting procedure in the primary cell frame structure type 2, in a case where the monitoring of the PDCCH/EPDCCH in another serving cell for the scheduling of the serving cell of the frame structure type 1 is not configured for the terminal device 2 in the serving cell of the frame structure type 1, and in a case where the uplink reference UL-DL configuration of the serving cell of the frame structure type 1 is 1 to 6, the value of $W^{UL}_{DAI}$ is determined by the DAI which corresponds to the PUSCH transmitted in the serving cell and is included in the DCI format 0/4 transmitted in the subframe n−4.

Hereinafter, a second uplink reference UL-DL configuration will be described.

The first uplink reference UL-DL configuration is used for determining a subframe interval (subframe timing) from the reception of the uplink grant to the transmission of the PUSCH and a subframe interval from the transmission of the PUSCH to the reception of the PHICH or in the application condition of the UL DAI. Meanwhile, the second uplink reference UL-DL configuration is used in the application condition of at least the UL DAI. The second uplink reference UL-DL configuration is not used for determining the subframe interval (subframe timing) between the reception of the uplink grant and the transmission of the PUSCH and the subframe interval between the transmission of the PUSCH and the reception of the PHICH.

That is, a terminal communicating with a base station by using the FDD cell and the TDD cell includes a reception unit which performs reception over the PDCCH transmitted using the DCI format. In a case where the primary cell is configured as the TDD cell for the terminal, the first uplink reference UL-DL configuration used for determining the interval between the transmission of the PUSCH and the reception of the PDCCH indicating the transmission of the PUSCH is configured for the TDD cell, and the second uplink reference UL-DL configuration used for determining whether or not the DAI included in the DCI format of the PDCCH indicating the transmission of the PUSCH is applied is configured for the FDD cell.

An example of an operation of the terminal device 2 in a case where the second uplink reference UL-DL configuration is configured will be described.

In the FDD cell, the subframe interval between the reception of the uplink grant and the transmission of the PUSCH and the subframe interval between the transmission of the PUSCH and the reception of the PHICH are configured as a fixed interval. Even though the second uplink reference UL-DL configuration is applied to the FDD serving cell, the terminal device 2 does not determine the timings of the reception of the uplink grant, the transmission of the PUSCH, and the reception of the PHICH based on the second uplink reference UL-DL configuration. Even though the second uplink reference UL-DL configuration is applied to the FDD serving cell, the base station apparatus 1 does not determine the timings of the transmission of the uplink grant, the reception of the PUSCH, and the transmission of the PHICH based on the uplink reference UL-DL configuration.

An example of the application condition of the UL DAI through the second uplink reference UL-DL configuration will be described.

The UL DAI is not applied (used) in a case where the second uplink reference UL-DL configuration 0 is configured. The UL DAI is applied (used) in a case where the second uplink reference UL-DL configuration (the second uplink reference UL-DL configuration 1, 2, 3, 4, 5, or 6) other than the second uplink reference UL-DL configuration 0 is configured.

In a case where it is assumed (supposed) that the uplink reference UL-DL configuration for the serving cell is a prescribed TDD UL-DL configuration, the terminal device 2 may configure (apply) the second uplink reference UL-DL configuration as the prescribed TDD UL-DL configuration for the serving cell.

The parameter of the second uplink reference UL-DL configuration may be in common with the parameter of the first uplink reference UL-DL configuration.

The method of configuring the second uplink reference UL-DL configuration may be in common with the method of configuring the first uplink reference UL-DL configuration.

Only the second uplink reference UL-DL configuration may be configured for the serving cell. That is, the second uplink reference UL-DL configuration may be configured for the serving cell, and the first uplink reference UL-DL configuration may not be configured for the serving cell.

An example of the second uplink reference UL-DL configuration of the serving cell frame structure type 1 in the FDD-TDD HARQ-ACK reporting procedure in the primary cell frame structure type 2 will be described.

In the FDD-TDD HARQ-ACK reporting procedure in the primary cell frame structure type 2, the second uplink reference UL-DL configuration of the serving cell frame structure type 1 is any one of {1, 2, 3, 4, 6} of the TDD UL/DL configuration. For example, the second uplink reference UL-DL configuration of the serving cell frame structure type 1 is the TDD UL/DL configuration 1.

In the FDD-TDD HARQ-ACK reporting procedure in the primary cell frame structure type 2, it is assumed (supposed) that the uplink reference UL-DL configuration of the serving cell frame structure type 1 is any one of {1, 2, 3, 4, 6} of the TDD UL/DL configuration. For example, it is assumed (supposed) that the uplink reference UL-DL configuration of the serving cell frame structure type 1 is the TDD UL/DL configuration 1.

An example of the second uplink reference UL-DL configuration of the serving cell frame structure type 1 in the FDD-TDD HARQ-ACK reporting procedure in the primary cell frame structure type 2 will be described.

In the FDD-TDD HARQ-ACK reporting procedure in the primary cell frame structure type 2, the second uplink reference UL-DL configuration of the serving cell frame structure type 1 is configured by the higher layer.

An example of the second uplink reference UL-DL configuration of the serving cell frame structure type 1 in the FDD-TDD HARQ-ACK reporting procedure in the primary cell frame structure type 2 will be described.

In the FDD-TDD HARQ-ACK reporting procedure in the primary cell frame structure type 2, the second uplink reference UL-DL configuration of the serving cell frame structure type 1 is any one of {1, 2, 3, 4, 6} of the TDD UL/DL configuration in a case where the monitoring of the PDCCH/EPDCCH in another serving cell for the scheduling of the serving cell is not configured in the serving cell of the frame structure type 1, and the second uplink reference UL-DL configuration of the serving cell frame structure type 1 is the UL/DL configuration of the primary cell in other cases.

In the FDD-TDD HARQ-ACK reporting procedure in the primary cell frame structure type 2, it is assumed (supposed) that the uplink reference UL-DL configuration of the serving cell frame structure type 1 is any one of {1, 2, 3, 4, 6} of the TDD UL/DL configuration in a case where the monitoring of the PDCCH/EPDCCH in another serving cell for the scheduling of the serving cell is not configured in the serving cell of the frame structure type 1, and it is assumed (supposed) that the uplink reference UL-DL configuration of the serving cell frame structure type 1 is the UL/DL configuration of the primary cell in other cases.

An example of the second uplink reference UL-DL configuration of the serving cell frame structure type 1 in the FDD-TDD HARQ-ACK reporting procedure in the primary cell frame structure type 2 will be described.

In the FDD-TDD HARQ-ACK reporting procedure in the primary cell frame structure type 2, the second uplink reference UL-DL configuration of the serving cell frame structure type 1 is any one of {1, 2, 3, 4, 6} of the TDD UL/DL configuration in a case where the monitoring of the PDCCH/EPDCCH in another serving cell for the scheduling of the serving cell is not configured in the serving cell of the frame structure type 1, and the second uplink reference UL-DL configuration of the serving cell frame structure type 1 is the UL/DL configuration of the primary cell in other cases.

In the FDD-TDD HARQ-ACK reporting procedure in the primary cell frame structure type 2, it is assumed (supposed) that the uplink reference UL-DL configuration of the serving cell frame structure type 1 is any one of {1, 2, 3, 4, 6} of the TDD UL/DL configuration in a case where the monitoring of the PDCCH/EPDCCH in another serving cell for the scheduling of the serving cell is not configured in the serving cell of the frame structure type 1, and it is assumed (supposed) that the uplink reference UL-DL configuration of the serving cell frame structure type 1 is the UL/DL configuration of the primary cell in other cases.

An example of the second uplink reference UL-DL configuration of the serving cell frame structure type 1 in the FDD-TDD HARQ-ACK reporting procedure in the primary cell frame structure type 2 will be described.

In the FDD-TDD HARQ-ACK reporting procedure in the primary cell frame structure type 2, the second uplink reference UL-DL configuration of the serving cell frame structure type 1 is the UL/DL configuration of the primary cell, but in a case where the monitoring of the PDCCH/EPDCCH in another serving cell for the scheduling of the serving cell is configured and in a case where the UL/DL configuration of the primary cell is 0, the second uplink reference UL-DL configuration of the serving cell frame structure type 1 is any one of {1, 2, 3, 4, 6}.

Hereinafter, a second downlink reference UL-DL configuration will be described.

The first downlink reference UL-DL configuration is used for determining a subframe interval (subframe timing) between the reception of the PDCCH/EPDCCH indicating the releasing of the SPS or the reception of the PDSCH and the transmission of the HARQ-ACK corresponding to the PDCCH/EPDCCH indicating the releasing of the SPS or the PDSCH, the application condition of the DL DAI, or the subframe in which the feedback of the HARQ-ACK bit is required. Meanwhile, the second downlink reference UL-DL configuration is used for determining the subframe in which the feedback of the HARQ-ACK bit is required. The second downlink reference UL-DL configuration is used in the application condition of the DL DAI. The second downlink reference UL-DL configuration is not used for determining the subframe interval (subframe timing) between the reception of the PDCCH/EPDCCH indicating the releasing of the SPS or the reception of the PDSCH and the transmission of the HARQ-ACK corresponding to the PDCCH/EPDCCH indicating the releasing of the SPS or the PDSCH.

That is, a terminal communicating with a base station by using the FDD cell and the TDD cell includes a reception unit which performs reception over the PDCCH transmitted using the DCI format. The first downlink reference UL-DL configuration used for determining an interval between the reception of the PDSCH and the transmission of the HARQ-ACK corresponding to the PDSCH is configured for the TDD cell and the FDD cell in a case where the primary cell is configured as the TDD cell for the terminal, the second uplink reference UL-DL configuration used for determining the downlink subframe or the special subframe is configured for the TDD cell in a case where the primary cell is configured as the FDD cell for the terminal.

An example of an operation of the terminal device 2 in a case where the second downlink reference UL-DL configuration is configured will be described.

In the FDD cell, the subframe interval between the reception of the PDCCH/EPDCCH indicating the releasing of the SPS or the reception of the PDSCH and the transmission of the HARQ-ACK corresponding to the PDCCH/EPDCCH indicating the releasing of the SPS or the PDSCH is configured as a fixed interval. Even though the second downlink reference UL-DL configuration is applied to the FDD serving cell, the terminal device 2 does not determine the subframe interval between the reception of the PDCCH/EPDCCH indicating the releasing of the SPS or the reception of the PDSCH and the transmission of the HARQ-ACK corresponding to the PDCCH/EPDCCH indicating the releasing of the SPS or the PDSCH based on the second downlink reference UL-DL configuration. Even though the second downlink reference UL-DL configuration is applied to the FDD serving cell, the base station apparatus 1 does not determine the timings of the transmission of the PDCCH/EPDCCH/PDSCH and the reception of the HARQ-ACK based on the downlink reference UL-DL configuration.

An example of the application condition of the DL DAI through the second downlink reference UL-DL configuration will be described.

The DL DAI is not applied (used) in a case where the second downlink reference UL-DL configuration 0 is configured. The DL DAI is applied (used) in a case where the second downlink reference UL-DL configuration (the second uplink reference UL-DL configuration 1, 2, 3, 4, 5, or 6) other than the second uplink reference UL-DL configuration 0 is configured.

In a case where it is assumed (supposed) that the downlink reference UL-DL configuration for the serving cell is a prescribed TDD UL-DL configuration, the terminal device 2 may configure (apply) the second downlink reference UL-DL configuration as the prescribed TDD UL-DL configuration for the serving cell.

The parameter of the second downlink reference UL-DL configuration may be in common with the parameter of the first downlink reference UL-DL configuration.

The method of configuring the second downlink reference UL-DL configuration may be in common with the method of configuring the first downlink reference UL-DL configuration.

Only the second downlink reference UL-DL configuration may be configured for the serving cell. That is, the second downlink reference UL-DL configuration may be configured for the serving cell, and the first downlink reference UL-DL configuration may not be configured for the serving cell.

In the FDD-TDD HARQ-ACK reporting procedure in the primary cell frame structure type 2, since the DL DAI is applied to the FDD cell on which the self scheduling has been performed, the allocation of the HARQ-ACK bits is determined using the DL DAI. In this case, since the downlink reference UL-DL configuration 0 is the configuration in which the DL DAI is not used, the FDD cell assumes (supposes) that downlink reference UL-DL configuration 0 is the downlink reference UL-DL configuration of which M is equal to or greater than 2 and is equal to or less than 4 is configured for the FDD cell, and follows the method of allocating the HARQ-ACK in a case where the UL-DL configurations of two TDD serving cells are different.

That is, in a case where the monitoring of the PDCCH/EPDCCH for the FDD serving cell in another serving cell is not configured for the terminal device 2, the association of the HARQ-ACK with the transmission of the PDSCH through the corresponding PDCCH/EPDCCH or the PDCCH/EPDCCH indicating the releasing of the downlink SPS is the same as the association of the HARQ-ACK in a case where the UL-DL configurations of two TDD serving cells for the serving cell of the downlink reference UL-DL configurations {1, 2, 3, 4, 6} are different in the subframe n−k of the FDD serving cell. Here, k is an element of the set K (downlink association set) (k∈K).

Hereinafter, the HARQ-ACK reporting procedure will be described in detail.

An example of the use of the DAI will be described.

In the TDD-FDD CA of the TDD primary cell, in the configured serving cell, in a case where the serving cell is the TDD and the downlink reference UL-DL configuration is 0, the DAI included in the DCI format 1/1A/1B/1D/2/2A/2B/2C/2D is not used.

In the TDD-FDD CA of the TDD primary cell, in the configured serving cell, in a case where the serving cell is the FDD, the cross carrier scheduling from another cell is configured for the FDD cell, and the downlink reference UL-DL configuration is 0, the DAI included in the DCI format 1/1A/1B/1D/2/2A/2B/2C/2D is not used.

An example of the use of the DAI will be described.

In the configured serving cell, in a case where the downlink reference UL-DL configuration is 0, the DAI included in the DCI format 1/1A/1B/1D/2/2A/2B/2C/2D is not used. In the configured serving cell, in a case where the uplink reference UL-DL configuration is 0, the DAI included in the DCI format 0/4 is not used.

An example of the use of the DAI will be described.

In the configured serving cell, in a case where the downlink reference UL-DL configuration of the TDD primary cell is 0, the DAI included in the DCI format 1/1A/1B/1D/2/2A/2B/2C/2D is not used. In the configured serving cell, in a case where the uplink reference UL-DL configuration of the TDD primary cell is 0, the DAI included in the DCI format 0/4 is not used.

An example of the use of the DAI will be described.

In the configured serving cell, in a case where the primary cell is the FDD cell or the downlink reference UL-DL configuration of the serving cell is 0, the DAI included in the DCI format 1/1A/1B/1D/2/2A/2B/2C/2D is not used. In the configured serving cell, in a case where the primary cell is the FDD cell or the uplink reference UL-DL configuration of the serving cell is 0, the DAI included in the DCI format 0/4 is not used.

An example of the use of the DAI will be described.

In the configured serving cell, in a case where the primary cell is the FDD cell or the downlink reference UL-DL configuration of the TDD primary cell is 0, the DAI included in the DCI format 1/1A/1B/1D/2/2A/2B/2C/2D is not used. In the configured serving cell, in a case where the primary cell is the FDD cell or the uplink reference UL-DL configuration of the TDD primary cell is 0, the DAI included in the DCI format 0/4 is not used.

In the TDD cell, the value of the DAI notified while being included in the uplink grant is used for determining $V^{UL}_{DAI}$ and $W^{UL}_{DAI}$. In a case where one TDD serving cell is configured and the PUCCH format 3 is not configured for the terminal device 2, $V^{UL}_{DAI}$ is determined using the value of the DAI notified while being included in the uplink grant. In a case where more than one serving cell is configured for the terminal device 2 or one serving cell and the PUCCH format 3 are configured for the terminal device 2, $W^{UL}_{DAI}$ is determined using the value of the DAI notified while being included in the uplink grant.

The base station apparatus 1 transmits the uplink grant including the DAI according to the table of FIG. 13. FIG. 13 is an example illustrating an uplink association index. An uplink association index k' is defined using the table of FIG. 13. In a case where the uplink grant including the DAI is transmitted in the subframe n, the PUSCH is transmitted in the subframe n+k'. In a case where the terminal device 2 transmits the HARQ-ACK information in the subframe in which the PUSCH is transmitted, the HARQ-ACK information is constituted using the information of the DAI, and is transmitted over the PUSCH.

That is, in the serving cell for which one configuration of the TDD UL-DL configurations 1 to 6 is configured, in a case where the PUCCH format 3 is not configured for the terminal device 2, the value $V^{UL}{}_{DAI}$ of the DAI included in the DCI format 0/4 detected by the terminal device 2 in the subframe n−k' indicates the total number of subframes including the PDCCH/EPDCCH indicating the downlink SPS and the transmission of the PDSCH corresponding to the terminal device 2, among all the subframes n−k. Here, k' is defined by the table of FIG. 13, or k belongs to K (k∈K). The value of $V^{UL}{}_{DAI}$ includes all the transmission of the PDSCH corresponding to the PDCCH/EPDCCH and the transmission of the PDSCH which does not correspond to the PDCCH/EPDCCH among all the subframes. In a case where there are not both the PDCCH/EPDCCH indicating the releasing of the downlink SPS resource and the transmission of the PDSCH indicated for the terminal device 2, it is expected that the terminal device 2 configures 4 for the value of the DAI included in the transmitted DCI format.

That is, in the TDD cell in which more than one serving cell is configured for the terminal device 2 and for which the TDD UL-DL configurations 1 to 6 are configured, or in the TDD cell in which one serving cell and the PUCCH format 3 are configured for the terminal device 2 and for which the TDD UL-DL configurations 1 to 6 are configured, the value of $W^{UL}{}_{DAI}$ is determined by the DAI included in the DCI format 0/4 in the subframe n−k'. Here, k' is defined by the table of FIG. 13. In a case where there are not both the PDCCH/EPDCCH indicating the releasing of the downlink SPS resource and the transmission of the PDSCH indicated for the terminal device 2, it is expected that the terminal device 2 configures 4 for $W^{UL}{}_{DAI}$ by the DAI included in the transmitted DCI format.

That is, in a case where the uplink reference UL-DL configuration of a certain serving cell belongs to any one of {1, 2, 3, 4, 5, 6}, the value of $W^{UL}{}_{DAI}$ is determined by the DAI which corresponds to the PUSCH transmitted in the serving cell and is included in the DCI format 0/4 transmitted in the subframe n−k'. Here, k' is defined by the table of FIG. 13, and the TDD UL-DL configuration of the table of FIG. 13 refers to the uplink reference UL-DL configuration of the serving cell. In a case where there are not both the PDCCH/EPDCCH indicating the releasing of the downlink SPS resource and the transmission of the PDSCH indicated for the terminal device 2, it is expected that the terminal device 2 configures 4 for $W^{UL}{}_{DAI}$ by the DAI included in the transmitted DCI format.

Hereinafter, the determination of $W^{UL}{}_{DAI}$ in a case where the plurality of cells to which different frame structure types are applied is aggregated will be described.

In a case where the primary cell is the TDD cell, in the FDD cell, $W^{UL}{}_{DAI}$ may also be configured by the value of the DAI included in the uplink grant.

An example of a case where the DAI field is configured for the serving cell only in a case where the cell is the TDD primary cell and a case where the uplink reference UL-DL configuration is configured for the FDD cell will be described.

That is, in a case where the primary cell is the TDD cell and the uplink reference UL-DL configuration of a certain serving cell belongs to any one of {1, 2, 3, 4, 5, 6}, the value of $W^{UL}{}_{DAI}$ is determined by the DAI which corresponds to the PUSCH transmitted in the serving cell and is included in the DCI format 0/4 transmitted in the subframe n−k'. Here, k' is defined by the table of FIG. 13, and the TDD UL-DL configuration of the table of FIG. 13 refers to the uplink reference UL-DL configuration of the serving cell. In a case where there are not both the PDCCH/EPDCCH indicating the releasing of the downlink SPS resource and the transmission of the PDSCH indicated for the terminal device 2, it is expected that the terminal device 2 configures 4 for $W^{UL}{}_{DAI}$ by the DAI included in the transmitted DCI format.

An example of a case where the DAI field is configured for the serving cell only in a case where the cell is the TDD primary cell and a case where the uplink reference UL-DL configuration is not configured for the FDD cell will be described.

$W^{UL}{}_{DAI}$ is determined by the value of the UL DAI. $W^{UL}{}_{DAI}$ is notified from the base station apparatus 1 to the terminal device 2 while being included in the uplink grant indicating the scheduling of the PUSCH transmitted while including the HARQ-ACK. Thus, the reception timing of the UL DAI is the same as the reception timing of the uplink grant for scheduling the PUSCH. That is, in the subframe n in which the PUSCH including the HARQ-ACK is transmitted, the UL DAI is notified in the subframe n−k' in the TDD cell in which the PUSCH is scheduled, and the UL DAI is notified in the subframe n−4 in the FDD cell in which the PUSCH is scheduled.

That is, in a case where the primary cell is the TDD cell and the uplink reference UL-DL configuration of a certain configured TDD cell belongs to any one of {1, 2, 3, 4, 5, 6}, the value of $W^{UL}{}_{DAI}$ is determined by the DAI which corresponds to the PUSCH transmitted in the TDD cell and is included in the DCI format 0/4 transmitted in the subframe n−k' or the DAI which corresponds to the PUSCH transmitted in the FDD cell and is included in the DCI format 0/4 transmitted in the subframe n−4. Here, k' is defined by the table of FIG. 13, and the TDD UL-DL configuration of the table of FIG. 13 refers to the uplink reference UL-DL configuration of the TDD cell. In a case where there are not both the PDCCH/EPDCCH indicating the releasing of the downlink SPS resource and the transmission of the PDSCH indicated for the terminal device 2, it is expected that the terminal device 2 configures 4 for $W^{UL}{}_{DAI}$ by the DAI included in the transmitted DCI format.

An example of a case where the DAI field is configured for the FDD secondary cell for which the TDD cell is the TDD primary cell are configured and a case where the uplink reference UL-DL configuration is configured for the FDD cell will be described.

That is, in the FDD secondary cell aggregated with the TDD cell or the TDD primary cell, in a case where the primary cell is the TDD cell and the uplink reference UL-DL configuration of a certain serving cell belongs to any one of {1, 2, 3, 4, 5, 6}, the value of $W^{UL}{}_{DAI}$ is determined by the DAI which corresponds to the PUSCH transmitted in the serving cell and is included in the DCI format 0/4 transmitted in the subframe n−k'. Here, k' is defined by the table of FIG. 13, and the TDD UL-DL configuration of the table of FIG. 13 refers to the uplink reference UL-DL configuration of the serving cell. In a case where there are not both the PDCCH/EPDCCH indicating the releasing of the downlink SPS resource and the transmission of the PDSCH indicated for the terminal device 2, it is expected that the terminal device 2 configures 4 for $W^{UL}{}_{DAI}$ by the DAI included in the transmitted DCI format.

An example of a case where the DAI field is configured for the FDD secondary cell for which the TDD cell and the TDD primary cell are configured and a case where the uplink reference UL-DL configuration is not configured for the FDD cell will be described.

That is, in the FDD secondary cell aggregated with the TDD cell or the TDD primary cell, in a case where the uplink reference UL-DL configuration of a certain TDD cell belongs to any one of $\{1, 2, 3, 4, 5, 6\}$, the value of $W^{UL}_{DAI}$ is determined by the DAI which corresponds to the PUSCH transmitted in the TDD cell and is included in the DCI format 0/4 transmitted in the subframe n−k' or the DAI which corresponds to the PUSCH transmitted in the FDD cell and is included in the DCI format 0/4 transmitted in the subframe n−4. Here, k' is defined by the table of FIG. 13, and the TDD UL-DL configuration of the table of FIG. 13 refers to the uplink reference UL-DL configuration of the TDD cell. In a case where there are not both the PDCCH/EPDCCH indicating the releasing of the downlink SPS resource and the transmission of the PDSCH indicated for the terminal device 2, it is expected that the terminal device 2 configures 4 for $W^{UL}_{DAI}$ by the DAI included in the transmitted DCI format.

The uplink reference UL-DL configuration of the configuration of the value of $W^{UL}_{DAI}$ refers to any one of the configured first uplink reference UL-DL configuration and the second uplink reference UL-DL configuration. In a case where both the first uplink reference UL-DL configuration and the second uplink reference UL-DL configuration are configured for the serving cell, this configuration refers to the second uplink reference UL-DL configuration.

In the TDD cell, the value of the DAI notified while being included in the downlink grant is used for determining $V^{DL}_{DAI}$.

In the TDD cell in which the TDD UL-DL configurations 1 to 6 are configured in a case where one TDD cell or two or more TDD cells having the same TDD UL-DL configurations are configured for the terminal device 2 or in the TDD cell in which the downlink reference UL-DL configuration belongs to any one of $\{1, 2, 3, 4, 5, 6\}$ in a case where two or more TDD cells are configured for the terminal device 2 and the TDD UL-DL configurations of at least two TDD cells are different, the value of the DAI included in the DCI format 1/1A/1B/1D/2/2A/2B/2C/2D indicates the accumulated number of PDCCHs or EPDCCHs indicating the releasing of the downlink SPS (semi-persistent scheduling) or the transmission of the PDSCH in the subframes until the current subframe of the subframes n−k of the respective configured serving cells, and the value of the DAI is updated for each subframe. $V^{DL}_{DAI, c}$ indicates the value of the DAI included in the PDCCH/EPDCCH transmitted with the DCI format 1/1A/1B/1D/2/2A/2B/2C/2D detected by the terminal device 2 in the subframe n−$k_m$ of the serving cell c. Here, $k_m$ belongs to the set K defined by the table of FIG. 6 and is a minimum value of the values of $k_m$ detected in the 1/1A/1B/1D/2/2A/2B/2C/2D by the terminal device 2. In a case where one serving cell is configured, the description of c of $V^{DL}_{DAI, c}$ may be deleted.

Hereinafter, the determination of $V^{DL}_{DAI, c}$ in a case where the plurality of cells to which different frame structure types are applied is aggregated will be described.

In a case where the primary cell is the TDD cell, in the FDD cell, $V^{DL}_{DAI, c}$ may also be configured by the value of the DAI included in the downlink grant.

An example of a case where the DAI field is configured for the serving cell only in a case where the cell is the TDD primary cell and a case where the table for defining the downlink association set is individually configured in the TDD cell and the FDD cell will be described.

In the primary cell is the TDD, in the FDD cell or the TDD cell in which the downlink reference UL-DL configurations 1 to 6 are configured, the value of the DAI included in the DCI format 1/1A/1B/1D/2/2A/2B/2C/2D indicates the accumulated number of PDCCHs or EPDCCHs indicating the releasing of the downlink SPS (semi-persistent scheduling) or the transmission of the PDSCH in the subframes until the current subframe of the subframes n−k of the respective configured serving cells, and the value of the DAI is updated for each subframe. $V^{DL}_{DAI, c}$ indicates the value of the DAI included in the PDCCH/EPDCCH transmitted with the DCI format 1/1A/1B/1D/2/2A/2B/2C/2D detected by the terminal device 2 in the subframe n−$k_m$ of the serving cell c. Here, $k_m$ belongs the set K defined by the table of FIG. 9 in the FDD cell and belongs to the set K defined by the table of FIG. 6 in the TDD cell, and is a minimum value of the values of $k_m$ detected in the 1/1A/1B/1D/2/2A/2B/2C/2D by the terminal device 2.

An example of a case where the DAI field is configured for the FDD secondary cell for which the TDD cell and the TDD primary cell are configured and a case where the table for defining the downlink association set is individually configured in the TDD cell and the FDD cell will be described.

In the FDD secondary cell aggregated with the TDD primary cell or in the TDD cell for which the downlink reference UL-DL configurations 1 to 6 are configured, the value of the DAI included in the DCI format 1/1A/1B/1D/2/2A/2B/2C/2D indicates the accumulated number of PDCCHs or EPDCCHs indicating the releasing of the downlink SPS (semi-persistent scheduling) or the transmission of the PDSCH in the subframes until the current subframe of the subframes n−k of the respective configured serving cells, and the value of the DAI is updated for each subframe. $V^{DL}_{DAI}$, c indicates the value of the DAI included in the PDCCH/EPDCCH transmitted with the DCI format 1/1A/1B/1D/2/2A/2B/2C/2D detected by the terminal device 2 in the subframe n−$k_m$ of the serving cell c. Here, $k_m$ belongs the set K defined by the table of FIG. 9 in the FDD cell and belongs to the set K defined by the table of FIG. 6 in the TDD cell, and is a minimum value of the values of $k_m$ detected in the 1/1A/1B/1D/2/2A/2B/2C/2D by the terminal device 2.

An example of a case where the DAI field is configured for the serving cell only in a case where the cell is the TDD primary cell and a case where the table for defining the downlink association set is commonly configured in the TDD cell and the FDD cell will be described.

In the primary cell is the TDD, in the FDD cell or the TDD cell in which the downlink reference UL-DL configurations 1 to 6 are configured, the value of the DAI included in the DCI format 1/1A/1B/1D/2/2A/2B/2C/2D indicates the accumulated number of PDCCHs or EPDCCHs indicating the releasing of the downlink SPS (semi-persistent scheduling) or the transmission of the PDSCH in the subframes until the current subframe of the subframes n−k of the respective configured serving cells, and the value of the DAI is updated for each subframe. $V^{DL}_{DAI, c}$ indicates the value of the DAI included in the PDCCH/EPDCCH transmitted with the DCI format 1/1A/1B/1D/2/2A/2B/2C/2D detected by the terminal device 2 in the subframe n−$k_m$ of the serving cell c. Here, $k_m$ belongs to the set K defined by the table of FIG. 6 and is a minimum value of the values of $k_m$ detected in the 1/1A/1B/1D/2/2A/2B/2C/2D by the terminal device 2.

An example of a case where the DAI field is configured for the FDD secondary cell for which the TDD cell and the TDD primary cell are configured and a case where the table for defining the downlink association set is commonly configured in the TDD cell and the FDD cell will be described.

In the FDD secondary cell aggregated with the TDD primary cell or in the TDD cell for which the downlink reference UL-DL configurations 1 to 6 are configured, the value of the DAI included in the DCI format 1/1A/1B/1D/2/2A/2B/2C/2D indicates the accumulated number of PDCCHs or EPDCCHs indicating the releasing of the downlink SPS (semi-persistent scheduling) or the transmission of the PDSCH in the subframes until the current subframe of the subframes n−k of the respective configured serving cells, and the value of the DAI is updated for each subframe. $V^{DL}_{DAI, c}$ indicates the value of the DAI included in the PDCCH/EPDCCH transmitted with the DCI format 1/1A/1B/1D/2/2A/2B/2C/2D detected by the terminal device 2 in the subframe n−k$_m$ of the serving cell c. Here, k$_m$ belongs to the set K defined by the table of FIG. 6 and is a minimum value of the values of k$_m$ detected in the 1/1A/1B/1D/2/2A/2B/2C/2D by the terminal device 2.

The downlink reference UL-DL configuration of the configuration of the value of $V^{DL}_{DAI, c}$ refers to any one of the configured first downlink reference UL-DL configuration and the second downlink reference UL-DL configuration. In a case where both the first downlink reference UL-DL configuration and the second downlink reference UL-DL configuration are configured for the serving cell, this configuration refers to the second downlink reference UL-DL configuration.

In TDD, $U_{DAI, c}$ indicating the total number of PDCCHs/EPDCCHs indicating the releasing of the downlink SPS and PDCCHs/EPDCCHs to which the transmission of the PDSCH of each TDD serving cell is assigned is configured.

That is, in the TDD cells of all the TDD UL-DL configurations, $U_{DAI, c}$ indicates the total number of PDCCHs/EPDCCHs indicating the releasing of the downlink SPS and PDCCHs/EPDCCHs to which the transmission of the PDSCH detected by the terminal device 2 in the subframe n−k of the serving cell c is assigned. Here, k belongs to K (k∈K). $N_{SPS}$ indicates the number of times the PDSCH without PDCCH/EPDCCH in the subframe n−k is transmitted, and $N_{SPS}$ is 0 or 1. Here, k belongs to K (k∈K).

Hereinafter, the determination of $U_{DAI, c}$ in a case where the plurality of cells to which different frame structure types are applied is aggregated will be described.

An example in a case where the DAI field is configured for the serving cell only in a case where the cell is the TDD primary cell will be described.

In the TDD cells of all the TDD UL-DL configurations, $U_{DAI, c}$ indicates the total number of PDCCHs/EPDCCHs indicating the releasing of the downlink SPS and PDCCHs/EPDCCHs to which the transmission of the PDSCH detected by the terminal device 2 in the subframe n−k of the serving cell c is assigned. Here, k belongs to K (k∈K). $N_{SPS}$ indicates the number of times the PDSCH without the PDCCH/EPDCCH in the subframe n−k is transmitted, and $N_{SPS}$ is 0 or 1. Here, k belongs to K (k∈K).

In the serving cell, in a case where the primary cell is the TDD, $U_{DAI, c}$ indicates the total number of PDCCHs/EPDCCHs indicating the releasing of the downlink SPS and PDCCHs/EPDCCHs to which the transmission of the PDSCH detected by the terminal device 2 in the subframe n−k of the serving cell c is assigned. Here, k belongs to K (k∈K). $N_{SPS}$ indicates the number of times the PDSCH without the PDCCH/EPDCCH in the subframe n−k is transmitted, and $N_{SPS}$ is 0 or 1. Here, k belongs to K (k∈K).

An example of a case where the DAI field is configured for the FDD secondary cell for which the TDD cell is the TDD primary cell are configured will be described.

In the TDD cells or in the FDD secondary cell aggregated with the TDD primary cell, $U_{DAI, c}$ indicates the total number of PDCCHs/EPDCCHs indicating the releasing of the downlink SPS and PDCCHs/EPDCCHs to which the transmission of the PDSCH detected by the terminal device 2 in the subframe n−k of the serving cell c is assigned. Here, k belongs to K (k∈K). $N_{SPS}$ indicates the number of times the PDSCH without the PDCCH/EPDCCH in the subframe n−k is transmitted, and $N_{SPS}$ is 0 or 1. Here, k belongs to K (k∈K).

Hereinafter, the structure of one or a plurality of HARQ-ACK feedback bits $\{o^{ACK}_{c, 0}, o^{ACK}_{c, 1}, \ldots, o^{ACK}_{c, oACKc-1}\}$ (HARQ-ACK feedback bit array) in a case where the PUCCH format 3 is configured as the transmission of the HARQ-ACK information will be described.

The number of HARQ-ACK feedback bits is determined based on the value of the DAI included in the uplink grant.

The allocation of the HARQ-ACK feedback bits is determined based on the value of the DAI included in the downlink grant.

A terminal communicating with a base station by using the FDD cell and the TDD cell includes a reception unit which performs reception over the PDCCH transmitted using the first DCI format for the second DCI format. In a case where the aggregation of the FDD cell with the TDD cell is configured by the base station, the first DAI indicating the accumulated number of PDCCHs or EPDCCHs indicating the releasing of the downlink semi-persistent scheduling or the transmission of the PDSCH in the subframes until the current subframe within the prescribed subframe is received while being included in the first DCI format and is used for determining the HARQ-ACK feedback bit corresponding to the PDCCH or the EPDCCH or the transmission of the PDSCH in the FDD cell, and the second DAI different from the first DAI is received while being included in the second DCI format and is used for determining the size of the HARQ-ACK feedback bit in the FDD cell. The HARQ-ACK information is transmitted by the PUCCH format 3. The TDD cell is the primary cell, and the FDD cell is the secondary cell. The table for defining the downlink association set in the TDD cell and the table for defining the downlink association set in the FDD cell are different. The first DAI is used in all the downlink reference uplink-downlink configurations by the FDD cell.

In a case where the PUCCH format 3 is configured as the transmission of the HARQ-ACK information, the HARQ-ACK feedback bits $\{o^{ACK}_{c, 0}, o^{ACK}_{c, 1}, \ldots, o^{ACK}_{c, oACKc-1}\}$ for the c-th serving cell configured through the RRC are constituted by the following condition. In a case where c is equal to 0 or is greater than 0, the transmission mode configured in the c-th serving cell supports one transport block, or the spatial HARQ-ACK information bundling is applied, $O^{ACK}_c$ is equal to $B^{DL}_c$ ($o^{ACK}_c = B^{DL}_c$), and in other cases, $O^{ACK}_c$ is twice $B^{DL}_c$ ($O^{ACK}_c = 2B^{DL}_c$). Here, $B^{DL}_c$ is the number of downlink subframes necessary for the terminal device 2 to perform the feedback of the HARQ-ACK information bit for the c-th serving cell.

Hereinafter, the determination of $B^{DL}_c$ in a case where one TDD cell is configured for the terminal device 2, two or more TDD cells are configured, or the TDD UL-DL configurations of all the TDD cells are the same will be described.

Expression (a-1) of FIG. 14 is applied in a case where the HARQ-ACK information is transmitted over the PUCCH, the PUSCH which does not correspond to the DCI format is transmitted, or the PUSCH is transmitted so as to correspond to the DCI format in the serving cell in which the TDD UL-DL configuration is 0 in the subframe n. Expression (a-2) of FIG. 14 is applied in a case where the PUSCH is transmitted in the serving cell for which any one of the TDD UL-DL configurations 1 to 6 is configured so as to correspond to the DCI format. Expression (a-3) of FIG. 14 is applied in a case where the PUSCH is transmitted in the serving cell for which the TDD UL-DL configurations 1 to 6 are configured so as to correspond to the DCI format.

In a case where the terminal device 2 performs transmission over the PUCCH, $B^{DL}_c$ is equal to M (Expression (a-1) of FIG. 14).

$B^{DL}_c$ is equal to $M_c$ in the TDD cell having the TDD UL-DL configuration 0 or in the PUSCH which is not adjusted based on the associated detected DCI format 0/4 (Expression (a-1) of FIG. 14). In a case where the terminal device 2 does not receive the PDCCH/EPDCCH indicating the releasing of the downlink SPS or the PDSCH in the subframe n−k, the terminal device 2 does not transmit the HARQ-ACK information over the PUSCH. Here, k belongs to K (k∈K).

In the TDD cell having any one of the TDD UL-DL configurations {0, 1, 2, 3, 4, 6} or in the transmission of the PUSCH of the subframe n adjusted based on the detected PDCCH/EPDCCH with the DCI format 0/4, it is assumed that the terminal device 2 substitutes $W^{UL}_{DAI}$ for $B^{DL}_c$ (Expression (a-2) of FIG. 14). In a case where $W^{UL}_{DAI}$ is 4 ($W^{UL}_{DAI}=4$) and the terminal device 2 does not receive the PDCCH/EPDCCH indicating the releasing of the downlink SPS or the PDSCH in the subframe n−k, the terminal device 2 does not transmit the HARQ-ACK over the PUSCH. Here, k belongs to K (k∈K).

In the TDD cell in which the TDD UL-DL configuration is 5 or in the transmission of the PUSCH of the subframe n adjusted based on the detected PDCCH/EPDCCH with the DCI format 0/4, it is assumed that the terminal device 2 substitutes a value acquired by adding $W^{UL}_{DAI}$ to a value, which is acquired by multiplying a value acquired by rounding a fractional part of a value acquired by dividing a difference between U and $W^{UL}_{DAI}$ by 4 in a positive infinity direction by 4, for $B^{DL}_c$ (Expression (a-3) of FIG. 14). Here, U indicates a maximum $U_c$ value between all the configured serving cells, and $U_c$ is the total number of PDCCHs/EPDCCHs indicating the releasing of the downlink SPS and PDSCHs received in the subframe n−k of the c-th serving cell determined by k belonging to the set K. In a case where $W^{UL}_{DAI}$ is 4 ($W^{UL}_{DAI}=4$) and the terminal device 2 does not receive both the PDCCH/EPDCCH indicating the downlink SPS and the PDSCH in the subframe n−k, the terminal device 2 does not transmit the HARQ-ACK over the PUSCH.

Hereinafter, the determination of $B^{DL}_c$ in a case where two or more TDD cells are configured for the terminal device 2 and the TDD UL-DL configurations of at least two TDD cells are different will be described.

Expression (b-1) of FIG. 14 is applied in a case where the HARQ-ACK information is transmitted over the PUCCH, the PUSCH which does not correspond to the DCI format is transmitted, or the PUSCH is transmitted so as to correspond to the DCI format in the serving cell in which the uplink reference UL-DL configuration is 0 in the subframe n. Expression (b-2) of FIG. 14 is applied in a case where the PUSCH is transmitted so as to correspond to the DCI format in the serving cell for which any one of the uplink reference UL-DL configurations are 1 to 6 and any one of the downlink reference UL-DL configurations 0, 1, 2, 3, 4, and 6 is configured. Expression (b-3) of FIG. 14 is applied in a case where the PUSCH is transmitted so as to correspond to the DCI format in the serving cell for which any one of the uplink reference UL-DL configurations are 1 to 6 and the downlink reference UL-DL configuration 5 is configured.

That is, in a case where the PUCCH, the PUSCH which is not adjusted based on the detected DCI format 0/4, or the PUSCH adjusted based on the DCI format 0/4 of the associated detected uplink reference UL-DL configuration 0 are transmitted in the subframe n in the terminal device 2, $B^{DL}c$ is equal to $M_c$ (Expression (b-1) of FIG. 14). In a case where the terminal device 2 does not receive the PDCCH/EPDCCH indicating the releasing of the downlink SPS or the PDSCH in the subframe n−k, the terminal device 2 does not transmit the HARQ-ACK information over the PUSCH. Here, k belongs to K (k∈K).

That is, in a case where the downlink reference UL-DL configuration of each configured serving cell belongs to any one of {0, 1, 2, 3, 4, 6}, the terminal device 2 compares $W^{UL}_{DAI}$ with $M_c$ and substitutes the smaller value for $B^{DL}_c$ in the transmission of the PUSCH of the subframe n adjusted based on the detected PDCCH/EPDCCH with the DCI format 0/4 by using the TDD cell in which the uplink reference UL-DL configuration belongs to any one of {1, 2, 3, 4, 5, 6} (Expression (b-2) of FIG. 14). In a case where the terminal device 2 does not receive the PDCCH/EPDCCH indicating the releasing of the downlink SPS or the PDSCH in the subframe n−k, the terminal device 2 does not transmit the HARQ-ACK over the PUSCH. Here, k belongs to K (k∈K).

That is, in a case where the downlink reference UL-DL configuration of at least one serving cell is 5, it is assumed that the terminal device 2 compares the value acquired by adding $W^{UL}_{DAI}$ to the value, which is acquired by multiplying the value acquired by rounding the fractional part of the value acquired by dividing the difference between U and $W^{UL}_{DAI}$ by 4 in the positive infinity direction by 4, with $M_c$, and substitutes the smaller value for $B^{DL}_c$ in the transmission of the PUSCH in the subframe n adjusted based on the detected PDCCH/EPDCCH with the DCI format 0/4 by using the TDD cell in which the uplink reference UL-DL configuration belongs to any one of {1, 2, 3, 4, 5, 6} (Expression (b-3) of FIG. 14). Here, U indicates a maximum $U_c$ value between all the configured serving cells, and $U_c$ is the total number of PDCCHs/EPDCCHs indicating the releasing of the downlink SPS and PDSCHs received in the subframe n−k of the c-th serving cell determined by k belonging to the set K. In a case where $W^{UL}_{DAI}$ is 4 ($W^{UL}_{DAI}=4$) and the terminal device 2 does not receive both the PDCCH/EPDCCH indicating the downlink SPS and the PDSCH in the subframe n−k, the terminal device 2 does not transmit the HARQ-ACK over the PUSCH.

Hereinafter, the determination of $B^{DL}_c$ in a case where two or more serving cells are configured for the terminal device 2 and the frame structures of at least two serving cells are different will be described.

In a case where the primary cell is the TDD cell, the size of the HARQ-ACK feedback bit is determined based on the value of the downlink association set M and the value of the DAI included in the uplink grant in the FDD cell.

An example in which the expressions applied depending on the downlink reference UL-DL configurations are switched in a case where the DAI field is configured for the serving cell only in a case where the cell is the TDD primary cell and a case where the table for defining the downlink association set is individually configured in the TDD cell and the FDD cell will be described.

Expression (b-1) of FIG. 14 is applied in a case where the primary cell is the TDD and in a case where the HARQ-ACK information is transmitted over the PUCCH, the PUSCH which does not correspond to the DCI format is transmitted, or the PUSCH is transmitted so as to correspond to the DCI format in the serving cell in which the uplink reference UL-DL configuration is 0 in the subframe n. Expression (b-2) of FIG. 14 is applied in a case where the primary cell is the TDD and in a case where the PUSCH is transmitted so as to correspond to the DCI format in the FDD cell for which the uplink reference UL-DL configurations 1 to 6 are configured and any one of the downlink reference UL-DL configurations 0, 1, 3 and 6 is configured or in the TDD cell for which any one of the downlink reference UL-DL configurations 0, 1, 2, 3, 4, and 6 is configured in the subframe n. Expression (b-3) of FIG. 14 is applied in a case where the primary cell is the TDD and in a case where the PUSCH is transmitted so as to correspond to the DCI format in the FDD cell for which the uplink reference UL-DL configurations 1 to 6 are configured and any one of the downlink reference UL-DL configurations 2, 4, and 5 is configured or in the TDD cell for which the downlink reference UL-DL configuration 5 is configured in the subframe n. Expression (b-4) of FIG. 14 is applied in a case where the primary cell is the FDD.

In a case where the primary cell is the TDD and in a case where the PUCCH, the PUSCH which is not adjusted based on the detected DCI format 0/4, or the PUSCH adjusted based on the DCI format 0/4 of the associated detected uplink reference UL-DL configuration 0 are transmitted in the subframe n in the terminal device 2, $B^{DL}_c$ is equal to $M_c$ (Expression (b-1) of FIG. 14). In a case where the terminal device 2 does not receive the PDCCH/EPDCCH indicating the releasing of the downlink SPS or the PDSCH in the subframe n−k, the terminal device 2 does not transmit the HARQ-ACK information over the PUSCH. Here, k belongs to K (k∈K).

In a case where the primary cell is the TDD cell, and in a case where the downlink reference UL-DL configuration of each configured FDD cell belongs to any one of {0, 1, 3, 6} or the downlink reference UL-DL configuration of each configured TDD cell belongs to any of {0, 1, 2, 3, 4, 6}, the terminal device 2 compares $W^{UL}_{DAI}$ with M, and substitutes the smaller value for $B^{DL}_c$ in the transmission of the PUSCH of the subframe n adjusted based on the detected PDCCH/EPDCCH with the DCI format 0/4 by using the serving cell in which the uplink reference UL-DL configuration belongs to any one of {1, 2, 3, 4, 5, 6} (Expression (b-2) of FIG. 14). In a case where the terminal device 2 does not receive the PDCCH/EPDCCH indicating the releasing of the downlink SPS or the PDSCH in the subframe n−k, the terminal device 2 does not transmit the HARQ-ACK over the PUSCH. Here, k belongs to K (k∈K).

In a case where the primary cell is the TDD and in a case where the downlink reference UL-DL configuration of at least one FDD cell is {2, 4, 5} or the downlink reference UL-DL configuration of at least one TDD cell is 5, it is assumed that the terminal device 2 compares the value which is acquired by adding $W^{UL}_{DAI}$ to the value, which is acquired by multiplying the value acquired by rounding the fractional part of the value acquired by dividing the difference between U and $W^{UL}_{DAI}$ by 4 in the positive infinity direction by 4, with $M_c$, and substitutes the smaller value for $B^{DL}_c$ in the transmission of the PUSCH of the subframe n adjusted based on the detected PDCCH/EPDCCH with the DCI format 0/4 by using the serving cell in which the uplink reference UL-DL configuration belongs to any one of {1, 2, 3, 4, 5, 6} (Expression (b-3) of FIG. 14). Here, U indicates a maximum $U_c$ value between all the configured serving cells, and $U_c$ is the total number of PDCCHs/EPDCCHs indicating the releasing of the downlink SPS and PDSCHs received in the subframe n−k of the c-th serving cell determined by k belonging to the set K. In a case where $W^{UL}_{DAI}$ is 4 ($W^{UL}_{DAI}=4$) and the terminal device 2 does not receive both the PDCCH/EPDCCH indicating the downlink SPS and the PDSCH in the subframe n−k, the terminal device 2 does not transmit the HARQ-ACK over the PUSCH.

$B^{DL}_c$ is substituted for 1 in a case where the primary cell is the FDD (Expression (b-4) of FIG. 14). In a case where the terminal device 2 does not receive the PDCCH/EPDCCH indicating the releasing of the downlink SPS or the PDSCH in the subframe n−4, the terminal device 2 does not transmit the HARQ-ACK information over the PUSCH.

Expression (b-1) of FIG. 14 may be applied using $M_c=1$ in a case where the primary cell is the FDD. Expression (b-2) of FIG. 14 may be applied in a case where the DAI is configured for the TDD secondary cell only in a case where the primary cell is the FDD, and in a case where the primary cell is the FDD.

An example in which the expressions applied depending on the size of M are switched in a case where the DAI field is configured for the serving cell only in a case where the cell is the TDD primary cell and a case where the table for defining the downlink association set is individually configured in the TDD cell and the FDD cell will be described.

Expression (b-1) of FIG. 14 is applied in a case where the primary cell is the TDD and in a case where the HARQ-ACK information is transmitted over the PUCCH, the PUSCH which does not correspond to the DCI format is transmitted, or the PUSCH is transmitted so as to correspond to the DCI format in the serving cell in which the uplink reference UL-DL configuration is 0 in the subframe n. Expression (b-2) of FIG. 14 is applied in a case where the primary cell is the TDD, in a case where M is equal to or less than 4 in the subframe n, and in a case where the PUSCH is transmitted in the serving cell for which the uplink reference UL-DL configurations 1 to 6 are configured so as to correspond to the DCI format. Expression (b-3) of FIG. 14 is applied in a case where the primary cell is the TDD, in a case where M is equal to or greater than 5 in the subframe n, and in a case where the PUSCH is transmitted in the serving cell for which the uplink reference UL-DL configurations 1 to 6 are configured and any one of the downlink reference UL-DL configurations 2, 4, and 5 is configured so as to correspond to the DCI format. Expression (b-4) of FIG. 14 is applied in a case where the primary cell is the FDD.

In a case where the primary cell is the TDD and in a case where the PUCCH, the PUSCH which is not adjusted based on the detected DCI format 0/4, or the PUSCH adjusted based on the DCI format 0/4 of the associated detected uplink reference UL-DL configuration 0 are transmitted in the subframe n in the terminal device 2, $B^{DL}_c$ is equal to $M_c$ (Expression (b-1) of FIG. 14). In a case where the terminal device 2 does not receive the PDCCH/EPDCCH indicating the releasing of the downlink SPS or the PDSCH in the subframe n−k, the terminal device 2 does not transmit the HARQ-ACK information over the PUSCH. Here, k belongs to K (k∈K).

In a case where the primary cell is the TDD, it is assumed that the terminal device 2 compares $W^{UL}_{DAI}$ with $M_c$, and substitutes the smaller value for $B^{DL}_c$ in a case where $M_c$ is equal to or less than 4 in the transmission of the PUSCH of the subframe n adjusted based on the detected PDCCH/EPDCCH with the DCI format 0/4 by using the TDD cell in which the uplink reference UL-DL configuration belongs to any one of {1, 2, 3, 4, 5, 6} (Expression (b-2) of FIG. 14). In a case where the terminal device 2 does not receive the PDCCH/EPDCCH indicating the releasing of the downlink SPS or the PDSCH in the subframe n−k, the terminal device 2 does not transmit the HARQ-ACK over the PUSCH. Here, k belongs to K (k∈K).

That is, in a case where the primary cell is the TDD, it is assumed that the terminal device 2 compares the value acquired by adding $W^{UL}_{DAI}$ to the value, which is acquired by multiplying the value acquired by rounding the fractional part of the value acquired by dividing the difference between U and $W^{UL}_{DAI}$ by 4 in the positive infinity direction by 4, with $M_c$, and substitutes the smaller value for $B^{DL}_c$ in a case where $M_c$ is greater than 4 in the transmission of the PUSCH in the subframe n adjusted based on the detected PDCCH/EPDCCH with the DCI format 0/4 by using the TDD cell in which the uplink reference UL-DL configuration belongs to any one of {1, 2, 3, 4, 5, 6} (Expression (b-3) of FIG. 14). Here, U indicates a maximum $U_c$ value between all the configured serving cells, and $U_c$ is the total number of PDCCHs/EPDCCHs indicating the releasing of the downlink SPS and PDSCHs received in the subframe n−k of the c-th serving cell determined by k belonging to the set K. In a case where $W^{UL}_{DAI}$ is 4 ($W^{UL}_{DAI}$=4) and the terminal device 2 does not receive both the PDCCH/EPDCCH indicating the downlink SPS and the PDSCH in the subframe n−k, the terminal device 2 does not transmit the HARQ-ACK over the PUSCH.

$B^{DL}_c$ is substituted for 1 in a case where the primary cell is the FDD (Expression (b-4) of FIG. 14). In a case where the terminal device 2 does not receive the PDCCH/EPDCCH indicating the releasing of the downlink SPS or the PDSCH in the subframe n−4, the terminal device 2 does not transmit the HARQ-ACK information over the PUSCH.

Expression (b-1) of FIG. 14 may be applied using $M_c$=1 in a case where the primary cell is the FDD. Expression (b-2) of FIG. 14 may be applied in a case where the DAI is configured for the TDD secondary cell only in a case where the primary cell is the FDD, and in a case where the primary cell is the FDD.

The uplink reference UL-DL configuration in the determination of the value of $B^{DL}_c$ refers to any one of the configured first uplink reference UL-DL configuration and the second uplink reference UL-DL configuration. In a case where both the first uplink reference UL-DL configuration and the second uplink reference UL-DL configuration are configured for the serving cell, this configuration refers to the second uplink reference UL-DL configuration.

Hereinafter, the determination of the allocation of the HARQ-ACK feedback bits in a case where one or more TDD cells are configured for the terminal device 2 will be described.

The HARQ-ACK corresponding to the PDCCH/EPDCCH indicating the releasing of the downlink SPS or the transmission of the PDSCH corresponding to the PDCCH/EPDCCH is allocated in the order of the DAI values included in the PDCCH/EPDCCH.

In a case where the PUCCH format 3 is configured as the transmission of the HARQ-ACK and in a case where the downlink reference UL-DL configuration belongs to any one of {1, 2, 3, 4, 5, 6}, the HARQ-ACK corresponding to the PDCCH/EPDCCH indicating the releasing of the downlink SPS or the transmission of the PDSCH corresponding to the PDCCH/EPDCCH of the subframe n−k is assigned to $O^{ACK}_{c,\ DAI(k)-1}$ in a case where the transmission mode configured for the c-th serving cell supports the one transport block or the spatial HARQ-ACK bundling is applied, and is assigned to $O^{ACK}_{c,\ 2DAI(k)-2}$ and $O^{ACK}_{c,\ 2DAI(k)-1}$ in other cases. Here, DAI(k) is the value of the DAI included in the DCI format 1A/1B/1D1/2/2A/2C/2D detected in the subframe n−k. $O^{ACK}_{c,\ 2DAI(k)-2}$ and $O^{ACK}_{c,\ 2DAI(k)-1}$ are the HARQ-ACK feedbacks corresponding to the code word 0 and the code word 1. In a case where $N_{SPS}$ is a value which is greater than 0 ($N_{SPS}$>0), the HARQ-ACK with the transmission of the PDSCH which does not correspond to the PDCCH/EPDCCH is mapped to $O^{ACK}_{c,\ O_{ACKc}-1}$. The HARQ-ACK feedback bit indicating that the PDCCH/EPDCCH indicating the releasing of the downlink SPS or the transmission of the PDSCH are not detected is set as NACK.

In a case where the PUCCH format 3 is configured as the transmission of the HARQ-ACK, and in a case where the downlink reference UL-DL configuration is 0, the HARQ-ACK corresponding to the PDCCH/EPDCCH indicating the releasing of the downlink SPS or the transmission of the PDSCH corresponding to the PDCCH/EPDCCH of the subframe n−k is assigned to $O^{ACK}_{c,\ 0}$ in a case where the transmission mode configured for the c-th serving cell supports one transport block or the spatial HARQ-ACK bundling is applied, and is assigned to $O^{ACK}_{c,\ 0}$ and $O^{ACK}_{c,\ 1}$ in other cases. $O^{ACK}_{c,\ 0}$ and $O^{ACK}_{c,\ 1}$ are the HARQ-ACK feedbacks corresponding to the code word 0 and the code word 1. The HARQ-ACK feedback bit indicating that the PDCCH/EPDCCH indicating the releasing of the downlink SPS or the transmission of the PDSCH is not detected is set as NACK.

Hereinafter, the determination of the HARQ-ACK feedback bits in a case where two or more serving cells are configured for the terminal device 2 and the frame structures of at least two serving cells are different will be described.

In the FDD cell, the HARQ-ACK feedback bit is allocated using the value of the DAI included in the downlink grant.

An example of a case where the DAI field is configured for the serving cell only in a case where the cell is the TDD primary cell and a case where the table for defining the downlink association set is individually configured in the TDD cell and the FDD cell will be described.

In a case where the PUCCH format 3 is configured as the transmission of the HARQ-ACK and in a case where the primary cell is the TDD, in the FDD cell or the TDD cell in which the downlink reference UL-DL configuration belongs to any one of {1, 2, 3, 4, 5, 6}, the HARQ-ACK corresponding to the PDCCH/EPDCCH indicating the releasing of the downlink SPS or the transmission of the PDSCH corresponding to the PDCCH/EPDCCH of the subframe n−k is assigned to $O^{ACK}_{c,\ DAI(k)-1}$ in a case where the transmission mode configured for the c-th serving cell supports the one transport block or the spatial HARQ-ACK bundling is applied, and is assigned to $O^{ACK}_{c,\ 2DAI(k)-2}$ and $O^{ACK}_{c,\ 2DAI(k)-1}$ in other cases. Here, DAI(k) is the value of the DAI included in the DCI format 1A/1B/1D1/2/2A/2C/2D detected in the subframe n−k. $O^{ACK}_{c,\ 2DAI(k)-2}$ and $O^{ACK}_{c,\ 2DAI(k)-1}$ are the HARQ-ACK feedbacks corresponding to the code word 0 and the code word 1. In a case where $N_{SPS}$ is a value which is greater than 0 ($N_{SPS}$>0), the HARQ-ACK with the transmission of the PDSCH which does not correspond to the PDCCH/EPDCCH is mapped to $O^{ACK}_{c,\ O_{ACKc}-1}$. The HARQ-ACK feedback bit indicating that the PDCCH/EPDCCH indicating the releasing of the downlink SPS or the transmission of the PDSCH is not detected is set as NACK.

In a case where the PUCCH format 3 is configured as the transmission of the HARQ-ACK, in the TDD cell in which the downlink reference UL-DL configuration is 0, the HARQ-ACK corresponding to the PDCCH/EPDCCH indicating the releasing of the downlink SPS or the transmission of the PDSCH corresponding to the PDCCH/EPDCCH of the subframe n–k is assigned to $O^{ACK}_{c,\,0}$ in a case where the transmission mode configured for the c-th serving cell supports one transport block or the spatial HARQ-ACK bundling is applied, and is assigned to $O^{ACK}_{c,\,0}$ and $O^{ACK}_{c,\,1}$ in other cases. $O^{ACK}_{c,\,0}$ and $O^{ACK}_{c,\,1}$ are the HARQ-ACK feedbacks corresponding to the code word 0 and the code word 1. The HARQ-ACK feedback bit indicating that the PDCCH/EPDCCH indicating the releasing of the downlink SPS or the transmission of the PDSCH is not detected is set as NACK.

In a case where the PUCCH format 3 is configured as the transmission of the HARQ-ACK, and in a case where the primary cell is the FDD, in the serving cell, the HARQ-ACK corresponding to the PDCCH/EPDCCH indicating the releasing of the downlink SPS or the transmission of the PDSCH corresponding to the PDCCH/EPDCCH of the subframe n–4 is assigned to $O^{ACK}_{c,\,0}$ in a case where the transmission mode configured for the c-th serving cell supports one transport block or the spatial HARQ-ACK bundling is applied, and is assigned to $O^{ACK}_{c,\,0}$ and $O^{ACK}_{c,\,1}$ in other cases. $O^{ACK}_{c,\,0}$ and $O^{ACK}_{c,\,1}$ are the HARQ-ACK feedbacks corresponding to the code word 0 and the code word 1. The HARQ-ACK feedback bit indicating that the PDCCH/EPDCCH indicating the releasing of the downlink SPS or the transmission of the PDSCH is not detected is set as NACK.

In a case where the DAI field is configured for the FDD secondary cell configured as the TDD cell and the TDD primary cell, the HARQ-ACK feedback bits may be allocated using the value of the DAI.

An example of a case where the DAI field is configured for the serving cell only in a case where the cell is the TDD primary cell and a case where the table for defining the downlink association set is commonly configured in the TDD cell and the FDD cell will be described.

In a case where the PUCCH format 3 is configured as the transmission of the HARQ-ACK and in a case where the primary cell is the TDD, in the serving cell in which the downlink reference UL-DL configuration belongs to any one of {1, 2, 3, 4, 5, 6}, the HARQ-ACK corresponding to the PDCCH/EPDCCH indicating the releasing of the downlink SPS or the transmission of the PDSCH corresponding to the PDCCH/EPDCCH of the subframe n–k is assigned to $O^{ACK}_{c,\,DAI(k)-1}$ in a case where the transmission mode configured for the c-th serving cell supports the one transport block or the spatial HARQ-ACK bundling is applied, and is assigned to $O^{ACK}_{c,\,2DAI(k)-2}$ and $O^{ACK}_{c,\,2DAI(k)-1}$ in other cases. Here, DAI(k) is the value of the DAI included in the DCI format 1A/1B/1D1/2/2A/2C/2D detected in the subframe n–k. $O^{ACK}_{c,\,2DAI(k)-2}$ and $O^{ACK}_{c,\,2DAI(k)-1}$ are the HARQ-ACK feedbacks corresponding to the code word 0 and the code word 1. In a case where $N_{SPS}$ is a value which is greater than 0 ($N_{SPS}>0$), the HARQ-ACK with the transmission of the PDSCH which does not correspond to the PDCCH/EPDCCH is mapped to $O^{ACK}_{c,\,O_{ACKc}-1}$. The HARQ-ACK feedback bit indicating that the PDCCH/EPDCCH indicating the releasing of the downlink SPS or the transmission of the PDSCH is not detected is set as NACK.

In a case where the PUCCH format 3 is configured as the transmission of the HARQ-ACK, in the serving cell in which the downlink reference UL-DL configuration is 0, the HARQ-ACK corresponding to the PDCCH/EPDCCH indicating the releasing of the downlink SPS or the transmission of the PDSCH corresponding to the PDCCH/EPDCCH of the subframe n–k is assigned to $O^{ACK}_{c,\,0}$ in a case where the transmission mode configured for the c-th serving cell supports one transport block or the spatial HARQ-ACK bundling is applied, and is assigned to $O^{ACK}_{c,\,0}$ and $O^{ACK}_{c,\,1}$ in other cases. $O^{ACK}_{c,\,0}$ and $O^{ACK}_{c,\,1}$ are the HARQ-ACK feedbacks corresponding to the code word 0 and the code word 1. The HARQ-ACK feedback bit indicating that the PDCCH/EPDCCH indicating the releasing of the downlink SPS or the transmission of the PDSCH is not detected is set as NACK.

In a case where the PUCCH format 3 is configured as the transmission of the HARQ-ACK, and in a case where the primary cell is the FDD, in the serving cell, the HARQ-ACK corresponding to the PDCCH/EPDCCH indicating the releasing of the downlink SPS or the transmission of the PDSCH corresponding to the PDCCH/EPDCCH of the subframe n–4 is assigned to $O^{ACK}_{c,\,0}$ in a case where the transmission mode configured for the c-th serving cell supports one transport block or the spatial HARQ-ACK bundling is applied, and is assigned to $O^{ACK}_{c,\,0}$ and $O^{ACK}_{c,\,1}$ in other cases. $O^{ACK}_{c,\,0}$ and $O^{ACK}_{c,\,1}$ are the HARQ-ACK feedbacks corresponding to the code word 0 and the code word 1. The HARQ-ACK feedback bit indicating that the PDCCH/EPDCCH indicating the releasing of the downlink SPS or the transmission of the PDSCH is not detected is set as NACK.

An example of the allocation of the HARQ-ACK bits of the terminal device 2 for which the PUCCH format 3 is configured will be described.

In the FDD-TDD in which the primary cell is the TDD, the following process is performed in a case where the downlink reference UL-DL configuration of the TDD cell or the FDD cell for which the cross carrier scheduling is configured from another cell (the self scheduling is not configured) or in the FDD cell for which the cross carrier scheduling is not configured from another cell (the self scheduling is configured) belongs to any one of {1, 2, 3, 4, 5, 6}.

In a case where the PUCCH format 3 is configured as the transmission of the HARQ-ACK, the HARQ-ACK corresponding to the PDCCH/EPDCCH indicating the releasing of the downlink SPS or the transmission of the PDSCH corresponding to the PDCCH/EPDCCH of the subframe n–k is assigned to $O^{ACK}_{c,\,DAI(k)-1}$ in a case where the transmission mode configured for the c-th serving cell supports one transport block or the spatial HARQ-ACK bundling is applied, and is assigned to $O^{ACK}_{c,\,2DAI(k)-2}$ and $O^{ACK}_{c,\,2DAI(k)-1}$ in other cases. Here, DAI(k) is the value of the DAI included in the DCI format 1A/1B/1D1/2/2A/2C/2D detected in the subframe n–k. $O^{ACK}_{c,\,2DAI(k)-2}$ and $O^{ACK}_{c,\,2DAI(k)-1}$ are the HARQ-ACK feedbacks corresponding to the code word 0 and the code word 1. In a case where $N_{SPS}$ is a value which is greater than 0 ($N_{SPS}>0$), the HARQ-ACK with the transmission of the PDSCH which does not correspond to the PDCCH/EPDCCH is mapped to $O^{ACK}_{c,\,O_{ACKc}-1}$. The HARQ-ACK feedback bit indicating that the PDCCH/EPDCCH indicating the releasing of the downlink SPS or the transmission of the PDSCH are not detected is set as NACK.

In the FDD-TDD in which the primary cell is the TDD, the following process is performed in a case where the downlink reference UL-DL configuration of the TDD cell or the FDD cell for which the cross carrier scheduling is configured from the another cell (the self scheduling is not configured) is 0.

In a case where the PUCCH format 3 is configured as the transmission of the HARQ-ACK, the HARQ-ACK corresponding to the PDCCH/EPDCCH indicating the releasing of the downlink SPS or the transmission of the PDSCH corresponding to the PDCCH/EPDCCH of the subframe n−k is assigned to $O^{ACK}_{c,0}$ in a case where the transmission mode configured for the c-th serving cell supports one transport block or the spatial HARQ-ACK bundling is applied, and is assigned to $O^{ACK}_{c,0}$ and $O^{ACK}_{c,1}$ in other cases. $O^{ACK}_{c,0}$ and $O^{ACK}_{c,1}$ are the HARQ-ACK feedbacks corresponding to the code word 0 and the code word 1. The HARQ-ACK feedback bit indicating that the PDCCH/EPDCCH indicating the releasing of the downlink SPS or the transmission of the PDSCH are not detected is set as NACK.

In a case where the DAI field is configured for the FDD secondary cell configured as the TDD cell and the TDD primary cell, the HARQ-ACK feedback bits may be allocated using the value of the DAI.

The downlink reference UL-DL configuration in the determination of the allocation of the HARQ-ACK feedback bits refers to any one of the first configured downlink reference UL-DL configuration and the second configured downlink reference UL-DL configuration. In a case where both the first downlink reference UL-DL configuration and the second downlink reference UL-DL configuration are configured for the serving cell, this configuration refers to the second downlink reference UL-DL configuration.

Although the PUCCH format 3 has been described, the HARQ-ACK feedbacks of two or more serving cells are transmitted by the PUCCH format 1b for performing the channel selection in a case where two or more serving cells are configured and the UL-DL configurations of all the serving cells are the same, in a case where the TDD UL-DL configuration belongs to any one of {1, 2, 3, 4, 6} and the DAI included in the uplink grant of which $W^{UL}_{DAI}$ is 1 or 2 is received, and there is an indication of the transmission of the PUSCH in the serving cell, the same assignment as that of the format 3 may be applied to the structure of the HARQ-ACK feedback bit.

That is, in a case where the TDD UL-DL configuration belongs to any one of {1, 2, 3, 4, 6}, $o^{ACK}_j$ is determined in the transmission of the PUSCH adjusted based on the detected PDCCH/EPDCCH with the DCI format 0/4 of which $W^{UL}_{DAI}$ is 1 or 2, similarly to the case where the PUCCH format 3 is configured in order to transmit the HARQ-ACK. Here, a case where the spatial HARQ-ACK bundling is performed on all the serving cells for which the downlink transmission mode by which the maximum two transport blocks are supported is configured in a case where $W^{UL}_{DAI}=2$ over a plurality of code words in one downlink subframe is excluded.

The structure of the HARQ-ACK feedback bit in a case where the HARQ-ACK feedbacks of two or more serving cells are transmitted by the PUCCH format 1b for performing the channel selection in a case where two or more serving cells are configured and the UL-DL configurations of at least two serving cells are different is the same as that of the format 3 in a case where the uplink reference UL-DL configuration belongs to any one of {1, 2, 3, 4, 6}, the DAI included in the uplink grant of which $W^{UL}_{DAI}$ is 1 or 2 is received, and there is an indication of the PUSCH transmission in the serving cell.

That is, in a case where the uplink reference UL-DL configuration belongs to any one of {1, 2, 3, 4, 6}, $o^{ACK}_j$ is determined in the transmission of the PUSCH adjusted based on the detected PDCCH/EPDCCH with the DCI format 0/4 of which $W^{UL}_{DAI}$ is 1 or 2, similarly to the case where the PUCCH format 3 is configured in order to transmit the HARQ-ACK. Here, a case where the spatial HARQ-ACK bundling is performed on all the serving cells for which the downlink transmission mode by which the maximum two transport blocks are supported is configured in a case where $W^{UL}_{DAI}=2$ over a plurality of code words in one downlink subframe is excluded. Here, the uplink reference UL-DL configuration is the uplink reference UL-DL configuration of the serving cell corresponding to the transmission of the PUSCH.

The structure of the HARQ-ACK feedback bit in a case where the HARQ-ACK feedbacks of two or more serving cells are transmitted by the PUCCH format 1b for performing the channel selection in a case where two or more serving cells are configured and the frame structures of at least two serving cells are different is the same as that of the format 3 in a case where the primary cell is the TDD and in a case where the uplink reference UL-DL configuration belongs to any one of {1, 2, 3, 4, 6}, the DAI included in the uplink grant of which $W^{UL}_{DAI}$ is 1 or 2 is received, and there is an indication of the PUSCH transmission in the serving cell.

That is, in a case where the primary cell is the TDD and in a case where the uplink reference UL-DL configuration belongs to any one of {1, 2, 3, 4, 6}, $o^{ACK}_j$ is determined in the transmission of the PUSCH adjusted based on the detected PDCCH/EPDCCH with the DCI format 0/4 of which $W^{UL}_{DAI}$ is 1 or 2, similarly to the case where the PUCCH format 3 is configured in order to transmit the HARQ-ACK. Here, a case where the spatial HARQ-ACK bundling is performed on all the serving cells for which the downlink transmission mode by which the maximum two transport blocks are supported is configured in a case where $W^{UL}_{DAI}=2$ over a plurality of code words in one downlink subframe is excluded. Here, the uplink reference UL-DL configuration is the uplink reference UL-DL configuration of the serving cell corresponding to transmission of the PUSCH.

In the FDD secondary cell aggregated with the TDD primary cell or the TDD cell in a case where the HARQ-ACK feedbacks of two or more serving cells are transmitted by the PUCCH format 1b for performing the channel selection in a case where two or more serving cells are configured and the frame structures of at least two serving cells are different, the same assignment as that of the format 3 may be applied to the structure of the HARQ-ACK feedback bit in a case where the uplink reference UL-DL configuration belongs to any one of {1, 2, 3, 4, 6}, the DAI included in the uplink grant of which $W^{UL}_{DAI}$ is 1 or 2 is received, and there is an indication of the PUSCH transmission in the serving cell.

That is, in a case where the uplink reference UL-DL configuration belongs to any one of {1, 2, 3, 4, 6}, $o^{ACK}_j$ in the TDD cell or the FDD secondary cell aggregated with the TDD primary cell, $o^{ACK}_j$ is determined in the transmission of the PUSCH adjusted based on the detected PDCCH/EPDCCH with the DCI format 0/4 of which $W^{UL}_{DAI}$ is 1 or 2, similarly to the case where the PUCCH format 3 is configured in order to transmit the HARQ-ACK. Here, a case where the spatial HARQ-ACK bundling is performed on all the serving cells for which the downlink transmission mode by which the maximum two transport blocks are supported is configured in a case where $W^{UL}_{DAI}=2$ over a plurality of code words in one downlink subframe is excluded. Here, the uplink reference UL-DL configuration is the uplink reference UL-DL configuration of the serving cell corresponding to the transmission of the PUSCH.

The structure of the HARQ-ACK feedback bit in a case where the HARQ-ACK feedbacks of two or more serving cells are transmitted by the PUCCH format 1b for performing the channel selection in a case (in the case of the TDD-FDD CA) where two or more serving cells are configured and the frame structures of at least two serving cells are different is the same as that of the format 3 in a case where the primary cell is the TDD and in a case where the uplink reference UL-DL configuration belongs to any one of $\{1, 2, 3, 4, 6\}$, the DAI included in the uplink grant of which $W^{UL}_{DAI}$ is 1 or 2 is received, and there is an indication of the PUSCH transmission in the serving cell.

That is, in a case where the primary cell is the TDD and in a case where the uplink reference UL-DL configuration belongs to any one of $\{1, 2, 3, 4, 6\}$, $o^{ACK}_j$ is determined in the transmission of the PUSCH adjusted based on the detected PDCCH/EPDCCH with the DCI format 0/4 of which $W^{UL}_{DAI}$ is 1 or 2, similarly to the case where the PUCCH format 3 is configured in order to transmit the HARQ-ACK. Here, a case where the spatial HARQ-ACK bundling is performed on all the serving cells for which the downlink transmission mode by which the maximum two transport blocks are supported is configured in a case where $W^{UL}_{DAI}=2$ over a plurality of code words in one downlink subframe is excluded. Here, the uplink reference UL-DL configuration is the uplink reference UL-DL configuration of the serving cell corresponding to the transmission of the PUSCH.

An example of the structure of the HARQ-ACK feedback bit in a case where the HARQ-ACK feedbacks of two or more serving cells are transmitted by the PUCCH format 1b for performing the channel selection in the TDD-FDD CA of the TDD primary cell or in a case where two or more serving cells are configured and the UL-DL configurations of at least two serving cells are different will be described.

In a case where the uplink reference UL-DL configuration belongs to any one of $\{1, 2, 3, 4, 6\}$, the DAI included in the uplink grant of which $W^{UL}_{DAI}$ is 3 or 4 is received, and there is an indication of the PUSCH transmission, the value of M is substituted for the bit of the HARQ-ACK determined by being replaced with UL DAI ($W^{UL}_{DAI}$).

That is, in a case where the downlink reference UL-DL configuration of each serving cell belongs to any one of $\{0, 1, 2, 3, 4, 6\}$ and the transmission of the HARQ-ACK is configured for two configured serving cells by the PUCCH format 1b with the channel selection, the HARQ-ACK feedback bits $o^{ACK}_0, o^{ACK}_1, \ldots,$ and $o^{ACK}_{OACK-1}$ is $o^{ACK}_j=o(j)$ for the transmission of the PUSCH adjusted based on the detected PDCCH/EPDCCH with the DCI format 0/4 of which $W^{UL}_{DAI}$ is 3 or 4 in a case where the uplink reference UL-DL configuration belongs to any one of $\{1, 2, 3, 4, 6\}$. Here, j is equal to or greater than 0 and is equal to or less than 3, and o(j) is RM code input bits. o(j) is determined by the combination of the HARQ-ACKs of the first serving cell and the second serving cell and the number of Ms. Here, the value of M is substituted for $W^{UL}_{DAI}$. Here, the uplink reference UL-DL configuration is the uplink UL-DL configuration of the serving cell corresponding to the transmission of the PUSCH. In a case where the PDCCH/EPDCCH indicating the releasing of the downlink SPS or the PDSCH is not received in the subframe n–k, the terminal device 2 does not transmit the HARQ-ACK. Here, k is an element of the set K (downlink association set) (k∈K), and $W^{UL}_{DAI}=0$.

An example of the structure of the HARQ-ACK feedback bit in a case where the HARQ-ACK feedback in the TDD-FDD CA of the TDD primary cell is transmitted by the PUCCH format 1b for performing the channel selection will be described.

In a case where the uplink reference UL-DL configuration of the TDD cell belongs to any one of $\{1, 2, 3, 4, 6\}$, the DAI included in the uplink grant of which $W^{UL}_{DAI}$ is 3 or 4 is received, and there is an indication of the PUSCH transmission in the TDD cell, or in a case where the DAI included in the uplink grant of which $W^{UL}_{DAI}$ of the FDD cell is 3 or 4 is received and there is an indication of the PUSCH transmission in the FDD cell, the value of M is substituted for the bit of the HARQ-ACK determined by being replaced with UL DAI ($W^{UL}_{DAI}$).

That is, in a case where the downlink reference UL-DL configuration of each serving cell belongs to any one of $\{0, 1, 2, 3, 4, 6\}$ and the transmission of the HARQ-ACK is configured for two configured serving cells by the PUCCH format 1b with the channel selection, the HARQ-ACK feedback bits $o^{ACK}_0, o^{ACK}_1, \ldots,$ and $o^{ACK}_{OACK-1}$ is $o^{ACK}_j=o(j)$ for the transmission of the PUSCH adjusted based on the detected PDCCH/EPDCCH with the DCI format 0/4 of which $W^{UL}_{DAI}$ is 3 or 4 in a case where the uplink reference UL-DL configuration belongs to any one of $\{1, 2, 3, 4, 6\}$. Here, j is equal to or greater than 0 and is equal to or less than 3, and o(j) is RM code input bits. o(j) is determined by the combination of the HARQ-ACKs of the first serving cell and the second serving cell and the number of Ms. Here, the value of M is substituted for $W^{UL}_{DAI}$. Here, the uplink reference UL-DL configuration is the uplink UL-DL configuration of the serving cell corresponding to the transmission of the PUSCH. In a case where the PDCCH/EPDCCH indicating the releasing of the downlink SPS or the PDSCH is not received in the subframe n–k, the terminal device 2 does not transmit the HARQ-ACK. Here, k is an element of the set K (downlink association set) (k∈K), and $W^{UL}_{DAI}=0$.

In a case where the cross carrier scheduling is configured for the FDD cell and in a case where the TDD UL-DL configuration of the TDD primary cell is 0, the aforementioned operation may be performed without replacing the value of M with $W^{UL}_{DAI}$.

An example of the structure of the HARQ-ACK feedback bit in a case where the HARQ-ACK feedbacks of two or more serving cells are transmitted by the PUCCH format 1b for performing the channel selection in the TDD-FDD CA of the TDD primary cell or in a case where two or more serving cells are configured and the UL-DL configurations of at least two serving cells are different will be described.

In a case where the UL DAI is not acquired, the HARQ-ACK bit is determined based on the value of M. That is, in a case where the UL DAI is not acquired, the HARQ-ACK bit is determined in consideration of all the subframes in which the HARQ-ACK bit may be generated.

That is, in a case where the downlink reference UL-DL configuration of each serving cell belongs to any one of $\{0, 1, 2, 3, 4, 6\}$ and the transmission of the HARQ-ACK is configured for two configured serving cells by the PUCCH format 1b with the channel selection, the HARQ-ACK feedback bits $o^{ACK}_0$, $o^{ACK}_1$, ..., and $o^{ACK}_{oACK-1}$ are $o^{ACK}_j$=HARQ-ACK(j) in the prescribed subframe n in which M is 1 or 2 in the PUSCH transmission (the PUSCH transmission indicating the retransmission by the PHICH) in which the uplink reference UL-DL configuration belongs to any one of {0, 1, 2, 3, 4, 6} and which is not adjusted based on the detected PDCCH/EPDCCH with the DCI format 0/4 (uplink grant). Here, j is equal to or greater than 0 and is equal to or less than A−1. A is the number of HARQ-ACK (j), and is the total number of transport blocks corresponding to transmitted HARQ-ACKs. Here, the uplink reference UL-DL configuration is the uplink UL-DL configuration of the serving cell corresponding to the transmission of the PUSCH. In a case where the PDCCH/EPDCCH indicating the releasing of the downlink SPS or the PDSCH is not received in the subframe n−k, the terminal device 2 does not transmit the HARQ-ACK. Here, k is an element of the set K (downlink association set) (k∈K). $o^{ACK}_j$=o(j) in the prescribed subframe in which M is 3 or 4 in the PUSCH transmission (the PUSCH transmission indicating the retransmission by the PHICH) in which the uplink reference UL-DL configuration belongs to any one of {0, 1, 2, 3, 4, 6} and which is not adjusted based on the detected PDCCH/EPDCCH with the DCI format 0/4 (uplink grant). Here, j is equal to or greater than 0 and is equal to or less than 3, and o(j) is RM code input bits. o(j) is determined by the combination of the HARQ-ACKs of the first serving cell and the second serving cell and the number of Ms. Here, the uplink reference UL-DL configuration is the uplink UL-DL configuration of the serving cell corresponding to the transmission of the PUSCH. In a case where the PDCCH/EPDCCH indicating the releasing of the downlink SPS or the PDSCH is not received in the subframe n−k, the terminal device 2 does not transmit the HARQ-ACK. Here, k is an element of the set K (downlink association set) (k∈K), and $W^{UL}_{DAI}$=0.

An example of the structure of the HARQ-ACK feedback bit in a case where the HARQ-ACK feedbacks of two or more serving cells in the TDD-FDD CA of the TDD primary cell is transmitted by the PUCCH format 1b for performing the channel selection will be described.

In a case where the UL DAI is not acquired, the HARQ-ACK bit is determined based on the value of M.

That is, in a case where the downlink reference UL-DL configuration of each serving cell belongs to any one of {0, 1, 2, 3, 4, 6} and the transmission of the HARQ-ACK is configured for two configured serving cells by the PUCCH format 1b with the channel selection, the HARQ-ACK feedback bits $o^{ACK}_0$, $o^{ACK}_1$, ..., and $o^{ACK}_{oACK-1}$ are $o^{ACK}_j$=HARQ-ACK(j) in the prescribed subframe n in which M is 1 or 2 in the PUSCH transmission (the PUSCH transmission indicating the retransmission by the PHICH) in which the uplink reference UL-DL configuration of the TDD cell belongs to any one of {0, 1, 2, 3, 4, 6} or which is the FDD cell and is not adjusted based on the detected PDCCH/EPDCCH with the DCI format 0/4 (uplink grant). Here, j is equal to or greater than 0 and is equal to or less than A−1. A is the number of HARQ-ACK(j), and is the total number of transport blocks corresponding to transmitted HARQ-ACKs. Here, the uplink reference UL-DL configuration is the uplink UL-DL configuration of the serving cell corresponding to the transmission of the PUSCH. In a case where the PDCCH/EPDCCH indicating the releasing of the downlink SPS or the PDSCH is not received in the subframe n−k, the terminal device 2 does not transmit the HARQ-ACK. Here, k is an element of the set K (downlink association set) (k∈K). $o^{ACK}_j$=o(j) in the prescribed subframe in which M is 3 or 4 in the PUSCH transmission (the PUSCH transmission indicating the retransmission by the PHICH) in which the uplink reference UL-DL configuration of the TDD cell belongs to any one of {0, 1, 2, 3, 4, 6} and which is the FDD cell and is not adjusted based on the detected PDCCH/EPDCCH with the DCI format 0/4 (uplink grant). Here, j is equal to or greater than 0 and is equal to or less than 3, and o(j) is RM code input bits. o(j) is determined by the combination of the HARQ-ACKs of the first serving cell and the second serving cell and the number of Ms. Here, the uplink reference UL-DL configuration is the uplink UL-DL configuration of the serving cell corresponding to the transmission of the PUSCH. In a case where the PDCCH/EPDCCH indicating the releasing of the downlink SPS or the PDSCH is not received in the subframe n−k, the terminal device 2 does not transmit the HARQ-ACK. Here, k is an element of the set K (downlink association set) (k∈K), and $W^{UL}_{DAI}$=0.

The uplink reference UL-DL configuration of the structure of the HARQ-ACK feedback bit in a case where the HARQ-ACK feedback is transmitted by the PUCCH format 1b for performing the channel selection refers to any one of the first uplink reference UL-DL configuration and the second uplink reference UL-DL configuration configured for the serving cell. In a case where both the first uplink reference UL-DL configuration and the second uplink reference UL-DL configuration are configured for the serving cell, this configuration refers to the second uplink reference UL-DL configuration.

The downlink reference UL-DL configuration of the structure of the HARQ-ACK feedback bit in a case where the HARQ-ACK feedback is transmitted by the PUCCH format 1b for performing the channel selection refers to any one of the first uplink reference UL-DL configuration and the second downlink reference UL-DL configuration configured for the serving cell. In a case where both the first downlink reference UL-DL configuration and the second downlink reference UL-DL configuration are configured for the serving cell, this configuration refers to the second downlink reference UL-DL configuration.

Hereinafter, the determination of the number of HARQ-ACK bits transmitted in the subframe n in the TDD-FDD CA (carrier aggregation in a case where two or more serving cells are configured, the frame structure types of two serving cells are different, and the primary cell is the FDD) of the FDD primary cell will be described.

In the TDD-FDD CA of the FDD primary cell, as many HARQ-ACK bits as the configured serving cell are basically ensured. However, the HARQ-ACK bits are not ensured in the subframe (for example, the uplink subframe) that the fact that the transmission of the PDSCH is not performed is previously checked. That is, the number of serving cells of the HARQ-ACKs transmitted in the subframe n in the TDD-FDD CA of the FDD primary cell is the total number of serving cells of which the subframe n−4 is the downlink subframe in which the PDSCH is able to be transmitted or the special subframe in which the PDSCH is able to be transmitted. That is, the number of serving cells of the HARQ-ACKs transmitted in the subframe n in the TDD-FDD CA of the FDD primary cell does not include the serving cell of which the subframe n−4 is the uplink subframe.

An example of the calculation of the number of serving cells that performs the feedback of the HARQ-ACK will be described.

The uplink subframe/downlink subframe/special subframe of the serving cell is determined based on the second downlink reference UL-DL configuration.

That is, in a case where more than one serving cell is configured for the terminal device 2, the frame structure types of two certain configured serving cells are different, and the primary cell is in the frame structure type 1, in the terminal device 2 that transmits the HARQ-ACK by using the PUCCH format 1b or the PUCCH format 3 with the channel selection, the terminal device 2 determines the number of the HARQ-ACK bits o of the subframe n based on the number of configured serving cells of which the subframe n–4 is the downlink subframe or the special subframe (the special subframe of the TDD serving cell for which the normal CP or the special subframe configuration 1, 2, 3, 4, 6, 7, 8, or 9 is configured or the special subframe of the TDD serving cell for which the extended CP or the special subframe configuration 1, 2, 3, 5, 6 or 7 is configured) according to the second downlink reference UL-DL configuration of each serving cell and the downlink transmission mode configured in each serving cell. The terminal device 2 uses two HARQ-ACK bits in the serving cell for which the transmission mode corresponding to (supporting) two maximum transport blocks is configured, and uses one HARQ-ACK bit in other cases.

In the aforementioned operation, in a case where the second downlink reference UL-DL configuration is not configured (applied or used) for the serving cell, the TDD UL-DL configuration of the serving cell is referred to. In the TDD-FDD CA of the FDD primary cell, a case where the second downlink reference UL-DL configuration is configured (applied or used) for the secondary serving cell is, for example, a case where a parameter (eimta-HargReferenceConfig) referring to a HARQ-ACK transmission timing of the eIMTA is configured from the higher layer. In the FDD cell for which the TDD UL-DL configuration is not configured (applied or used), the subframe n–4 is regarded as the downlink subframe.

The downlink reference UL-DL configuration configured in the TDD-FDD CA of the FDD primary cell is used only for indicating whether a certain subframe is the downlink subframe, the uplink subframe or the special subframe, and is not used for determining the transmission timing of the HARQ-ACK. That is, the transmission timing of the HARQ-ACK in the terminal device 2 is fixed irrespective of the downlink reference UL-DL configuration configured in the TDD-FDD CA of the FDD primary cell. That is, the reception timing of the HARQ-ACK in the base station apparatus 1 is fixed irrespective of the downlink reference UL-DL configuration configured in the TDD-FDD CA of the FDD primary cell.

An example of the calculation of the number of serving cells that performs the feedback of the HARQ-ACK will be described.

The uplink subframe/downlink subframe/special subframe in the TDD serving cell is determined based on the parameter referring to the HARQ-ACK transmission timing of the eIMTA or the TDD UL-DL configuration. The HARQ-ACK bit for the FDD serving cell is necessarily ensured.

In a case where more than one serving cell is configured for the terminal device 2, the frame structure types of two certain configured serving cells are different, and the primary cell is in the frame structure type 1, in the terminal device 2 that transmits the HARQ-ACK by using the PUCCH format 1b or the PUCCH format 3 with the channel selection, the terminal device 2 determines the number of the HARQ-ACK bits o of the subframe n based on the number of configured TDD serving cells or configured FDD serving cells of which the subframe n–4 is the downlink subframe or the special subframe (the special subframe of the TDD serving cell for which the normal CP or the special subframe configuration 1, 2, 3, 4, 6, 7, 8, or 9 is configured or the special subframe of the TDD serving cell for which the extended CP or the special subframe configuration 1, 2, 3, 5, 6 or 7 is configured) and the downlink transmission mode configured in each serving cell. The terminal device 2 uses two HARQ-ACK bits in the serving cell for which the transmission mode corresponding to (supporting) two maximum transport blocks is configured, and uses one HARQ-ACK bit in other cases. Here, in the TDD serving cell, in a case where the parameter (eimta-HargReferenceConfig) referring to the HARQ-ACK transmission timing of the eIMTA is configured for the TDD serving cell from the higher layer, the subframe is determined from the parameter, and the subframe is determined from the UL-DL configuration of the serving cell.

Accordingly, it is possible to reduce the overhead of the HARQ-ACK bit.

It is possible to constitute the plurality of HARQ-ACK feedback bits even in the FDD cell by using the method of constituting the HARQ-ACK feedback bits.

Hereinafter, a coefficient $n_{HARQ}$ associated with the HARQ-ACK used for calculating the PUSCH including the HARQ-ACK, the transmit power of the PUCCH, or power headroom (PHR) in the TDD-FDD CA will be described.

$n_{HARQ}$ is information associated with the transmission bit of the HARQ-ACK in the subframe in which the HARQ-ACK bit is transmitted, and is used for calculating the transmit power control of the PUCCH or the PHR for type 2 report.

$n_{HARQ}$ is calculated using a value of the DL DAI (downlink DAI, DAI included in the DCI relating to the downlink grant, or DAI included in the DCI for scheduling the PDSCH). In a case where the DAI is not included in the DCI of the downlink grant, the $n_{HARQ}$ is calculated without using the DL DAI. A case where the DAI is not included in the DCI of the downlink grant is, for example, a case where the primary cell is the FDD. In a case where the DAI is included in the DCI of the downlink grant but does not use the value of the DAI, the $n_{HARQ}$ is calculated without using the value of the DL DAI. A case where the DAI is included in the DCI of the downlink grant but does not use the value of the DAI is, for example, a case where the UL/DL configuration (downlink reference UL/DL configuration) in which the number of elements M of the downlink association set is equal to or less than 1 is configured for the serving cell.

Even in a case where the UL/DL configuration (downlink reference UL/DL configuration) in which the number of elements M of the downlink association set is equal to or less than 1 is configured for the serving cell, the value of the DL DAI may be applied. In such a case, the value of the DL DAI included in the DCI relating to the downlink grant is notified as 1.

In a certain condition of the TDD-FDD CA, the DL DAI is applied to the FDD cell.

A case where the DL DAI is applied to the FDD cell in the TDD-FDD CA is, for example, a case where the primary cell is the TDD, the secondary cell is the FDD, and the cross carrier scheduling is not configured for the FDD cell from the TDD cell. A case where the cross carrier scheduling is not configured for the FDD cell from the TDD cell includes a case where the self scheduling is configured for the FDD cell or a case where the cross carrier scheduling is configured for the FDD cell from the FDD cell. In a case where the cross carrier scheduling is configured for the FDD cell from the FDD cell and a case where the downlink reference UL/DL configuration 0 is configured for the scheduled FDD cell, the DL DAI may not be applied.

In a case where the cross carrier scheduling is configured for the FDD cell from at least TDD cell and also a case where the downlink reference UL/DL configuration 0 is configured for FDD cell, the DL DAI may not be applied to the FDD cell in the TDD-FDD CA. In a case where the downlink reference UL/DL configuration 0 is configured for the FDD cell, since the number of elements M of the downlink association set is equal to or less than 1, the DL DAI may not be applied.

$n_{HARQ}$ is calculated using the DL DAI even in the FDD serving cell to which the DL DAI is applied. A case where $n_{HARQ}$ is calculated using the DL DAI is, for example, a case where $n_{HARQ}$ is calculated using Expression (2) of FIG. 16. Here, $n_{HARQ}$ is calculated without using the DL DAI in the serving cell to which the DL DAI is not applied. A case where $n_{HARQ}$ is calculated without using the DL DAI is, for example, a case where $n_{HARQ}$ is calculated using Expression (1) of FIG. 16, a case where $n_{HARQ}$ is calculated using Expression (2) of FIG. 16 acquired by substituting the number of reception subframes ($U_{DAI, c}$) of the SPS release PDCCH/EPDCCH or the PDSCH for DL DAI ($V^{DL}_{DAI, c}$), or a case where the number of transmitted HARQ-ACK bits is substituted for $n_{HARQ}$.

That is, the terminal device 2 communicating with the base station apparatus 1 by using the FDD cell and the TDD cell includes a reception unit that performs reception over the PDCCH transmitted using the DCI format. In a case where the primary cell is configured as the TDD cell for the terminal device 2, the DAI indicating the number of accumulated number of PDCCHs or EPDCCHs indicating the releasing of the downlink semi-persistent scheduling or the transmission of the PDSCH in the subframes until the current subframe within the prescribed subframe is received while being included in the DCI format, and the transmit power of the PUCCH for transmitting the HARQ-ACK corresponding to the EPDCCH or the PDCCH indicating the releasing of the downlink semi-persistent scheduling or the transmission of the PDSCH is determined based on the value of the DAI.

Hereinafter, an example of the value of $n_{HARQ}$ will be described.

The value of $n_{HARQ}$ is applied using an example of calculation to be described below in a case where more than one serving cell is configured for the terminal device 2 or in a case where one serving cell is configured for the terminal device 2 and the transmission using the PUCCH format 3 is configured, and $n_{HARQ}$ is the number of HARQ-ACK bits transmitted in the subframe in other cases.

An example of the calculation of the value of $n_{HARQ}$ will be described.

In the TDD-FDD CA (TDD-FDD) and the TDD primary cell, the FDD cell applies Expression (2) of FIG. 16 using the DL DAI in all the downlink reference UL/DL configurations. In the TDD-FDD CA (TDD-FDD) and the TDD primary cell, the TDD cell applies Expression (2) of FIG. 16 using the DL DAI in a case where the TDD UL/DL configuration or the downlink reference UL/DL configuration is 1 to 6, and the TDD cell applies Expression (2) of FIG. 16 acquired by substituting the number of reception subframes of the SPS release PDCCH/EPDCCH or the PDSCH for the DL DAI in a case where the TDD UL/DL configuration or the downlink reference UL/DL configuration is 0.

In TDD, the following operation is performed in a case where more than one serving cell is configured for the terminal device 2 and different UL/DL configurations are configured for at least two serving cells, in a case where eIMTAConfig-r12 (tddModeAConfig-r12 or configuration parameter relating to eIMTA configuration) is configured for at least one serving cell, or in the TDD-FDD (TDD-FDD CA or TDD-FDD carrier aggregation) and the primary cell frame structure 2 (TDD PCell or case where primary cell is TDD).

$n_{HARQ}$ uses Expression (2) of FIG. 16 in the PUCCH format 3, or in two configured serving cells, and the PUCCH format 1b (PUCCH format 1b for performing channel selection) with the channel selection, and in a case where M is equal to or less than 2 (the number of elements of the downlink association set is equal to or less than 2). Here, $V^{DL}_{DAI, c}$ is $V^{DL}_{DAI}$ in the serving cell c, and $U_{DAI, c}$ is $U_{DAI}$ in the serving cell c, and $n^{ACK}_c$ is the number of HARQ-ACK bits equivalent (corresponding) to the DL transmission mode (TM) configured in the serving cell c. In a case where the spatial HARQ-ACK information bundling (spatial HARQ-ACK bundling) is applied, $n^{ACK}_c=1$ ($n^{ACK}_c$ equal to 1) and $N^{received}_{k, c}$ is the number of PDSCHs not having the corresponding PDCCH/EPDCCH or the PDCCH/EPDCCH received in the subframe n−k of the serving cell c, where k is an element of K (k belongs to K (k∈K)), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In a case where the spatial HARQ-ACK information bundling (spatial HARQ-ACK bundling) is not applied, $N^{received}_{k, c}$ is the number of PDCCHs/EPDCCHs (SPS release PDCCH/EPDCCH) indicating the releasing of the SPS or the number of transport blocks received in the subframe n−k of the serving cell c, where k is an element of K (k belongs to K (k∈K)), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In a case where the PDCCH/EPDCCH (SPS release PDCCH/EPDCCH) indicating the releasing of the SPS or the transport block is not completely detected in the subframe n−k in the serving cell c, $V^{DL}_{DAI, c}$ is 0 ($V^{DL}_{DAI, c}$=0), where k is an element of K (k belongs to K (k∈K)), and K is $K_c$ (K=$K_c$). $K_c$ is the downlink association set of the serving cell, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In the serving cell c, in a case where the downlink reference UL/DL configuration for the serving cell c is the TDD UL/DL configuration 0 except for the case where the serving cell c is the FDD, $U_{DAI, c}$ is configured (substituted or set) for $V^{DL}_{DAI, c}$ ($V^{DL}_{DAI, c} = U_{DAI, c}$).

An example of the calculation of the value of $n_{HARQ}$ will be described.

In the TDD-FDD CA (TDD-FDD) and the TDD primary cell, the FDD cell applies Expression (2) of FIG. 16 using the DL DAI in all the downlink reference UL/DL configurations. In the TDD-FDD CA (TDD-FDD) and the TDD primary cell, the TDD cell applies Expression (2) of FIG. 16 using the DL DAI in a case where the TDD UL/DL configuration or the downlink reference UL/DL configuration is 1 to 6, and applies Expression (2) of FIG. 16 acquired by substituting the number of reception subframes of the SPS release PDCCH/EPDCCH or the PDSCH for the DL DAI in a case where the TDD UL/DL configuration or the downlink reference UL/DL configuration is 0.

In TDD, the following operation is performed in a case where more than one serving cell is configured for the terminal device 2 and different UL/DL configurations are configured for at least two serving cells, in a case where eIMTAConfig-r12 (tddModeAConfig-r12 or configuration parameter relating to eIMTA configuration) is configured for at least one serving cell, or in the TDD-FDD (TDD-FDD CA or TDD-FDD carrier aggregation) and the primary cell frame structure 2 (TDD PCell or case where primary cell is TDD).

$n_{HARQ}$ uses Expression (2) of FIG. 16 in the PUCCH format 3, or in two configured serving cells, and the PUCCH format 1b (PUCCH format 1b for performing channel selection) with the channel selection, and in a case where M is equal to or less than 2 (the number of elements of the downlink association set is equal to or less than 2). Here, $V^{DL}_{DAI, c}$ is $V^{DL}_{DAI}$ in the serving cell c, and $U_{DAI, c}$ is $U_{DAI}$ in the serving cell c, and $n^{ACK}_c$ is the number of HARQ-ACK bits equivalent (corresponding) to the DL transmission mode (TM) configured in the serving cell c. In a case where the spatial HARQ-ACK information bundling (spatial HARQ-ACK bundling) is applied, $n^{ACK}_c = 1$ ($n^{ACK}_c$ equal to 1) and $N^{received}_{k, c}$ is the number of PDSCHs not having the corresponding PDCCH/EPDCCH or the PDCCH/EPDCCH received in the subframe n−k of the serving cell c, where k is an element of K (k belongs to K (k∈K)), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In a case where the spatial HARQ-ACK information bundling (spatial HARQ-ACK bundling) is not applied, $N^{received}_{k, c}$ is the number of PDCCHs/EPDCCHs (SPS release PDCCH/EPDCCH) indicating the releasing of the SPS or the number of transport blocks received in the subframe n−k of the serving cell c, where k is an element of K (k belongs to K (k∈K)), and K is $K_c$ (K=$K_c$). $K_c$ is the downlink association set of the serving cell, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In a case where the PDCCH/EPDCCH (SPS release PDCCH/EPDCCH) indicating the releasing of the SPS or the transport block is not completely detected in the subframe n−k in the serving cell c, $V^{DL}_{DAI, c}$ is 0 ($V^{DL}_{DAI, c} = 0$), where k is an element of K (k belongs to K (k∈K), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In the TDD serving cell c, in a case where the downlink reference UL/DL configuration for the serving cell c is the TDD UL/DL configuration 0, $U_{DAI, c}$ is configured (substituted or set) for $V^{DL}_{DAI, c}$ ($V^{DL}_{DAI, c} = U_{DAI, c}$).

An example of the calculation of the value of $n_{HARQ}$ will be described.

In the TDD-FDD CA (TDD-FDD) and the TDD primary cell, the FDD cell applies Expression (2) of FIG. 16 using the DL DAI in all the downlink reference UL/DL configurations in the self scheduling and in the downlink reference UL/DL configurations 1 to 6 in the cross carrier scheduling. In the TDD-FDD CA (TDD-FDD) and the TDD primary cell, the FDD cell applies Expression (2) of FIG. 16 acquired by substituting the number of reception subframes of the SPS release PDCCH/EPDCCH or the PDSCH for the DL DAI in the downlink reference UL/DL configuration 0 in the cross carrier scheduling. In the TDD-FDD CA (TDD-FDD) and the TDD primary cell, the TDD cell applies Expression (2) of FIG. 16 using the DL DAI in a case where the TDD UL/DL configuration or the downlink reference UL/DL configuration is 1 to 6, and the TDD cell applies Expression (2) of FIG. 16 acquired by substituting the number of reception subframes of the SPS release PDCCH/EPDCCH or the PDSCH for the DL DAI in a case where the TDD UL/DL configuration or the downlink reference UL/DL configuration is 0.

In TDD, the following operation is performed in a case where more than one serving cell is configured for the terminal device 2 and different UL/DL configurations are configured for at least two serving cells, in a case where eIMTAConfig-r12 (tddModeAConfig-r12 or configuration parameter relating to eIMTA configuration) is configured for at least one serving cell, or in the TDD-FDD (TDD-FDD CA or TDD-FDD carrier aggregation) and the primary cell frame structure 2 (TDD PCell or case where primary cell is TDD).

$n_{HARQ}$ uses Expression (2) of FIG. 16 in the PUCCH format 3, or in two configured serving cells, and the PUCCH format 1b (PUCCH format 1b for performing channel selection) with the channel selection, and in a case where M is equal to or less than 2 (the number of elements of the downlink association set is equal to or less than 2). Here, $U^{DL}_{DAI, c}$ is $V^{DL}_{DAI}$ in the serving cell c, and $U_{DAI, c}$ is $U_{DAI}$ in the serving cell c, and $n^{ACK}_c$ is the number of HARQ-ACK bits equivalent (corresponding) to the DL transmission mode (TM) configured in the serving cell c. In a case where the spatial HARQ-ACK information bundling (spatial HARQ-ACK bundling) is applied, $n^{ACK}_c = 1$ ($n^{ACK}_c$ equal to 1) and $N^{received}_{k, c}$ is the number of PDSCHs not having the corresponding PDCCH/EPDCCH or the PDCCH/EPDCCH received in the subframe n−k of the serving cell c, where k is an element of K (k belongs to K (k∈K)), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In a case where the spatial HARQ-ACK information bundling (spatial HARQ-ACK bundling) is not applied, $N^{received}_{k,c}$ is the number of PDCCHs/EPDCCHs (SPS release PDCCH/EPDCCH) indicating the releasing of the SPS or the number of transport blocks received in the subframe n−k of the serving cell c, where k is an element of K (k belongs to K (k∈K)), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In a case where the PDCCH/EPDCCH (SPS release PDCCH/EPDCCH) indicating the releasing of the SPS or the transport block is not completely detected in the subframe n−k in the serving cell c, $V^{DL}_{DAI,c}$ is 0 ($V^{DL}_{DAI,c}$=0), where k is an element of K (k belongs to K (k∈K)), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In the serving cell c, in a case where the downlink reference UL/DL configuration for the serving cell c is the TDD UL/DL configuration 0 except for a case where the serving cell c is the FDD and the self scheduling is configured for the terminal device 2 (the monitoring of the PDCCH/EPDCCH in another serving cell for the scheduling of the serving cell c is not configured for the terminal device 2), $U_{DAI,c}$ is configured (substituted or set) for $V^{DL}_{DAI,c}$ ($V^{DL}_{DAI,c}=U_{DAI,c}$).

An example of the calculation of the value of $n_{HARQ}$ will be described.

In TDD, the following operation is performed in a case where more than one serving cell is configured for the terminal device 2 and different UL/DL configurations are configured for at least two serving cells, in a case where eIMTAConfig-r12 (tddModeAConfig-r12 or configuration parameter relating to eIMTA configuration) is configured for at least one serving cell, or in the TDD-FDD (TDD-FDD CA or TDD-FDD carrier aggregation) and the primary cell frame structure 2 (TDD PCell or case where primary cell is TDD).

$n_{HARQ}$ uses Expression (2) of FIG. 16 in the PUCCH format 3, or in two configured serving cells, and the PUCCH format 1b (PUCCH format 1b for performing channel selection) with the channel selection, and in a case where M is equal to or less than 2 (the number of elements of the downlink association set is equal to or less than 2). Here, $V^{DL}_{DAI,c}$ is $V^{DL}_{DAI}$ in the serving cell c, and $U_{DAI,c}$ is $U_{DAI}$ in the serving cell c, and $n^{ACK}_c$ is the number of HARQ-ACK bits equivalent (corresponding) to the DL transmission mode (TM) configured in the serving cell c. In a case where the spatial HARQ-ACK information bundling (spatial HARQ-ACK bundling) is applied, $n^{ACK}_c=1$ ($n^{ACK}_c$ equal to 1) and $N^{received}_{k,c}$ is the number of PDSCHs not having the corresponding PDCCH/EPDCCH or the PDCCH/EPDCCH received in the subframe n−k of the serving cell c, where k is an element of K (k belongs to K (k∈K)), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In a case where the spatial HARQ-ACK information bundling (spatial HARQ-ACK bundling) is not applied, $N^{received}_{k,c}$ is the number of PDCCHs/EPDCCHs (SPS release PDCCH/EPDCCH) indicating the releasing of the SPS or the number of transport blocks received in the subframe n−k of the serving cell c, where k is an element of K (k belongs to K (k∈K)), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In a case where the PDCCH/EPDCCH (SPS release PDCCH/EPDCCH) indicating the releasing of the SPS or the transport block is not completely detected in the subframe n−k in the serving cell c, $V^{DL}_{DAI,c}$ is 0 ($V^{DL}_{DAI,c}$=0), where k is an element of K (k belongs to K (k∈K)), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In a case where the cross carrier scheduling is configured for the terminal device 2 of the TDD serving cell c or the FDD serving cell c (the monitoring of the PDCCH/EPDCCH in another serving cell for the scheduling of the serving cell c is configured for the terminal device 2), and in a case where the downlink reference UL/DL configuration for the serving cell c is the TDD UL/DL configuration 0, $U_{DAI,c}$ is configured (substituted or set) for $V^{DL}_{DAI,c}$ ($V^{DL}_{DAI,c}=U_{DAI,c}$).

An example of the calculation of the value of $n_{HARQ}$ will be described.

In the TDD-FDD CA (TDD-FDD) and the TDD primary cell, Expression (2) of FIG. 16 using the DL DAI is applied in a case where the DL DAI is used (applied) for the serving cell, and Expression (2) of FIG. 16 acquired by substituting the number of reception subframes of the SPS release PDCCH/EPDCCH or the PDSCH for the DL DAI in other cases.

In the TDD, the following operation is performed in a case where more than one serving cell is configured for the terminal device 2 and different UL/DL configurations are configured for at least two serving cells, in a case where eIMTAConfig-r12 (tddModeAConfig-r12 or configuration parameter relating to eIMTA configuration) is configured for at least one serving cell, or in the TDD-FDD (TDD-FDD CA or TDD-FDD carrier aggregation) and the primary cell frame structure 2 (TDD PCell, TDD primary cell, or case where primary cell is TDD).

$n_{HARQ}$ uses Expression (2) of FIG. 16 in the PUCCH format 3, or in two configured serving cells, and the PUCCH format 1b (PUCCH format 1b for performing channel selection) with the channel selection, and in a case where M is equal to or less than 2 (the number of elements of the downlink association set is equal to or less than 2). Here, $V^{DL}_{DAI, c}$ is $V^{DL}_{DAI}$ in the serving cell c, and $U_{DAI, c}$ is $U_{DAI}$ in the serving cell c, and $n^{ACK}_c$ is the number of HARQ-ACK bits equivalent (corresponding) to the DL transmission mode (TM) configured in the serving cell c. In a case where the spatial HARQ-ACK information bundling (spatial HARQ-ACK bundling) is applied, $n^{ACK}_c=1$ ($n^{ACK}_c$ equal to 1) and $N^{received}_{k, c}$ is the number of PDSCHs not having the corresponding PDCCH/EPDCCH or the PDCCH/EPDCCH received in the subframe n−k of the serving cell c, where k is an element of K (k belongs to K (k∈K)), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In a case where the spatial HARQ-ACK information bundling (spatial HARQ-ACK bundling) is not applied, $N^{received}_{k, c}$ is the number of PDCCHs/EPDCCHs (SPS release PDCCH/EPDCCH) indicating the releasing of the SPS or the number of transport blocks received in the subframe n−k of the serving cell c, where k is an element of K (k belongs to K (k∈K)), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In a case where the PDCCH/EPDCCH (SPS release PDCCH/EPDCCH) indicating the releasing of the SPS or the transport block is not completely detected in the subframe n−k in the serving cell c, $V^{DL}_{DAI, c}$ is 0 ($V^{DL}_{DAI, c}=0$), where k is an element of K (k belongs to K (k∈K), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In the serving cell c, in a case where $V^{DL}_{DAI, c}$ is not used (is not applied), $U_{DAI, c}$ is configured (substituted or set) for $V^{DL}_{DAI, c}$ ($V^{DL}_{DAI, c}=U_{DAI, c}$).

A case where $V^{DL}_{DAI, c}$ is not used (is not applied) is a case where the serving cell that receives $V^{DL}_{DAI, c}$ is the TDD cell for which one or more TDD cells are configured and the UL-DL configuration 0 is configured in a case where the UL-DL configurations of all the TDD cells are the same, is the TDD cell for which two or more TDD cells are configured and the downlink reference UL-DL configuration 0 is configured in a case where different UL-DL configurations are configured for at least two TDD cells, or is the FDD cell for which the cross carrier scheduling is configured from the TDD cell or the TDD primary cell for which the downlink reference UL-DL configuration 0 is configured in a case where the primary cell is the TDD and at least one secondary cell is the FDD. That is, in the configured TDD serving cell, in a case where the TDD UL/DL configuration or the downlink reference UL-DL configuration is 0, the DAI included in the DCI format 1/1A/1B/1D/2/2A/2B/2C/2D is not used.

An example of the calculation of the value of $n_{HARQ}$ will be described.

$n_{HARQ}$ is calculated using Expression (1) of FIG. 16 in a case where DL DAI is not present or a case where the DL DAI is present but is not used (is not applied), and $n_{HARQ}$ is calculated using Expression (2) of FIG. 16 in a case where the DL DAI is present and is used (applied).

In the TDD, the following operation is performed in a case where more than one serving cell is configured for the terminal device 2 and different UL/DL configurations are configured for at least two serving cells, in a case where eIMTAConfig-r12 (tddModeAConfig-r12 or configuration parameter relating to eIMTA configuration) is configured for at least one serving cell, or in the TDD-FDD (TDD-FDD CA or TDD-FDD carrier aggregation) and the primary cell frame structure 2 (TDD PCell, TDD primary cell, or case where primary cell is TDD).

$n_{HARQ}$ uses Expression (2) of FIG. 16 in the PUCCH format 3, or in two configured serving cells, and the PUCCH format 1b (PUCCH format 1b for performing channel selection) with the channel selection, and in a case where M is equal to or less than 2 (the number of elements of the downlink association set is equal to or less than 2). Here, $V^{DL}_{DAI, c}$ is $V^{DL}_{DAI}$ in the serving cell c, and $U_{DAI, c}$ is $U_{DAI}$ in the serving cell c, and $n^{ACK}_c$ is the number of HARQ-ACK bits equivalent (corresponding) to the DL transmission mode (TM) configured in the serving cell c. In a case where the spatial HARQ-ACK information bundling (spatial HARQ-ACK bundling) is applied, $n^{ACK}_c=1$ ($n^{ACK}_c$ equal to 1) and $N^{received}_{k, c}$ is the number of PDSCHs not having the corresponding PDCCH/EPDCCH or the PDCCH/EPDCCH received in the subframe n−k of the serving cell c, where k is an element of K (k belongs to K (k∈K)), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In a case where the spatial HARQ-ACK information bundling (spatial HARQ-ACK bundling) is not applied, $N^{received}_{k, c}$ is the number of PDCCHs/EPDCCHs (SPS release PDCCH/EPDCCH) indicating the releasing of the SPS or the number of transport blocks received in the subframe n−k of the serving cell c, where k is an element of K (k belongs to K (k∈K)), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In a case where the PDCCH/EPDCCH (SPS release PDCCH/EPDCCH) indicating the releasing of the SPS or the transport block is not completely detected in the subframe n−k in the serving cell c, $V^{DL}_{DAI, c}$ is 0 ($V^{DL}_{DAI, c}=0$), where k is an element of K (k belongs to K (k∈K), and K is $K_c$ (K=$K_c$). $K_c$ is the downlink association set of the serving cell, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD. In the serving cell c, in a case where the downlink reference UL/DL configuration for the serving cell c is the TDD UL/DL configuration 0 except for the case where the serving cell c is the FDD, $n_{HARQ}$ uses Expression (1) of FIG. 16.

An example of the calculation of the value of $n_{HARQ}$ will be described.

In TDD, the following operation is performed in a case where more than one serving cell is configured for the terminal device 2 and different UL/DL configurations are configured for at least two serving cells, in a case where eIMTAConfig-r12 (tddModeAConfig-r12 or configuration parameter relating to eIMTA configuration) is configured for at least one serving cell, or in the TDD-FDD (TDD-FDD CA or TDD-FDD carrier aggregation) and the primary cell frame structure 2 (TDD PCell or case where primary cell is TDD).

In two configured serving cells, in the PUCCH format 1b (PUCCH format 1b for performing the channel selection) with the channel selection, and in a case where M is 3 or 4 (M=3 or 4), $n_{HARQ}$ is 2 ($n_{HARQ}=2$) in a case where the terminal device 2 receives the PDCCH/EPDCCH indicating the releasing of the downlink SPS or the PDSCH only one serving cell in the subframe n−k, and $n_{HARQ}$ is 4 ($n_{HARQ}=4$) in other cases. Here, k is an element of K (k belongs to K (k∈K), and K is $K_c$ (K=$K_c$). $K_c$ is the downlink association set of the serving cell c, is defined by FIG. 6 in the TDD, is defined by FIG. 6 in a case where the monitoring of the PDCCH/EPDCCH in another serving cell for the scheduling of the serving cell is configured for the terminal device 2, and is defined by FIG. 9 in a case where the monitoring of the PDCCH/EPDCCH in another serving cell for the scheduling of the serving cell is not configured for the terminal device 2 in the TDD-FDD.

$N^{DL}_{cells}$ is the number of configured cells.

mod is an operator for calculating the remainder, and AmodB is used for calculating the remainder acquired by dividing A by B.

Accordingly, it is possible to appropriately control an uplink transmit power using the DL DAI in the TDD-FDD CA.

Accordingly, it is possible to efficiently transmit the uplink signal (PUCCH or PUSCH) including the DL HARQ-ACK.

Thus, the terminal device 2 can efficiently perform communication by using the DAI.

In a case where different frame structure types (FDD (Type 1) and TDD (Type 2)) are applied in the primary cell and at least one secondary cell, the terminal device 2 which performs cell aggregation (carrier aggregation) does not simultaneously perform transmission and reception between the primary cell and the secondary cell if the terminal device 2 does not have a function (performance, capacity) of simultaneously performing transmission and reception between bands supported by the primary cell and the secondary cell.

The present embodiment may be also applied to a different band (E-UTRA Operating Band, E-UTRA Band, or Band).

Here, a band in which a duplex mode is TDD may also be referred to as a TDD band, and a band in which a duplex mode is FDD may also be referred to as an FDD band. Similarly, a cell (carrier) of which the frame structure type is FDD (Type 1) may also be referred to as an FDD cell (FDD carrier), and a cell (carrier) of which the frame structure type is TDD (Type 2) may also be referred to as a TDD cell (TDD carrier).

In the TDD frame structure, the configuration in which all the subframes are the downlink subframes may be performed. In this case, the aforementioned embodiment may be applied to a case where the TDD cell for which all the subframes are configured as the downlink subframe is replaced with the FDD cell (the downlink component carrier of the FDD).

The TDD frame structure may be applied in the uplink component carrier of the FDD. In this case, the aforementioned embodiment may be applied to a case where the uplink component carrier of the FDD to which the TDD frame structure is applied is replaced with the TDD cell.

FIG. 1 is a schematic block diagram illustrating a structure of the base station apparatus 1 according to the present invention. As illustrated in FIG. 1, the base station apparatus 1 includes a higher layer processing unit 101, a control unit 103, a reception unit 105, a transmission unit 107, a channel measurement unit 109, and a transmit and receive antenna 111. The reception unit 105 includes a decoding unit 1051, a demodulation unit 1053, a demultiplexing unit 1055, and a wireless reception unit 1057. A reception process of the base station apparatus 1 is performed by the higher layer processing unit 101, the control unit 103, the reception unit 105, and the transmit and receive antenna 111. The transmission unit 107 includes a coding unit 1071, a modulation unit 1073, a multiplexing unit 1075, a wireless transmission unit 1077, and a downlink reference signal generation unit 1079. A transmission process of the base station apparatus 1 is performed by the higher layer processing unit 101, the control unit 103, the transmission unit 107, and the transmit and receive antenna 111.

The higher layer processing unit 101 performs processes of a medium access control (MAC) layer, a packet data convergence protocol (PDCP) layer, a radio link control (RLC) layer, and a radio resource control (RRC) layer.

The higher layer processing unit 101 generates information assigned to each channel of the downlink or acquires the information from the higher node, and outputs the information to the transmission unit 107. The higher layer processing unit 101 assigns radio resources for causing the terminal device 2 to allocate a physical uplink shared channel (PUSCH) which is data information of the uplink from the radio resources of the uplink. The higher layer processing unit 101 determines radio resources for allocating a physical downlink shared channel (PDSCH) which is data information of the downlink, from the radio resources of the downlink.

The higher layer processing unit 101 generates downlink control information indicating the assignment of the radio resources, and transmits the generated information to the terminal device 2 through the transmission unit 107.

The higher layer processing unit 101 preferentially allocates radio resources having good channel quality based on a channel measurement result of the uplink which is input from the channel measurement unit 109 when the radio resources for allocating the PUSCH are assigned. That is, the higher layer processing unit 101 generates information items regarding configurations of various downlink signals and information items regarding configurations of various uplink signals for a certain terminal device or a certain cell.

The higher layer processing unit 101 may generates information items regarding the configurations of various downlink signals, and information items regarding the configurations of various uplink signals for each cell. The higher layer processing unit 101 may generates information items regarding the configurations of various downlink signals, and information items regarding the configurations of various uplink signals for each terminal device 2.

The higher layer processing unit 101 may generate information regarding a first configuration to information regarding an n-th configuration (n is natural number) for a certain terminal device 2 or a certain cell, that is, which are specific to a terminal device and/or a cell, and may transmit the generated information items to the terminal device 2 through the transmission unit 107. For example, the information items regarding the configurations of the downlink signal and/or the uplink signal may include parameters relating to resource assignment.

The information items regarding the configurations of the downlink signal and/or the uplink signal may include parameters used for calculating a sequence. These radio resources may be also referred to time-frequency resources, subcarriers, resource elements (RE), a resource element group (REG), control channel elements (CCE), a resource block (RB), or a resource block group (RBG).

These configuration information items and control information items may be defined as information elements. These configuration information items and control information items may be defined as RRC messages. These configuration information items and control information items may be transmitted as system information items to the terminal device 2. These configuration information items and control information items may be transmitted to the terminal device 2 by dedicated signaling.

The higher layer processing unit 101 configures at least one TDD UL/DL configuration (TDD UL-DL configuration(s), TDD config, tdd-Config, or uplink-downlink configuration(s)) for the system information block type 1. The TDD UL/DL configuration may be defined as in FIG. 3. The structure of TDD may be shown by configuring an index. A second TDD UL/DL configuration may be configured as a downlink reference. A plurality of types of system information blocks may be prepared. For example, the system information block type 1 includes an information element regarding the TDD UL/DL configuration.

The TDD UL/DL configuration is information indicating the type (the uplink subframe, the downlink subframe, or the special subframe) of the subframe within one radio frame (10 subframes). The TDD UL/DL configuration may be configured for the serving cell or the terminal device 2 for which the serving cell is configured while being included in the uplink reference UL-DL configuration (first uplink reference UL-DL configuration or the second uplink reference UL-DL configuration) or the downlink reference UL-DL configuration (first downlink reference UL-DL configuration or the second downlink reference UL-DL configuration).

The system information block Type 2 includes an information element regarding radio resource control. A parameter relating to an information element thereof may be included as an information element among certain information elements. For example, the information element referred to the parameter in the physical layer may be defined as the information element in the higher layer.

In the present invention, an identity, an identifier, and identification are referred to as an ID (identifier, identification sign, and identification number). As an ID (UEID) configured so as to be specific to the terminal, there are a cell radio network temporary identifier (C-RNTI), a semi-persistent scheduling C-RNTI (SPS C-RNTI), a temporary C-RNTI, a TPC-PUSCH RNTI, a TPC-PUCCH RNTI, and a random value for contention resolution. These IDs are used in a unit of a cell. These IDs are configured by the higher layer processing unit 101.

The higher layer processing unit 101 configures various identifiers for the terminal device 2, and notifies the terminal device 2 of the various configured identifiers through the transmission unit 107. For example, the higher layer processing unit 101 configures the RNTI and notifies the terminal device 2 of the configured RNTI. The higher layer processing unit 101 configures a physical layer cell ID, a virtual cell ID, or an ID equivalent to the virtual cell ID, and notifies the terminal device 2 of the configured ID. For example, as the ID equivalent to the virtual cell ID, there are IDs (PUSCH ID, PUCCH ID, scrambling initialization ID, or reference signal ID (RSID)) which may be configured so as to be specific to the physical channel. The physical layer cell ID or the virtual cell ID may be used for generating the sequence of the physical signal or the physical channel.

The higher layer processing unit 101 generates downlink control information (DCI) notified through the physical downlink control channel (PDCCH) or the enhanced physical downlink control channel (EPDCCH), generates control information for controlling the reception unit 105 and the transmission unit 107, and outputs the generated control information to the control unit 103.

The higher layer processing unit 101 generates the control information for controlling the reception unit 105 and the transmission unit 107 based on the uplink control information (UCI) notified from the terminal device 2 through the physical uplink control channel (PUCCH), the status of the buffer notified from the terminal device 2, and various configuration information items (RRC message, system information, parameter, or information element) of each terminal device 2 configured by the higher layer processing unit 101, and outputs the generated control information to the control unit 103. The UCI includes at least one of ACK/NACK, a scheduling request (SR), and channel state information (CSI). The CSI includes at least one of the CQI, the PMI, and the RI.

The higher layer processing unit 101 configures the transmit powers of the uplink signals (PRACH, PUCCH, PUSCH, UL DMRS, P-SRS, and A-SRS) and the parameters relating to the transmit powers. The higher layer processing unit 101 transmits the transmit powers of the downlink signals (CRS, DL DMRS, CSI-RS, PDSCH, and PDCCH/EPDCCH) and the parameters relating to the transmit powers to the terminal device 2 through the transmission unit 107. That is, the higher layer processing unit 101 transmits information regarding power control of the uplink and the downlink to the terminal device 2 through the transmission unit 107. In other words, the higher layer processing unit 101 generates information items regarding the transmit power control of the base station apparatus 1 and the terminal device 2. For example, the higher layer processing unit 101 transmits the parameter relating to the transmit power of the base station apparatus 1 to the terminal device 2.

The higher layer processing unit 101 transmits parameters used for configuring a maximum transmit power $P_{CMAX, c}$ and a total maximum output power $P_{CMAX}$ of the terminal device 2 to the terminal device 2. The higher layer processing unit 101 transmits information regarding transmit power control of various physical channels to the terminal device 2.

The higher layer processing unit 101 sets the transmit power of the terminal device 2 such that the PUSCH satisfies a prescribed channel quality or in consideration of the interference with the neighbor base station apparatus 1 based on information indicating an interference amount from a neighbor base station apparatus, information indicating interference information assigned to the neighbor base station apparatus 1 notified from the neighbor base station apparatus, or channel quality input from the channel measurement unit 109, and transmits information indicating these configurations to the terminal device 2 through the transmission unit 107.

Specifically, the higher layer processing unit 101 transmits standard powers ($P_{O\_NOMINAL\_PUSCH}$ and $P_{O\_NOMINAL\_PUCCH}$) of the PUSCH and the PUCCH, a pathloss compensation coefficient (attenuation coefficient) $\alpha$, a power offset for Message 3, or a power offset defined for each PUCCH format through the system information, as information (information of a shared parameter relating to the uplink power control) shared between the terminal devices 2 or information configured as a common parameter between the terminal devices 2. In this case, the power offset of the PUCCH format 3 and the power offset of delta-PUCCH format 1bCS may be added and may be notified. These information items of the shared parameters may be notified through the RRC message.

The higher layer processing unit 101 notifies of a terminal device-specific PUSCH power $P_{0\_UE\_PUSCH}$, a parameter (deltaMCS-Enabled) indicating whether or not delta MCS is available, a parameter (accumulationEnabled) indicating whether or not accumulation is available, a terminal device-specific PUCCH power $P_{0\_UE\_PUCCH}$, a P-SRS power offset $P_{SRS\_OFFSET}$ (0), or a filter coefficient through the RRC message, as information (information of the dedicated parameter related to the uplink power control) capable of being configured for each terminal device 2. In this case, A-SRS power offset $P_{SRS\_OFFSET}(1)$ or a power offset of transmission diversity in each PUCCH format may be notified. $\alpha$ mentioned herein is used for setting the transmit power in cooperation with the pathloss value, is a coefficient indicating a compensated degree of the pathloss is, in other words, a coefficient (attenuation coefficient or pathloss compensation coefficient) for determining a transmit power to be increased or decreased depending on the pathloss (that is, transmit power to be compensated). If $\alpha$ has typically a value of 0 or 1, the power is not compensated depending on the pathloss if $\alpha$ is 0, and the transmit power of the terminal device 2 is compensated such that the pathloss is not influenced on the base station apparatus 1 if $\alpha$ is 1. These information items may be transmitted to the terminal device 2, as reconfiguration information. These shared parameters and dedicated parameters may be independently configured for the primary cell and the secondary cell or for a plurality of serving cells.

In a case where the reception unit 105 receives function information of the terminal device 2 from the terminal device 2, the higher layer processing unit 101 performs various configurations based on the function information of the terminal device 2. For example, the higher layer processing unit determines a carrier frequency of the uplink and a carrier frequency of the downlink from a band (EUTRA Operating Band) supported by the terminal device 2 based on the function information of the terminal device 2. The higher layer processing unit determines whether or not to perform the MIMO communication with the terminal device 2 based on the function information of the terminal device 2. The higher layer processing unit determines whether or not to perform the carrier aggregation based on the function information of the terminal device 2. The higher layer processing unit determines whether or not to perform the carrier aggregation using component carriers having different frame structure types based on the function information of the terminal device 2. That is, the higher layer processing unit determines whether or not to configure a secondary cell and determines various parameters used for the secondary cell. The higher layer processing unit notifies the terminal device 2 of the determined information. The information regarding the carrier frequency may be notified through the RRC message. That is, the information regarding the carrier frequency may be notified through the system information. The information regarding the carrier frequency may be notified while being included in mobility control information. The information regarding the carrier frequency may be notified through the RRC information from the higher layer.

In a case where the secondary cell is configured for the terminal device 2, the higher layer processing unit 101 assigns a cell index other than a specific value (for example, "0" or information bit equivalent to "0") to the secondary cell, and transmits the configuration information thereof to the terminal device 2. In a case where the secondary cell is configured, the terminal device 2 regards the cell index of the primary cell as the specific value.

The higher layer processing unit 101 may configure the transmit power of the downlink signal/uplink signal or the parameter relating to the transmit power for each terminal device 2. The higher layer processing unit 101 may configure the transmit power of the common downlink/uplink signal to the terminal devices 2 or the parameters relating to the transmit power. The higher layer processing unit 101 may transmit information items regarding these parameters to the terminal device 2, as information (information of the parameter relating to the uplink power control) regarding the uplink power control and/or information (information of the parameter relating to the downlink power control) regarding the downlink power control. The information of the parameter relating to the uplink power control and the information of the parameter relating to the downlink power control are transmitted to the terminal device 2 while including at least one parameter.

The higher layer processing unit 101 configures various IDs relating to various physical channels/physical signals, and outputs information items regarding the configurations of the IDs to the reception unit 105 and the transmission unit 107 through the control unit 103. For example, the higher layer processing unit 101 configures the value of the RNTI (UEID) for scrambling CRC included in the downlink control information format.

The higher layer processing unit 101 may configure values of various identifiers such as the cell radio network temporary identifier (C-RNTI), the temporary C-RNTI, Paging-RNTI (P-RNTI), the random access RNTI (RA-RNTI), the semi-persistent scheduling C-RNTI (SPS C-RNTI), and the system information RNTI (SI-RNTI).

The higher layer processing unit 101 configures the value of the ID such as the physical cell ID, the virtual cell ID, or the scrambling initialization ID. These configuration information items are output to the respective processing units through the control unit 103. These configuration information items may be transmitted to the terminal device 2, as the RRC message, the system information, the dedicated information specific to the terminal device, and the information element. Some of RNTIs may be transmitted by using the MAC control element (CE).

The control unit 103 generates control signals for controlling the reception unit 105 and the transmission unit 107 based on the control information from the higher layer processing unit 101. The control unit 103 outputs the generated control signals to the reception unit 105 and the transmission unit 107, and controls the reception unit 105 and the transmission unit 107.

The reception unit 105 separates, demodulates, and decodes a reception signal received from the terminal device 2 through the transmit and receive antenna 111 according to the control signals input from the control unit 103, and outputs the decoded information to the higher layer processing unit 101. The wireless reception unit 1057 converts (down-converts) the frequency of the signal of the uplink received through the transmit and receive antenna 111 into an intermediate frequency (IF), removes unnecessary frequency components, and controls an amplification level such that a signal level is appropriately maintained. The wireless reception unit performs orthogonal demodulation based on in-phase components and quadrature components of the received signal and, and converts an analog signal acquired by performing the orthogonal demodulation into a digital signal. The wireless reception unit 1057 removes a portion equivalent to a guard interval (GI) from the converted digital signal. The wireless reception unit 1057 performs fast Fourier Transform (FFT) on a signal obtained by removing the guard interval, extracts the signal in the frequency domain, and outputs the extracted signal to the demultiplexing unit 1055.

The demultiplexing unit 1055 separates the signal input from the wireless reception unit 1057 into signals of the PUCCH, the PUSCH, the UL DMRS and the SRS. The separation is performed based on assignment information of radio resources which are previously determined by the base station apparatus 1 and are notified to each terminal device 2. The demultiplexing unit 1055 performs channel compensation of the PUCCH and the PUSCH from an estimated value of the channel input from the channel measurement unit 109. The demultiplexing unit 1055 outputs the separated UL DMRS and SRS to the channel measurement unit 109.

The demodulation unit 1053 performs inverse discrete Fourier transform (IDFT) on the PUSCH to acquire modulation symbols, and demodulates the reception signal on the modulation symbols of the PUCCH and the PUSCH by using a predetermined modulation scheme, such as binary phase shift keying (BPSK), quadrature phase shift keying (QPSK), 16 quadrature amplitude modulation (16-QAM), or 64 quadrature amplitude modulation (64-QAM) or a modification scheme previously notified to the terminal device 2 from the base station apparatus 1 using the downlink control information.

The decoding unit 1051 decodes coding bits of the demodulated PUCCH and PUSCH at a predetermined coding rate of a predetermined coding scheme or at a coding rate previously notified to the terminal device 2 from the base station apparatus 1 by using the uplink grant (UL grant), and outputs the decoded data information and the decoded uplink control information to the higher layer processing unit 101.

The channel measurement unit 109 measures the estimated value of the channel or the quality of the channel based on the SRS and the uplink demodulation reference signal (UL DMRS) input from the demultiplexing unit 1055, and outputs the measurement result to the demultiplexing unit 1055 and the higher layer processing unit 101. The channel measurement unit 109 measures the received powers and/or reception quality of the first signal to the n-th signal, and outputs the measurement result to the demultiplexing unit 1055 and the higher layer processing unit 101.

The transmission unit 107 generates the reference signal of the downlink (downlink reference signal) based on the control signal input from the control unit 103, codes and modulates data information and downlink control information input from the higher layer processing unit 101. The transmission unit multiplexes the PDCCH (EPDCCH), the PDSCH, and the downlink reference signal using the DCI format, and transmits the multiplexed downlink signal to the terminal device 2 through the transmit and receive antenna 111. The transmission unit transmits the PDCCH by using the first DCI format or the second DCI format.

The coding unit 1071 performs coding such as turbo-coding, convolutional coding, or block coding on the data information and the downlink control information input from the higher layer processing unit 101. The modulation unit 1073 modulates the coding bits by using the modulation scheme such as QPSK, 16-QAM, and 64-QAM. The downlink reference signal generation unit 1079 generates the signal as the downlink reference signal with the sequence known by the terminal device 2 required in a predetermined rule based on a cell identifier (Cell ID, Cell Identity, Cell Identifier, or Cell Identification) for identifying the base station apparatus 1. The multiplexing unit 1075 multiplexes the modulated channel and downlink reference signal.

The wireless transmission unit 1077 performs inverse fast Fourier Transform (IFFT) on the multiplexed modulation symbol, performs modulation of the OFDM scheme, and adds a guard interval to OFDM symbols obtained by OFDM modulation. The wireless transmission unit generates a baseband digital signal, converts the baseband digital signal into an analog signal, and generates the in-phase component and quadrature component of the intermediate frequency from the analog signal. The wireless transmission unit removes an extra frequency component from the intermediate frequency band, converts (up-converts) a signal having an intermediate frequency into a signal having a high frequency, and removes an extra frequency component. The wireless transmission unit amplifies a power, and outputs and transmits the signal to the transmit and receive antenna 111.

Figure 2:
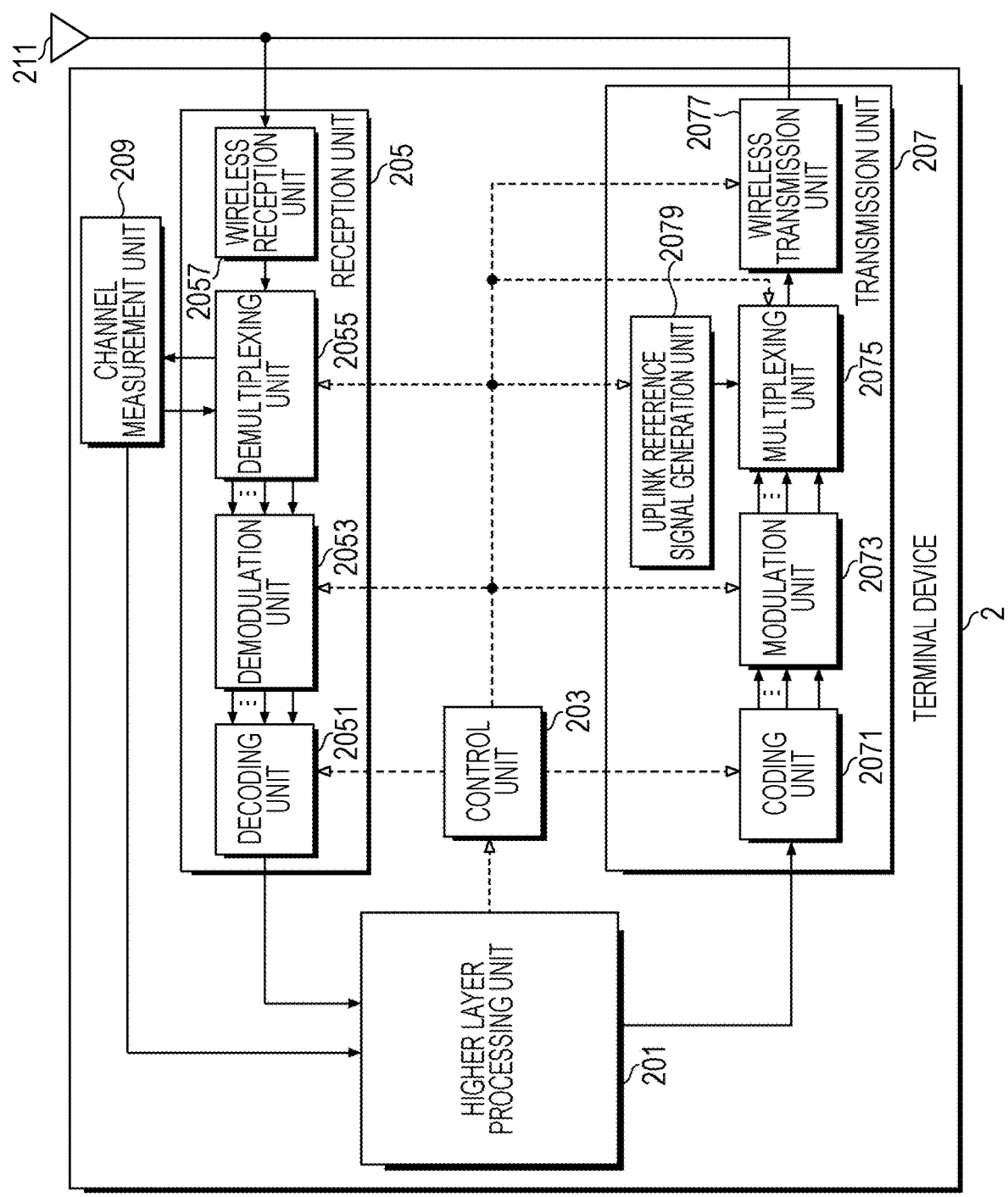
FIG. 2 is a schematic block diagram illustrating a structure of a terminal device 2 according to the first embodiment of the present invention.

FIG. 2 is a schematic block diagram illustrating a structure of the terminal device 2 according to the present embodiment. As illustrated in FIG. 2, the terminal device 2 includes a higher layer processing unit 201, a control unit 203, a reception unit 205, a transmission unit 207, a channel measurement unit 209, and a transmit and receive antenna 211. The reception unit 205 includes a decoding unit 2051, a demodulation unit 2053, a demultiplexing unit 2055, and a wireless reception unit 2057. A reception process of the terminal station apparatus 2 is performed by the higher layer processing unit 201, the control unit 203, the reception unit 205, and the transmit and receive antenna 211. The transmission unit 207 includes a coding unit 2071, a modulation unit 2073, a multiplexing unit 2075, and a wireless transmission unit 2077. A transmission process of the terminal device 2 is performed by the higher layer processing unit 201, the control unit 203, the transmission unit 207, and the transmit and receive antenna 211.

The higher layer processing unit 201 outputs data information of the uplink generated by an operation of a user to the transmission unit. The higher layer processing unit 201 performs processes of a medium access control (MAC)

layer, a packet data convergence protocol (PDCP) layer, a radio link control (RLC) layer, and a radio resource control (RRC) layer.

The higher layer processing unit 201 manages various configuration information items of the terminal device. The higher layer processing unit 201 generates information assigned to each channel of the uplink, and outputs the generated information to the transmission unit 207. The higher layer processing unit 201 generates control information for controlling the reception unit 205 and the transmission unit 207 based on various configuration information items of the terminal device which are managed by the higher layer processing unit 201 for which downlink control information (DCI) notified from the base station apparatus 1 through the PDCCH and radio resource control information notified through the PDSCH are configured, and outputs the generated control information to the control unit 203. The higher layer processing unit 201 sets various parameters (information elements and RRC messages) of each signal based on information regarding a first configuration to information regarding an n-th configuration notified from the base station apparatus 1. The higher layer processing unit generates these set information items, and outputs the generated information to the transmission unit 207 through the control unit 203. When connection with the base station apparatus 1 is established, the higher layer processing unit 201 generates the function information of the terminal device 2, outputs the generated function information to the transmission unit 207 through the control unit 203, and notifies the base station apparatus 1 of the function information. After the connection with the base station apparatus 1 is established, the higher layer processing unit 201 may notify the base station apparatus 1 of the function information.

The function information may include information (RF-Parameters) regarding a RF parameter. The information regarding the RF parameter may include information (1st SupportedBandCombination) indicating a band supported by the terminal device 2. The information regarding the RF parameter may include information (SupportedBandCombinationExt) indicating a band supporting the carrier aggregation and/or MIMO. The information regarding the RF parameter may include information (2nd SupportedBandConbination) indicating a band which supports a function of performing a plurality of timing advances between bands which are simultaneously aggregated for the terminal device 2 or performing simultaneous transmission and reception between bands. These bands may be listed. The value (entry) indicated by a plurality of listed information items may be commonly used (may indicates the same).

Whether or not each band (bandE-UTRA, FreqBandIndicator, or E-UTRA Operating Band) supported by the terminal device 2 supports half duplex may be indicated. In a band in which half duplex is not supported, full duplex is supported.

Whether a band supported by the terminal device 2 supports the carrier aggregation and/or MIMO in the uplink may be indicated.

Whether a band supported by the terminal device 2 supports the carrier aggregation and/or MIMO in the downlink may be indicated.

The information regarding the RF parameter may include information indicating a band which supports TDD-FDD carrier aggregation. The above-described bands may be listed.

The information regarding the RF parameter may include information indicating whether or not a function of simultaneously performing transmission and reception between bands which support TDD-FDD carrier aggregation is supported.

The information regarding the RF parameter may include information indicating whether or not transmission and reception is simultaneously performed between bands of different duplex modes.

In a case where there is a function which is not supported among the functions included in the function information, the higher layer processing unit 201 may not set information indicating whether or not the function is supported to the function information. The base station apparatus 1 regards the function which is not set to the function information as not being supported by the terminal device 2, and performs various configurations. The information indicating whether or not the function is supported may be information indicating that the function is supported.

If there is the function which is not supported among the function information items, the higher layer processing unit 201 may set information (for example, "not supported", "disable", or "FALSE") or a specific value (for example, "0") indicating that this function is not supported, and may notify the base station apparatus 1 of function information including the information.

If there is the function which is supported among the function items, the higher layer processing unit 201 may set information (for example, "supported", "enable", or "TRUE") or a specific value (for example, "1") indicating that the function is supported, and may notify the base station apparatus 1 of function information including the information.

In a case where there is no a function of simultaneously performing transmission and reception between bands which may be simultaneously aggregated, the higher layer processing unit 201 may set a specific value or information indicating that the function is not supported by information (simultaneous Rx-Tx) indicating whether or not the function of simultaneously performing transmission and reception between bands which may be simultaneously aggregated is supported. The information indicating whether or not the function of simultaneously performing transmission and reception between bands which may be simultaneously aggregated is supported may be not set to the function information.

The higher layer processing unit 201 acquires information indicating a sounding subframe (SRS subframe or SRS transmission subframe) which is the subframe reserved for the radio resource for transmitting the SRS broadcasted by the base station apparatus 1 and a bandwidth of the radio resource reserved for transmitting the SRS within the sounding subframe, information indicating the subframe in which the periodic SRS notified to the terminal device 2 from the base station apparatus 1 is transmitted, a frequency band, and the amount of cyclic shifts used for the CAZAC sequence of the periodic SRS, and information indicating a frequency band in which the aperiodic SRS notified to the terminal device 2 from the base station apparatus 1 is transmitted and the amount of cyclic shifts used for CAZAC sequence of the aperiodic SRS from the reception unit 205.

The higher layer processing unit 201 controls SRS transmission according to the information. Specifically, the higher layer processing unit 201 controls the transmission unit 207 to transmit a periodic SRS according to information regarding the periodic SRS once or periodically. In a case where the transmission of the aperiodic SRS is requested by a SRS request (SRS indicator) input from the reception unit 205, the higher layer processing unit 201 transmits the aperiodic SRS according to information regarding the aperiodic SRS a predetermined number of times (for example, once).

The higher layer processing unit 201 controls the transmit powers of the PRACH, the PUCCH, the PUSCH, the periodic SRS, and the aperiodic SRS based on information regarding transmit power control of various uplink signals transmitted from the base station apparatus 1. Specifically, the higher layer processing unit 201 configures the transmit powers of the various uplink signals based on information regarding various types of uplink power control acquired from the reception unit 205. For example, the transmit power of the SRS is controlled based on $P_{O\_PUSCH}$, α, a power offset $P_{SRS\_OFFSET}(0)$ (first power offset (pSRS-Offset)) for the periodic SRS, a power offset $P_{SRS\_oFFSET}(1)$ (second power offset (pSRS-OffsetAp)) for the aperiodic SRS, and a TPC command. The higher layer processing unit 201 switches between the first power offset and the second power offset depending on whether $P_{SRS\_OFFSET}$ is configured for the periodic SRS or the aperiodic SRS.

In a case where a third power offset is configured for the periodic SRS and/or aperiodic SRS, the higher layer processing unit 201 sets a transmit power based on the third power offset. The third power offset may be configured so as to have a value in a range wider than that of the first power offset or the second power offset. The third power offset may be configured for each of the periodic SRS and the aperiodic SRS. That is, the information of the parameter relating to the uplink power control is an information element or an RRC message which includes parameters relating to control of the transmit power of various uplink physical channels.

In a case where the sum of the transmit power of the first uplink reference signal and the transmit power of the physical uplink shared channel exceeds the maximum transmit power (for example, $P_{CMAX}$ or $P_{CMAX,\,c}$) configured for the terminal device 2 in a certain serving cell or a certain subframe, the higher layer processing unit 201 outputs indication information to the transmission unit 207 through the control unit 203 so as to transmit the physical uplink shared channel.

In a case where the sum of the transmit power of the first uplink reference signal and the transmit power of the physical uplink control channel exceeds the maximum transmit power (for example, $P_{CMAX}$ or $P_{CMAX,\,c}$) configured for the terminal device 2 in a certain serving cell or a certain subframe, the higher layer processing unit 201 outputs indication information to the transmission unit 207 through the control unit 203 so as to transmit the physical uplink control channel.

In a case where the sum of the transmit power of the second uplink reference signal and the transmit power of the physical uplink shared channel exceeds the maximum transmit power configured for the terminal device 2 in a certain serving cell or a certain subframe, the higher layer processing unit 201 outputs indication information to the transmission unit 207 through the control unit 203 so as to transmit the physical uplink shared channel.

In a case where the sum of the transmit power of the second uplink reference signal and the transmit power of the physical uplink control channel exceeds the maximum transmit power configured for the terminal device 2 in a certain serving cell (for example, serving cell c) or a certain subframe (for example, subframe i), the higher layer processing unit 201 outputs indication information to the transmission unit 207 through the control unit 203 so as to transmit the physical uplink control channel.

In a case where a plurality of physical channels is transmitted at the same timing (for example, subframe), the higher layer processing unit 201 may control the transmit powers of various physical channels or may control transmission of the various physical channels according to the priorities of the various physical channels. The higher layer processing unit 201 outputs control information thereof to the transmission unit 207 through the control unit 203.

In a case where the carrier aggregation using a plurality of serving cells or a plurality of component carriers which respectively corresponds to the plurality of serving cells is performed, the higher layer processing unit 201 may control the transmit powers of various physical channels or may control the transmission of the various physical channels according to the priorities of the various physical channels.

The higher layer processing unit 201 may control the transmission of various physical channels transmitted from the cell according to the priority of the cell. The higher layer processing unit 201 outputs control information thereof to the transmission unit 207 through the control unit 203.

The higher layer processing unit 201 outputs indication information to the transmission unit 207 through the control unit 203 based on information regarding the configuration of the uplink reference signal notified from the base station apparatus 1 such that the uplink reference signal is generated. That is, the reference signal control unit 2013 outputs the information regarding the configuration of the uplink reference signal to the uplink reference signal generation unit 2079 through the control unit 203.

The control unit 203 generates control signals for controlling the reception unit 205 and the transmission unit 207 based on the control information from the higher layer processing unit 201. The control unit 203 outputs the generated control signals to the reception unit 205 and the transmission unit 207 and controls the reception unit 205 and the transmission unit 207.

The reception unit 205 separates, demodulates, and decodes the reception signal received from the base station apparatus 1 through the transmit and receive antenna 211 according to the control signal input from the control unit 203, and outputs the decoded information to the higher layer processing unit 201. The reception unit receives the PDCCH transmitted using the first DCI format or the second DCI format.

The reception unit 205 performs an appropriate reception process depending on whether or not information regarding the first configuration and/or information regarding the second configuration is received. For example, in a case where any one of the information regarding the first configuration and the information regarding the second configuration is received, a first control information field is detected from the received downlink control information format, and in a case where the information regarding the first configuration and the information regarding the second configuration are received, a second control information field is detected from the received downlink control information format.

The wireless reception unit 2057 converts (down-converts) the frequency of the signal of the downlink received through the receive antenna into an intermediate frequency, and removes an unnecessary frequency component. The wireless reception unit controls an amplification level such that a signal level is appropriately maintained, and performs orthogonal demodulation based on the in-phase component and the quadrature component of the received signal. The wireless reception unit converts the analog signal acquired by performing the orthogonal demodulation into a digital signal. The wireless reception unit 2057 removes a portion equivalent to a guard interval from the converted digital signal, performs fast Fourier Transform on a signal obtained by removing the guard interval, and extracts a signal in the frequency domain.

The demultiplexing unit 2055 separates the extracted signal into the PDCCH, the PDSCH, and the downlink reference signal (DL-RS). The separation is performed based on assignment information of the radio resources notified using the downlink control information. The demultiplexing unit 2055 performs the channel compensation of the PDCCH and the PDSCH based on an estimated value of the channel input from the channel measurement unit 209. The demultiplexing unit 2055 outputs the separated downlink reference signal to the channel measurement unit 209.

The demodulation unit 2053 performs demodulation of the QPSK modulation scheme on the PDCCH transmitted by using the DCI format, and outputs the resultant to the decoding unit 2051. The decoding unit 2051 attempts to decode the PDCCH, and outputs the decoded downlink control information (DCI) to the higher layer processing unit 201 in a case where the decoding succeeds. The demodulation unit 2053 performs demodulation of the modulation scheme notified using the downlink control information, such as QPSK, 16-QAM, and 64-QAM, on the PDSCH, and outputs the resultant to the decoding unit 2051. The decoding unit 2051 performs decoding at a coding rate notified using the downlink control information, and outputs the decoded data information to the higher layer processing unit 201.

The channel measurement unit 209 measures the pathloss of the downlink based on the downlink reference signal input from the demultiplexing unit 2055, and outputs the measured pathloss to the higher layer processing unit 201. The channel measurement unit 209 calculates an estimated value of the channel of the downlink based on the downlink reference signal, and outputs the calculated value to the demultiplexing unit 2055. The channel measurement unit 209 measures a received power of a first signal and/or a second signal or measures reception quality thereof according to various information items regarding measurement notified from the reference signal control unit 2013 through the control unit 203 and various information items regarding the measurement report. The channel measurement unit 209 outputs the result thereof to the higher layer processing unit 201. In a case where there is an indication that a channel evaluation of the first signal and/or the second signal is performed, the channel measurement unit 209 may output a result regarding the channel evaluation of each of the signals to the higher layer processing unit 201. Here, the first signal or the second signal are reference signals (pilot signals, pilot channels, or base signals), and may be a third signal or a fourth signal other than the first signal or the second signal. That is, the channel measurement unit 209 measures channels of one or more signals. The channel measurement unit 209 configures a signal for measuring the channel according to the notified control information from the higher layer processing unit 201 through the control unit 203.

In a case where there is an uplink subframe in which the uplink transmission is requested in a certain cell (first cell) and thus CRS or CSI-RS is not able to be measured in the same subframe of a cell (second cell) different from the certain cell, the channel measurement unit 209 may perform the measurement except for a subframe in which an average of measurement results (received power, reception quality, or channel quality) in the second cell is not able to be measured. In other words, the channel measurement unit 209 may calculate the average value of the measurement results (received power, reception quality, or channel quality) only by using the received CRS or CSI-RS. The channel measurement unit may transmit the calculation result (indicator or information corresponding to the calculation result) to the base station apparatus 1 through the transmission unit 207.

The transmission unit 207 generates an uplink demodulation reference signal (UL DMRS) and/or a sounding reference signal (SRS) based on the control signal (control information) input from the control unit 203, codes and modulates data information input from the higher layer processing unit 201, and multiplexes the PUCCH, the PUSCH, and the generated UL DMRS and/or SRS. The transmission unit adjusts the transmit powers of the PUCCH, the PUSCH, the UL DMRS, and the SRS, and transmits the adjusted transmit powers to the base station apparatus 1 through the transmit and receive antenna 211.

In a case where information regarding the measurement result is output from the higher layer processing unit 201, the transmission unit 207 transmits the output information to the base station apparatus 1 through the transmit and receive antenna 211.

In a case where channel state information which is a result regarding the channel evaluation is output from the higher layer processing unit 201, the transmission unit 207 performs feedback of the channel state information to the base station apparatus 1. That is, the higher layer processing unit 201 generates channel state information (CSI, CQI, PMI, or RI) based on the measurement result notified from the channel measurement unit 209, and performs feedback to the base station apparatus 1 through the control unit 203.

If a prescribed grant (or a prescribed downlink control information format) is detected by the reception unit 205, the transmission unit 207 transmits the uplink signal corresponding to the prescribed grant in the first uplink subframe after a prescribed number of subframes from the subframe in which the grant is detected. For example, if the grant is detected in the subframe i, the uplink signal may be transmitted in the first uplink subframe after a subframe i+k.

In a case where the transmission subframe of the uplink signal is the subframe i, the transmission unit 207 sets the transmit power of the uplink signal based on a power control adjustment value obtained by the TPC command received in the subframe i–k. Here, the power control adjustment value f(i) (or g(i)) is configured based on a corrected value or an absolute value correlated with the value set to the TPC command. In a case where the accumulation is effective, the corrected values correlated with the value set to the TPC command are accumulated, and the accumulation result is applied as the power control adjustment value. In a case where the accumulation is not effective, an absolute value correlated with the value set to a single TPC command is applied as the power control adjustment value.

The transmission unit 207 transmits the uplink signal by setting the transmit power based on the parameter relating to the first uplink power control in a case where any one of the information regarding the first configuration and the information regarding the second configuration is received by the reception unit 205 and setting the transmit power based on the parameter relating to the second uplink power control in a case where the information regarding the first configuration and the information regarding the second configuration are received in the reception unit 205.

The coding unit 2071 performs coding such as turbo-coding, convolutional coding, or block coding on the data information and the uplink control information input from the higher layer processing unit 201. The modulation unit 2073 modulates the coding bits input from the coding unit 2071 by using the modulation scheme such as BPSK, QPSK, 16-QAM, or 64-QAM.

The uplink reference signal generation unit 2079 generates an uplink reference signal based on information regarding the configuration of the uplink reference signal. That is, the uplink reference signal generation unit 2079 generates CAZAC sequences known by the base station apparatus 1 required by a predetermined rule based on a cell identifier for identifying the base station apparatus 1 and a bandwidth for mapping an uplink demodulation reference signal, the first uplink reference signal, and the second uplink reference signal. The uplink reference signal generation unit 2079 adds the cycling shift to the CAZAC sequences of the generated uplink demodulation reference signal, the first uplink reference signal, and the second uplink reference signal based on the control signal input from the control unit 203.

The uplink reference signal generation unit 2079 may initialize reference sequences of the uplink demodulation reference signal and/or sounding reference signal and the uplink reference signal based on prescribed parameters. The prescribed parameters may be the same parameter in the reference signals. The prescribed parameters may be the independently configured parameters in the reference signals. That is, in a case where there are no independently configured parameters, the uplink reference signal generation unit 2079 may initialize the reference sequences of the reference signals by using the same parameter.

The multiplexing unit 2075 reallocates the modulation symbols of the PUSCH based on the control signal input from the control unit 203, performs discrete Fourier transform (DFT), and multiplexes the PUCCH, the signal of the PUSCH, and the generated UL DMRS, and the generated SRS.

The wireless transmission unit 2077 performs inverse fast Fourier Transform on the multiplexed signals, and performs modulation of the SC-FDMA scheme. The wireless transmission unit adds a guard interval to SC-FDMA symbols obtained by SC-FDMA modulation, and generates a baseband digital signal. The wireless transmission unit converts the baseband digital signal into an analog signal, generates the in-phase component and the quadrature component of an intermediate frequency from the analog signal, and removes an extra frequency component from the intermediate frequency band. The wireless transmission unit converts (up-converts) a signal having an intermediate frequency into a signal having a high frequency (radio frequency), and removes an extra frequency component. The wireless transmission unit amplifies power, and outputs and transmits the signal to the transmit and receive antenna 211.

Although it has been described in the aforementioned embodiment that the carrier aggregation is configured (secondary cell is configured) and the PUCCH is transmitted and received in the primary cell are described, the present invention is not limited thereto. In the case where the carrier aggregation is configured, the HARQ-ACK corresponding to the PDSCH in the secondary cell may be transmitted and received in the secondary cell. In this case, in a case where the carrier aggregation is configured and the carrier aggregation of the uplink is not configured, that is, in a case where the secondary cell without the configuration of the uplink component carrier is configured, the HARQ-ACK corresponding to the PDSCH in the secondary cell is transmitted and received in the primary cell. In this case, the procedure for transmitting and receiving the HARQ-ACK described in the aforementioned embodiment may be used. Even in a case where the serving cell in which the PUCCH is transmitted and received is a serving cell which is not the primary cell (for example, some (one) of the secondary cells in a secondary cell group), the procedure for transmitting and receiving the HARQ-ACK described in the aforementioned embodiment may be used. In this case, the same advantages may be acquired by replacing the primary cell of the aforementioned embodiment with some of the secondary cells.

In the aforementioned embodiment, the reception process may include a detection process (detection). The reception process may include a demodulation process (demodulation). The reception process may include a decoding process (decode or decoding).

In the terminal device 2, the priorities of the physical channels/physical signals transmitted depending on the type of the physical channel may be previously configured or defined.

In the aforementioned embodiment, the terminal device 2 may report the measurement result of the received power to the base station apparatus 1 based on the CSI-RS or a discovery reference signal (DRS). The terminal device 2 may perform periodically reporting. The terminal device 2 may perform the reporting in a case where a certain condition is satisfied.

In the aforementioned embodiment, in a case where the received power is measured based on the CSI-RS or the DRS, the terminal device 2 may perform the transmit power control of the uplink signal based on the received power. That is, the terminal device 2 may determine the downlink pathloss based on the received power.

In the aforementioned embodiment, in a case where the sum of transmit powers of the various uplink signals which includes the transmit powers of the first uplink reference signal and/or the second uplink reference signal exceeds the maximum transmit power configured for the terminal device 2, the terminal device 2 may not transmit the first uplink reference signal and/or the second uplink reference signal.

If the TDD UL/DL configuration (first TDD UL/DL configuration) for the uplink transmission reference and the TDD UL/DL configuration (second TDD UL/DL configuration) for the downlink transmission reference are configured and information regarding the uplink transmit power control is configured, the terminal device 2 sets the uplink power control of the subframe based on the parameter relating to the first uplink power control in a case where the subframe of which the same type of the first TDD UL/DL configuration and the second TDD UL/DL configuration are the same is configured and sets the uplink power of the subframe based on the parameter relating to the second uplink power control in a case where the subframe of which the first TDD UL/DL configuration and the second TDD UL/DL configuration are different is configured.

The flexible subframe is a subframe which is the uplink subframe or the downlink subframe. The flexible subframe is a subframe which is the downlink subframe or the special subframe. The flexible subframe is a subframe which is the uplink subframe or the special subframe. That is, the flexible subframe is a subframe which is the first subframe or the second subframe. For example, a subframe configured as the flexible subframe is processed as the first subframe (for example, uplink subframe) in the case of Condition 1, and is processed as the second subframe (for example, downlink subframe) in the case of Condition 2.

The flexible subframe may be set based on the first configuration and the second configuration. For example, in a case where a certain subframe i is configured as the uplink subframe in the first configuration and is configured as the downlink subframe in the second configuration, the subframe i functions as the flexible subframe. The flexible subframe may be configured based on information indicating a subframe pattern of the flexible subframe.

A plurality of subframe sets may be configured based on not two TDD UL/DL configuration but one TDD UL/DL configuration and a flexible subframe pattern (downlink candidate subframe pattern, uplink candidate subframe pattern, or addition subframe). The terminal device 2 may receive the downlink signal by using a subframe index indicated by a flexible subframe pattern if the uplink signal is not transmitted in the subframe even though the subframe is indicated as the uplink subframe in the TDD UL/DL configuration, and may transmit the uplink signal if there is an indication that the uplink signal is previously transmitted in the subframe even though the subframe is indicated as the downlink subframe in the TDD UL/DL configuration. A specific subframe may be indicated as an uplink/downlink candidate subframe.

If a certain condition is satisfied, the terminal device 2 may recognize one set as a subframe set for the uplink, and may recognize the other set as a subframe set for the downlink. Here, the subframe set for the uplink corresponds to a set of subframes configured for transmitting the PUSCH and the PHICH, and the downlink subframe set corresponds to a set of subframes configured for transmitting the PDSCH and the HARQ. Information indicating the association of the PUSCH and the PHICH with the subframe and information indicating the association of the PDSCH and the HARQ with the subframe may be previously configured for the terminal device 2.

In the aforementioned embodiment, a plurality of subframe sets may be configured for one serving cell (primary cell, secondary cell, carrier frequency, transmission frequency, or component carrier). A cell for which a plurality of subframe sets is configured and a cell for which a plurality of subframe sets is not configured may be provided.

In the aforementioned embodiment, in a case where two or more subframe sets are independently configured for one serving cell, the maximum transmit power ($P_{CMAX}$ or $P_{CMAX, c}$) configured for each terminal device 2 may be configured for each subframe set. That is, the terminal device 2 may configure a plurality of independent maximum transmit powers. That is, a plurality of maximum transmit powers ($P_{CMAX}$ and $P_{CMAX, c}$) may be set for one serving cell. A plurality of maximum allowable output powers ($P_{EMAX, c}$) may be configured for one serving cell.

In a case where the resource assignments of various uplink signals are the same, the base station apparatus 1 may detect the various uplink signals by using a difference between the signal sequences of the uplink signals. That is, the base station apparatus 1 may recognize the uplink signal by using the difference between the signal sequences of the received uplink signals. The base station apparatus 1 may determine whether or not transmission to the base station apparatus is performed by using the difference between the signal sequences of the received uplink signals.

In a case where the measurement of the received power using the CSI-RS or the DRS is indicated from the base station apparatus 1, the terminal device 2 may calculate the downlink pathloss based on the measurement result, and may use the calculated downlink pathloss in order to control the uplink transmit power.

Here, the measurement of the received power may also be referred to reference signal received power (RSRP) measurement or reception signal power measurement. Measurement of reception quality may also be referred to reference signal received quality (RSRQ) measurement or reception signal quality measurement.

The resource assignment (resource allocation, mapping to resource elements, or mapping to physical resources) of the CSI-RS or the DRS may be frequency-shifted. The frequency shift of the CSI-RS or the DRS may be determined based on the physical cell ID. The frequency shift of the CSI-RS or the DRS may be determined based on the virtual cell ID.

For example, if information is not notified from the base station apparatus 1, the terminal device 2 measures the received power of the first downlink reference signal. Information indicating whether or not to measure the received power of the second downlink reference signal is notified to the terminal device 2 from the base station apparatus 1. In a case where the indication information indicates that the received power of the second downlink reference signal may be measured, the terminal device 2 measures the received power of the second downlink reference signal. In this case, the terminal device 2 may measure the received power of the first downlink reference signal in parallel. In a case where the indication information indicates that the received power of the second downlink reference signal is not able to be measured, the terminal device 2 measures the received power of only the first downlink reference signal. The indication information may include information indicating whether or not to measure the reception quality of the second downlink reference signal. Irrespective of the indication information, the received power of the third downlink reference signal may be measured.

In a case where two subframe sets are configured for one serving cell, if it is assumed that the second subframe set is set to be a subframe pattern of the flexible subframe, information indicating a pattern of a subframe in which the DCI format including the TPC command field for the flexible subframe is able to be received may be transmitted to the terminal device 2 from the base station apparatus 1.

A pattern of a subframe in which a TPC command applicable to the uplink subframe belonging to the first subframe set is transmitted, and a pattern of a subframe in which a TPC command applicable to the uplink subframe belonging to the second subframe set is transmitted may be respectively configured. The correspondence (association) between the uplink subframe and the downlink subframe in which the DCI format including the TPC command for the uplink subframe is transmitted may be managed in a table.

RSRP measurement results may be independent from each other for the subframe sets. A RSRP using the CRS received in the downlink subframe of the fixation subframe and a RSRP using the CRS received in the flexible subframe may be independently measured.

Although it has been described in the aforementioned embodiment that a resource element or a resource block is used as a mapping unit of various uplink signals or various downlink signals and a symbol, a subframe, or a radio frame is used as a transmission unit in the time direction, the present invention is not limited thereto. The same advantages may also be obtained by using a region unit and a time unit constituted by an arbitrary frequency and time instead of the above-described units. Although it has been described in the aforementioned embodiment that the demodulation is performed by using a precoded RS and it has been described that a port equivalent to the layer of MIMO is used as a port corresponding to the precoded RS, the present invention is not limited thereto. In addition, the present invention is applied to ports corresponding to different reference signals, and thus, the same advantages may be obtained. For example, not the precoded RS but an un-precoded (non-precoded) RS may be used and, a port equivalent to an output terminal after the precoding process is performed or a port equivalent to a physical antenna (or a combination of physical antennas) may be used as the port.

In the aforementioned embodiment, in a case where only DCI format 3/3A is received in a certain downlink subframe, a correction value (or absolute value) corresponding to a value set to the TPC command field included in the DCI format 3/3A is applied to the power control adjustment value for the transmit power of the PUSCH transmitted in a specific subframe set irrespective of the subframe set to which the downlink subframe belongs. In a case where only the DCI format 3/3A is received in a certain downlink subframe, the accumulation of TPC commands included in the DCI format 3/3A may be applied to the power control adjustment value for the transmit power of the PUSCH transmitted in a specific subframe set. The specific subframe set may be a set of fixation subframes, a set of flexible subframes, or a set of arbitrary subframes.

In the aforementioned embodiment, the parameter relating to the uplink power control corresponds to the parameter used in the transmit power control of the uplink physical channel/physical signal (PUSCH, PUCCH, PRACH, SRS, or DMRS), and the parameter used in the transmit power control includes information regarding switching or (re)configuring of various parameters used for configuring the transmit powers of various uplink physical channels. The parameter relating to the downlink transmit power control corresponds to the parameter used in the transmit power control of the downlink physical channel/physical signal (CRS, UERS (DL DMRS), CSI-RS, PDSCH, PDCCH/EPDCCH, PBCH, PSS/SSS, PMCH, or PRS), and the parameter used in the transmit power control includes information regarding switching or (re)configuring of various parameters used for configuring transmit powers of various downlink physical channels.

In the aforementioned embodiment, the base station apparatus 1 may configure a plurality of virtual cells ID for one terminal device 2. For example, the base station apparatus 1 and a network including at least one base station apparatus 1 may configure independently virtual cells ID for each physical channel/physical signal. A plurality of virtual cells ID may be configured for one physical channel/physical signal. That is, the virtual cell ID may be set for each configuration of the physical channel/physical signal. The virtual cell ID may be shared between a plurality of physical channels/physical signals.

For example, in the description of the embodiment, a case where the power is set includes a case where a value of the power is set, a case where the power is set includes a case where a value of the parameter relating to the power is set. A case where the power is calculated includes a case where a value of the power is calculated, a case where the power is measured includes a case where a value of the power is measured, and a case where the power is reported includes a case where a value of the power is reported. As stated above, the expression of the power appropriately includes the meaning of the value of the power.

In the description of the aforementioned embodiment, a case where transmission is not performed includes a case where a transmission process is not performed. A case where transmission is not performed includes a case where a signal for transmission is not generated. A case where transmission is not performed includes a case where a signal (or information) is generated but the signal (or information) is not transmitted. A case where reception is not performed includes a case where a reception process is not performed. A case where reception is not performed includes a case where a detection process is not performed. A case where reception is not performed includes a case where a decoding or demodulation process is not performed.

For example, in the description of the aforementioned embodiment, a case where a pathloss is calculated includes a case where the value of the pathloss is calculated. As stated above, the expression of the pathloss appropriately includes the meaning of the value of the pathloss.

In the description of the aforementioned embodiment, a case where various parameters are configured includes a case where values of the various parameters are configured. As stated above, the expression of various parameters appropriately includes the meaning of the values of the various parameters.

The programs operated in the base station apparatus 1 and the terminal device 2 according to the present invention may be programs (programs causing a computer to function) for controlling a CPU such that the functions of the above-described embodiments according to the present invention are realized. The information items treated by these devices are temporally accumulated in a RAM during the processing, are stored in various ROMs or HDDs, are read by the CPU if necessary, and are modified and rewritten. As a recording medium that stores the programs, any one of a semiconductor medium (for example, ROM or non-volatile memory card), an optical recording medium (for example, DVD, MO, MD, CD, and BD), a magnetic recording medium (for example, magnetic tape and flexible disk) may be used. The functions of the above-described embodiment may be realized by executing the loaded program, or the functions of the present invention may be realized by processing the loaded program in cooperation with an operating system or another application program based on an instruction of the program.

In a case where the program is distributed to the market, the program may be distributed while being stored in a portable recording medium, and may be transmitted to a server computer connected via a network such as the Internet. In this case, a storage device of the server computer may also be included in the present invention. Some or all of the base station apparatuses 1 and the terminal devices 2 of the above-described embodiments may be typically realized as LSI which is integrated circuit. The functional blocks of the base station apparatuses 1 and the terminal devices 2 may be separately realized as chips, or some or all thereof may be integrated and realized as chips. The method of realizing the functional blocks as the integrated circuit is not limited to the LSI, and the functional blocks may be realized as a dedicated circuit or a general-purpose processor. In a case where a technology of realizing the functional blocks as the integrated circuit replaced as the LSI appears by the advance of a semiconductor technology, it may be possible to use an integrated circuit produced using this technology.

Although the embodiment of the present invention has been described with reference to the drawings, the specific structure is not limited to this embodiment, and designs within a scope without departing from the gist of the present invention are included. The present invention may be variously changed without departing from the claims, and embodiments acquired by appropriately combining technical means disclosed in different embodiments are included in the technical range of the present invention. The elements described in the respective embodiments and structures acquired by replacing the elements that exhibit the same effects are included therein.

This application invention is not limited to the above-described embodiment. The terminal device according to the present invention is not limited to the application to a mobile station, and may be applied to stationary or non-movable electronic devices which are installed indoors or outdoors, such as AV devices, kitchen devices, cleaning and washing machines, air conditioners, office devices, vending machines, and other home appliances. The present invention is preferably used in a radio base station apparatus, a radio terminal device, a wireless communication system, or a wireless communication method.

INDUSTRIAL APPLICABILITY

Some aspects of the present invention may be applied to a terminal device required to efficiently perform communication in a communication system in which a base station apparatus and a terminal device communicate with each other.

REFERENCE SIGNS LIST

1 Base station apparatus
2 Terminal device
101 Higher layer processing unit
103 Control unit
105 Reception unit
107 Transmission unit
109 Channel measurement unit
111 Transmit and receive antenna
1051 Decoding unit
1053 Demodulation unit
1055 Demultiplexing unit
1057 Wireless reception unit
1071 Coding unit
1073 Modulation unit
1075 Multiplexing unit
1077 Wireless transmission unit
1079 Downlink reference signal generation unit
201 Higher layer processing unit
203 Control unit
205 Reception unit
207 Transmission unit
209 Channel measurement unit
211 Transmit and receive antenna
2051 Decoding unit
2053 Demodulation unit
2055 Demultiplexing unit
2057 Wireless reception unit
2071 Coding unit
2073 Modulation unit
2075 Multiplexing unit
2077 Wireless transmission unit
2079 Uplink reference signal generation unit

The invention claimed is:

1. A user equipment comprising:
receiving circuitry configured to receive a physical downlink control channel (PDCCH) or an enhanced physical downlink control channel (EPDCCH), and to receive a physical downlink shared channel (PDSCH);
transmitting circuitry configured to transmit a hybrid automatic repeat request-acknowledgement (HARQ-ACK) for the PDSCH for a secondary cell; and
setting circuitry configured to set feedback bits $o^{ACK}_i$ of the HARQ-ACK based on a value of $W^{UL}_{DAI}$ which is determined by a downlink assignment index (DAI) in a downlink control information (DCI) format 0 or 4, wherein
an uplink (UL)-reference uplink/downlink (UL/DL) configuration of the secondary cell is assumed to be any one of 1, 2, 3, 4 or 6, in a case that (a) the secondary cell is a serving cell with frame structure type 1, (b) a primary cell is a serving cell with frame structure type 2.

2. A method performed by a user equipment comprising:
receiving a physical downlink control channel (PDCCH) or an enhanced Physical downlink control channel (EPDCCH);
receiving a physical downlink shared channel (PDSCH);
transmitting a hybrid automatic repeat request-acknowledgement (HARQ-ACK) for the PDSCH for a secondary cell;
setting feedback bits $o^{ACK}_i$ of the HARQ-ACK based on a value of $W^{UL}_{DAI}$ which is determined by a downlink assignment index (DAI) in a downlink control information (DCI) format 0 or 4, wherein
an uplink (UL)-reference uplink/downlink (UL/DL) configuration of the secondary cell is assumed to be any one of 1, 2, 3, 4 or 6, in a case that (a) the secondary cell is a serving cell with frame structure type 1, (b) a Primary cell is a serving cell with frame structure type 2.

* * * * *